(12) United States Patent
Kar et al.

(10) Patent No.: US 10,893,250 B2
(45) Date of Patent: Jan. 12, 2021

(54) FREE-VIEWPOINT PHOTOREALISTIC VIEW SYNTHESIS FROM CASUALLY CAPTURED VIDEO

(71) Applicant: Fyusion, Inc., San Francisco, CA (US)

(72) Inventors: Abhishek Kar, Berkeley, CA (US); Rodrigo Ortiz Cayon, San Francisco, CA (US); Ben Mildenhall, Berkeley, CA (US); Stefan Johannes Josef Holzer, San Mateo, CA (US); Radu Bogdan Rusu, San Francisco, CA (US)

(73) Assignee: Fyusion, Inc., San Francisco, CA (US)

( * ) Notice: Subject to any disclaimer, the term of this patent is extended or adjusted under 35 U.S.C. 154(b) by 0 days.

(21) Appl. No.: 16/574,652

(22) Filed: Sep. 18, 2019

(65) Prior Publication Data
US 2020/0226816 A1 Jul. 16, 2020

Related U.S. Application Data

(60) Provisional application No. 62/792,163, filed on Jan. 14, 2019.

(51) Int. Cl.
*G09G 5/00* (2006.01)
*H04N 13/111* (2018.01)
(Continued)

(52) U.S. Cl.
CPC .......... *H04N 13/111* (2018.05); *G06T 7/0002* (2013.01); *G06T 7/50* (2017.01);
(Continued)

(58) Field of Classification Search
CPC ....... G06T 7/557; G06T 15/08; G06T 15/205; G06T 19/003
See application file for complete search history.

(56) References Cited

U.S. PATENT DOCUMENTS 9,968,257 B1 * 5/2018 Burt ................. A61B 5/7267
10,306,203 B1 * 5/2019 Goyal ............... H04N 5/232
(Continued)

FOREIGN PATENT DOCUMENTS

WO  2013169671 A1  11/2013
WO  2020150045 A1  7/2020

OTHER PUBLICATIONS

Int'l Application Serial No. PCT/US20/12590, Int'l Search Report and Written Opinion dated Apr. 28, 2020.
(Continued)

*Primary Examiner* — Charles Tseng
(74) *Attorney, Agent, or Firm* — Kwan & Olynick LLP

(57) ABSTRACT

A respective target viewpoint may be rendered for each of a plurality of multiplane images of a three-dimensional scene. Each of the multiplane images may be associated with a respective single plane image of the three-dimensional scene captured from a respective viewpoint. Each of the multiplane images may include a respective plurality of depth planes. Each of the depth planes may include a respective plurality of pixels from the respective single plane image. Each of the pixels in the depth plane may be positioned at approximately the same distance from the respective viewpoint. A weighted combination of the target viewpoint renderings may be determined, where the sampling density of the single plane images is sufficiently high that the weighted combination satisfies the inequality in Equation (7). The weighted combination of the target viewpoint renderings may be transmitted as a novel viewpoint image.

20 Claims, 36 Drawing Sheets
(18 of 36 Drawing Sheet(s) Filed in Color)

(51) Int. Cl.
   G06T 7/557      (2017.01)
   H04N 13/271     (2018.01)
   G06T 7/579      (2017.01)
   G06T 7/70       (2017.01)
   G06T 7/514      (2017.01)
   G06T 15/20      (2011.01)
   G06T 7/00       (2017.01)
   G06T 15/00      (2011.01)
   G06T 15/50      (2011.01)
   G06T 7/50       (2017.01)
   H04N 5/232      (2006.01)
   G06T 15/08      (2011.01)
   H04N 13/00      (2018.01)

(52) U.S. Cl.
   CPC ........... *G06T 7/514* (2017.01); *G06T 7/557* (2017.01); *G06T 7/579* (2017.01); *G06T 7/70* (2017.01); *G06T 15/005* (2013.01); *G06T 15/08* (2013.01); *G06T 15/20* (2013.01); *G06T 15/205* (2013.01); *G06T 15/503* (2013.01); *H04N 5/23222* (2013.01); *H04N 5/232945* (2018.08); *H04N 13/271* (2018.05); *G06T 2207/10052* (2013.01); *G06T 2207/20081* (2013.01); *G06T 2207/20084* (2013.01); *G06T 2207/30244* (2013.01); *G06T 2215/16* (2013.01); *H04N 2013/0081* (2013.01)

(56) References Cited

U.S. PATENT DOCUMENTS

| | | |
|---|---|---|
| 2004/0114807 A1 | 6/2004 | Lelescu et al. |
| 2005/0253877 A1* | 11/2005 | Thompson ........... G09G 3/3611 345/698 |
| 2010/0111444 A1* | 5/2010 | Coffman ................ G06T 7/593 382/285 |
| 2011/0273437 A1 | 11/2011 | Sanderson et al. |
| 2012/0095323 A1* | 4/2012 | Eskandari ............ A61B 8/5269 600/411 |
| 2017/0067739 A1* | 3/2017 | Siercks ................ G06T 7/0002 |
| 2018/0139364 A1 | 5/2018 | Jannard |
| 2018/0293774 A1* | 10/2018 | Yu ........................ G06T 13/20 |
| 2019/0235729 A1* | 8/2019 | Day ........................ G09G 5/08 |
| 2020/0137380 A1* | 4/2020 | Supikov ............... H04N 13/395 |
| 2020/0226736 A1 | 7/2020 | Kar et al. |
| 2020/0228774 A1 | 7/2020 | Kar et al. |

OTHER PUBLICATIONS

Ben Mildenhall, et al., "Local Light Field Fusion: Practical View Synthesis with Prescriptive Sampling Guideline", ACM Trans. Graph., vol. 38, No. 4, Article 1. Publication date: Jul. 2019.

U.S. Appl. No. 16/574,639, Non-Final Rejection, dated Oct. 9, 2020, 25 pgs.

U.S. Appl. No. 16/574,622, Non-Final Rejection, dated Jul. 16, 2020, 20 pgs.

* cited by examiner

| | | \multicolumn{12}{c}{Maximum disparity $d_{max}$ (pixels)} | | | | | | | | | | | |
| | | 16 | | | 32 | | | 64 | | | 128 | | |
| | Algorithm | PSNR ↑ | SSIM ↑ | LPIPS ↓ | PSNR ↑ | SSIM ↑ | LPIPS ↓ | PSNR ↑ | SSIM ↑ | LPIPS ↓ | PSNR ↑ | SSIM ↑ | LPIPS ↓ |
|---|---|---|---|---|---|---|---|---|---|---|---|---|---|
| Baselines | LFI | 26.21 | 0.7776 | 0.2541 | 23.35 | 0.6982 | 0.3198 | 20.60 | 0.6243 | 0.3971 | 18.32 | 0.5560 | 0.4665 |
| | ULR | 28.17 | 0.8320 | 0.1510 | 26.43 | 0.7987 | 0.1820 | 24.34 | 0.7679 | 0.2311 | 21.24 | 0.7062 | 0.3215 |
| | Soft3D | 34.48 | 0.9430 | 0.1345 | 32.33 | 0.9216 | 0.1795 | 27.97 | 0.8588 | 0.2652 | 23.11 | 0.7382 | 0.3979 |
| | BW Deep | 34.18 | 0.9433 | 0.1074 | 34.00 | 0.9476 | 0.1128 | 31.88 | 0.9192 | 0.1573 | 27.59 | 0.8363 | 0.2591 |
| Ablations | Single MPI | 31.11 | 0.9482 | 0.1007 | 29.38 | 0.9424 | 0.1111 | 26.88 | 0.9250 | 0.1363 | 24.20 | 0.8734 | 0.1980 |
| | Avg. MPIs | 32.67 | 0.9560 | 0.1140 | 31.34 | 0.9532 | 0.1248 | 29.31 | 0.9400 | 0.1423 | 27.02 | 0.8999 | 0.1961 |
| | Ours | 34.57 | 0.9568 | 0.0942 | 34.48 | 0.9569 | 0.0954 | 33.58 | 0.9530 | 0.1012 | 31.96 | 0.9323 | 0.1374 |

Figure 33

| Symbol | Definition |
|---|---|
| $D$ | Number of depth planes |
| $W$ | Camera image width (pixels) |
| $f$ | Camera focal length |
| $\theta$ | Camera field-of-view |
| $\Delta_x$ | Pixel size (meters) |
| $\Delta_u$ | Baseline between cameras (meters) |
| $K_x$ | Highest spatial frequency in sampled light field |
| $B_x$ | Highest spatial frequency in continuous light field |
| $z_{min}$ | Closest scene depth (meters) |
| $z_{max}$ | Farthest scene depth (meters) |
| $d_{max}$ | Maximum disparity between views (pixels) |
| $S$ | Side length of entire viewing plane (meters) |
| $N$ | Number of sampled views |

Figure 36

FREE-VIEWPOINT PHOTOREALISTIC VIEW SYNTHESIS FROM CASUALLY CAPTURED VIDEO

CROSS-REFERENCE TO RELATED APPLICATIONS

This application claims priority to commonly assigned Provisional U.S. Patent Application No. 62/792,163 by Kar et al., titled Free-viewpoint Photorealistic View Synthesis from Casually Captured Video, filed on Jan. 14, 2019, which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to the processing of visual data and more specifically to rendering novel images.

BACKGROUND

Conventional photo-realistic rendering requires intensive manual and computational effort to create scenes and render realistic images. Thus, creation of rendered content for high quality digital imagery using conventional techniques is largely limited to experts. Further, highly-realistic rendering using conventional techniques requires significant computational resources, typically substantial amounts of computing time on high-resource computing machines.

Overview

According to various embodiments, techniques and mechanisms described herein may be used for processing image data. In some implementations, a respective target viewpoint may be rendered for each of a plurality of multiplane images of a three-dimensional scene. Each of the multiplane images may be associated with a respective single plane image of the three-dimensional scene captured from a respective viewpoint. Each of the multiplane images may include a respective plurality of depth planes. Each of the depth planes may include a respective plurality of pixels from the respective single plane image. Each of the pixels in the depth plane may be positioned at approximately the same distance from the respective viewpoint. A weighted combination of the target viewpoint renderings may be determined, where the sampling density of the single plane images is sufficiently high that the weighted combination satisfies the inequality in Equation (7). The weighted combination of the target viewpoint renderings may be transmitted as a novel viewpoint.

In some implementations, each of the rendered target viewpoints may be associated with a respective set of color values. Determining the weighted combination of the target viewpoint renderings may involve applying one or more blending weights to the color values. Each of the multiplane images may be associated with a respective set of alpha values.

In some embodiments, the weighted combination of the target viewpoint renderings may be determined based on a plurality of weights. Each of the plurality of weights may be determined based on a respective distance between the target viewpoint and a respective viewpoint of one of the multiplane images.

In some embodiments, each of the multiplane images may be associated with a respective set of alpha values. Each of the respective target viewpoint images may be determined based on weights determined based on the alpha values. The alpha values may be used to depict in the weighted combination a portion of the three-dimensional scene occluded from view in at least one of the multiplane images. Determining a weighted combination of the target viewpoint renderings may involve rasterizing each of a plurality of the depth planes as a respective texture-mapped rectangle in 3D space. The rasterized depth planes may be combined via a fragment shader.

According to various embodiments, the three-dimensional scene may include a non-Lambertian material. The three-dimensional scene may include a specularity represented at a respective one or more virtual depths in each of the multiplane images. The novel viewpoint may be transmitted to a storage device for storage. The novel viewpoint may be transmitted to a display screen for live presentation.

In some implementations, the novel viewpoint may be displayed on the display screen in real time during a three-dimensional navigation of the three-dimensional scene via the display screen. Each of the single plane images may be a respective photo of the three-dimensional scene. Each of the photos of the three-dimensional scene may be captured via a camera at a mobile computing device. The computing device may be a smartphone.

BRIEF DESCRIPTION OF THE DRAWINGS

Colored Drawings

The patent or application file contains at least one drawing executed in color. Copies of this patent or patent application publication with color drawing(s) will be provided by the Office upon request and payment of the necessary fee.

The included drawings are for illustrative purposes and serve only to provide examples of possible structures and operations for the disclosed inventive systems, apparatus, methods and computer program products for novel view rendering. These drawings in no way limit any changes in form and detail that may be made by one skilled in the art without departing from the spirit and scope of the disclosed implementations.

Figure 1:
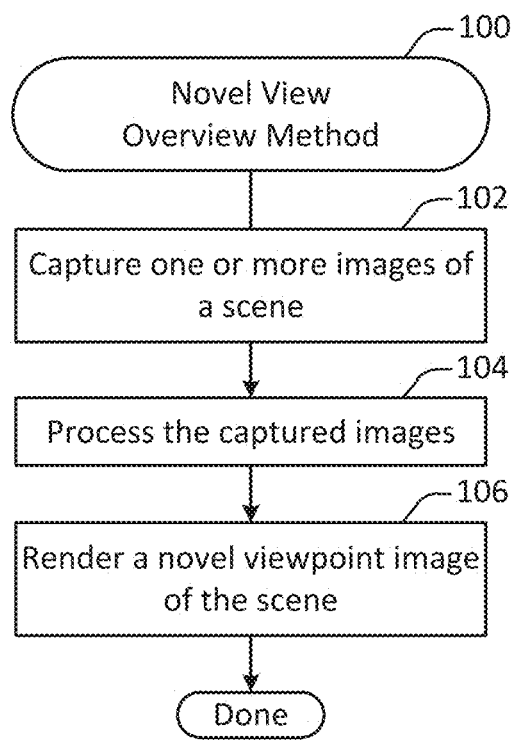
Figure 2:
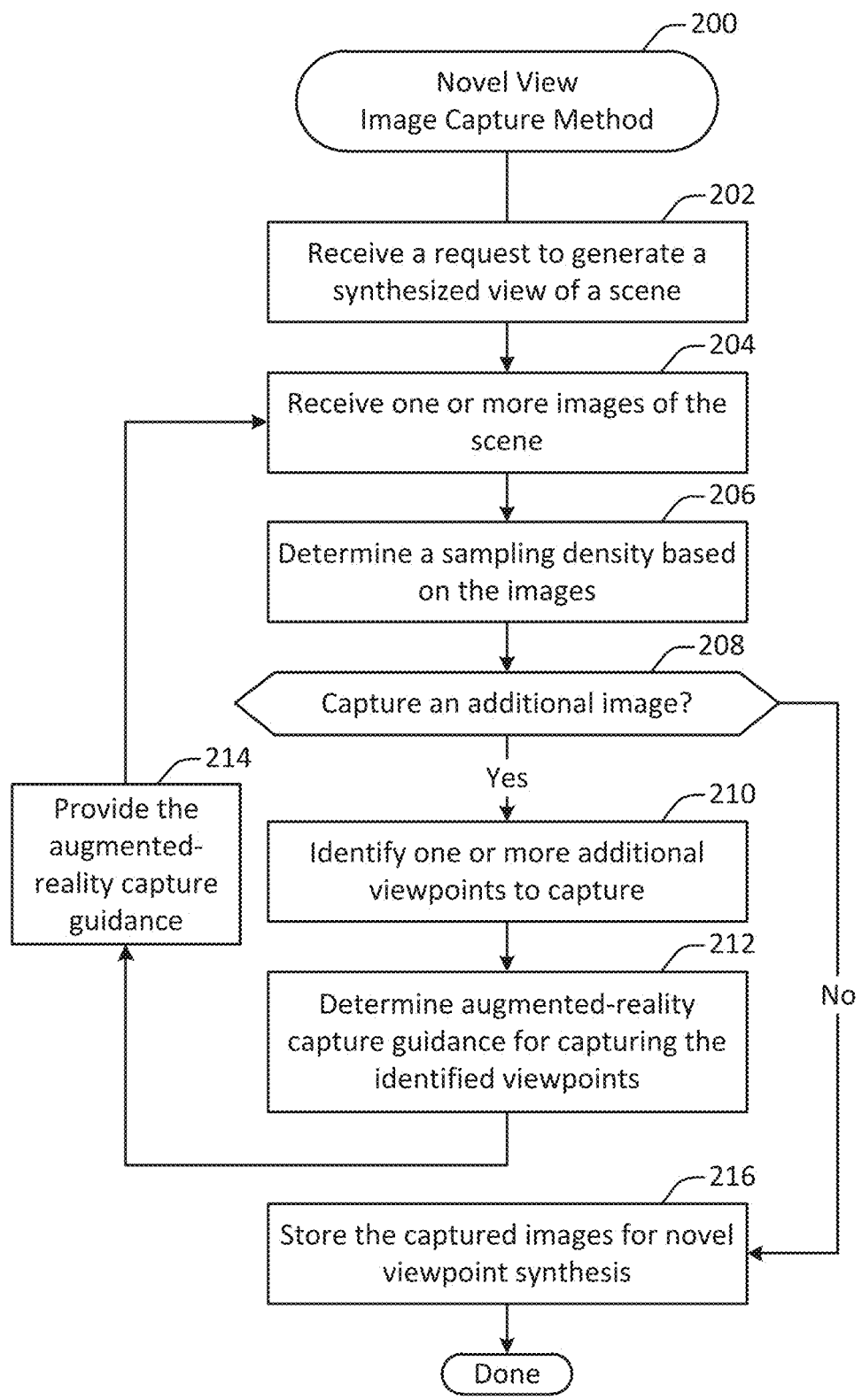

FIG. 1 illustrates an overview method for generating a novel view, performed in accordance with one or more embodiments FIG. 2 illustrates a method for capturing images for generating a novel view, performed in accordance with one or more embodiments.

Figure 3:
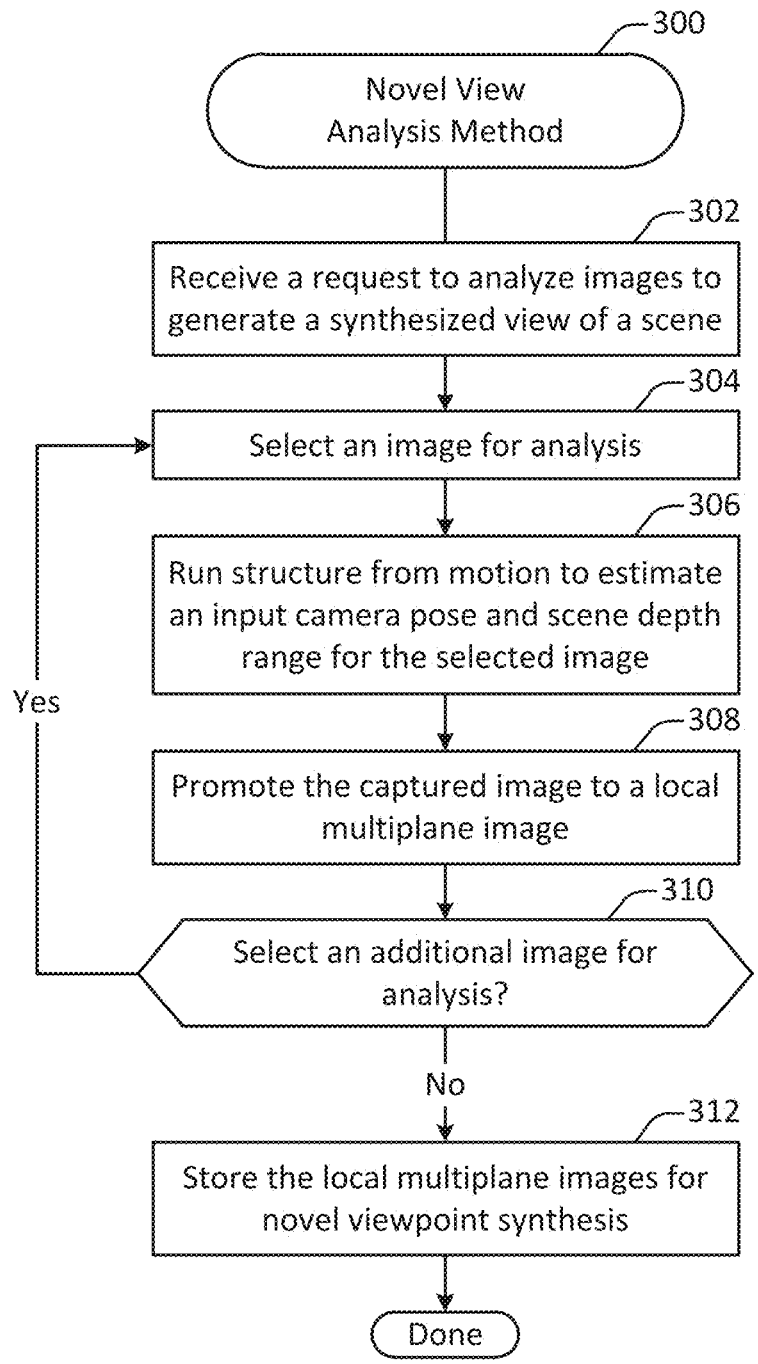

FIG. 3 illustrates a method for novel view analysis, performed in accordance with one or more embodiments.

Figure 4:
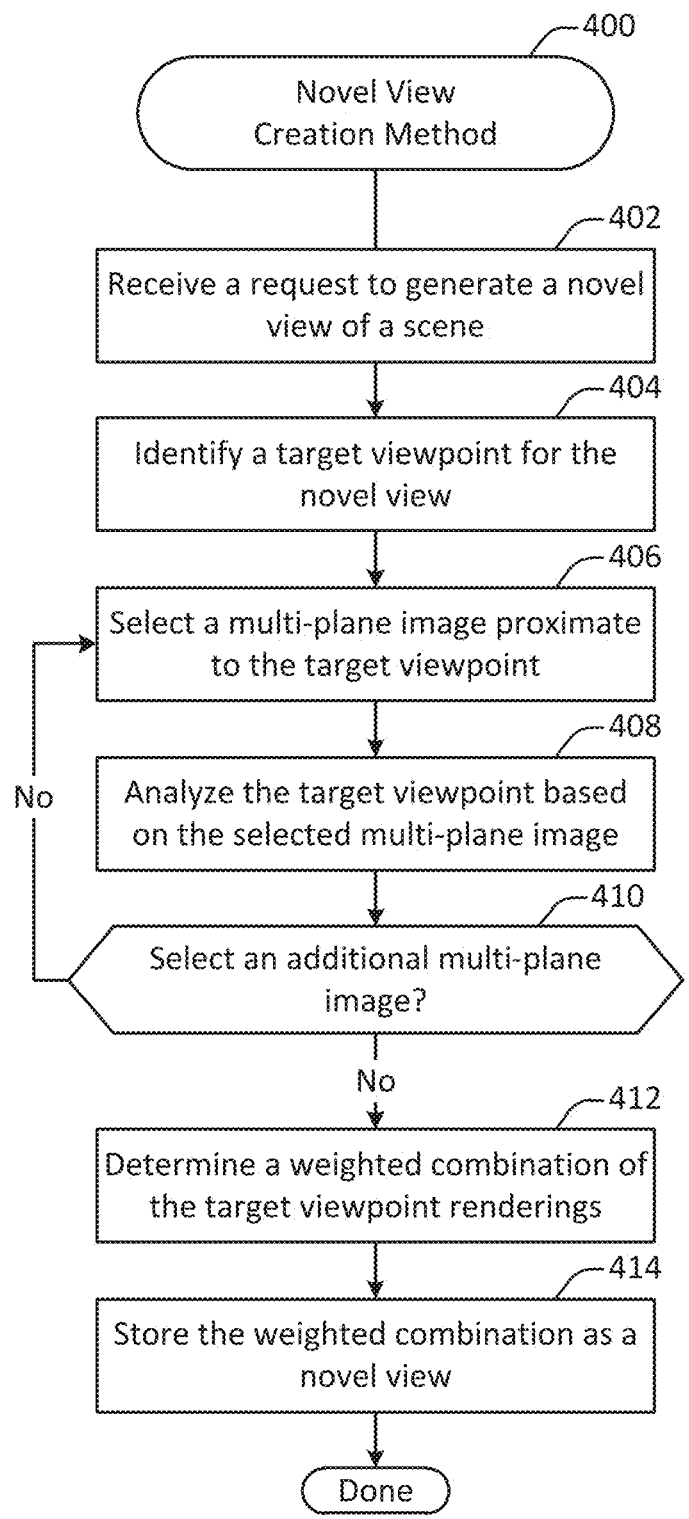

FIG. 4 illustrates a method for novel view creation, performed in accordance with one or more embodiments.

Figure 5:
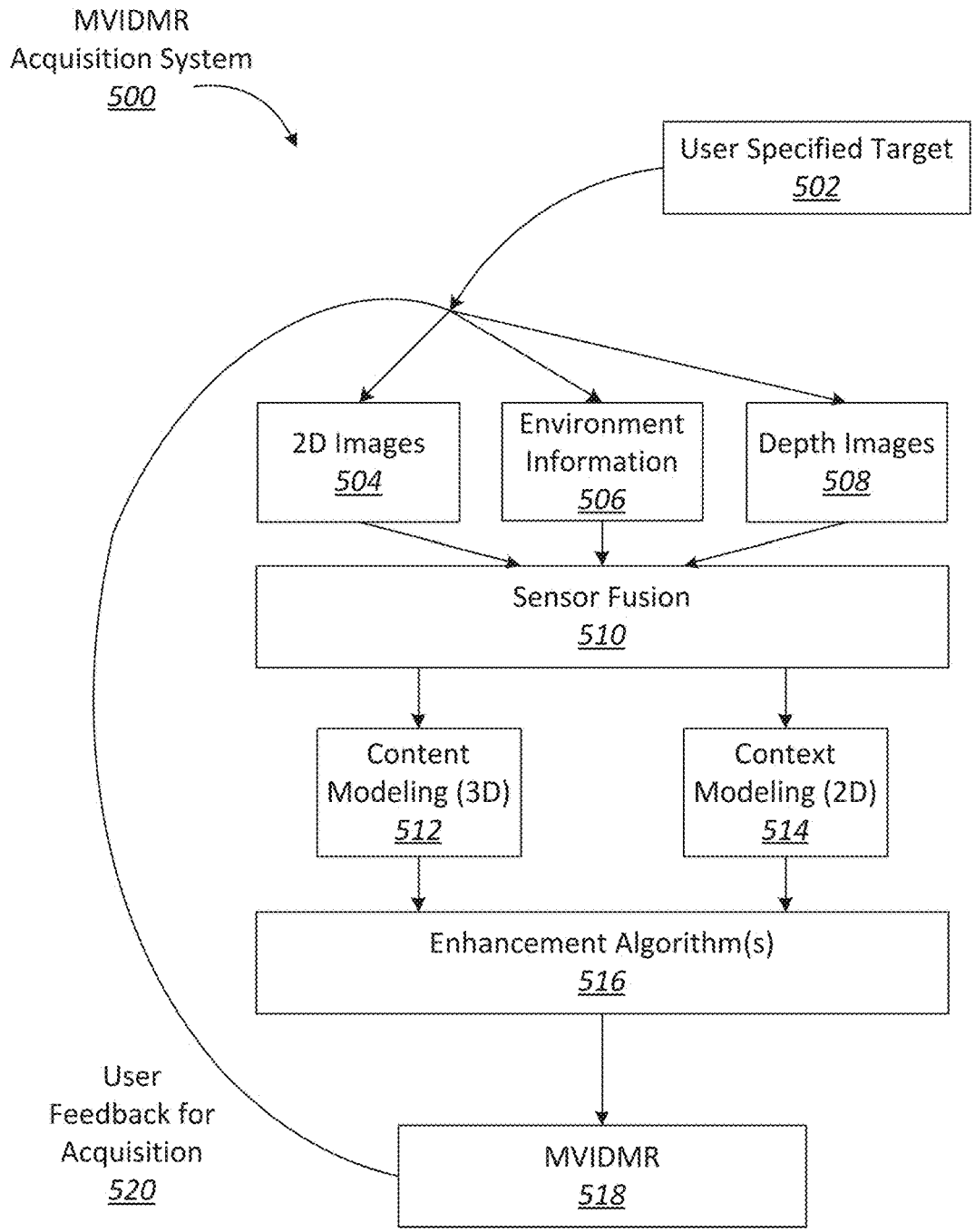

FIG. 5 illustrates an example of a surround view acquisition system.

Figure 6:
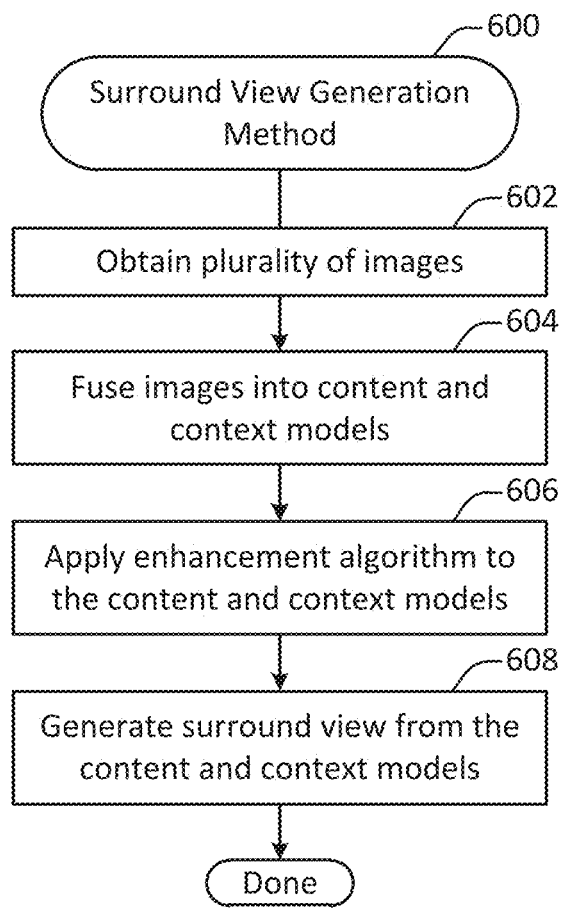

FIG. 6 illustrates an example of a process flow for generating a surround view.

Figure 7:
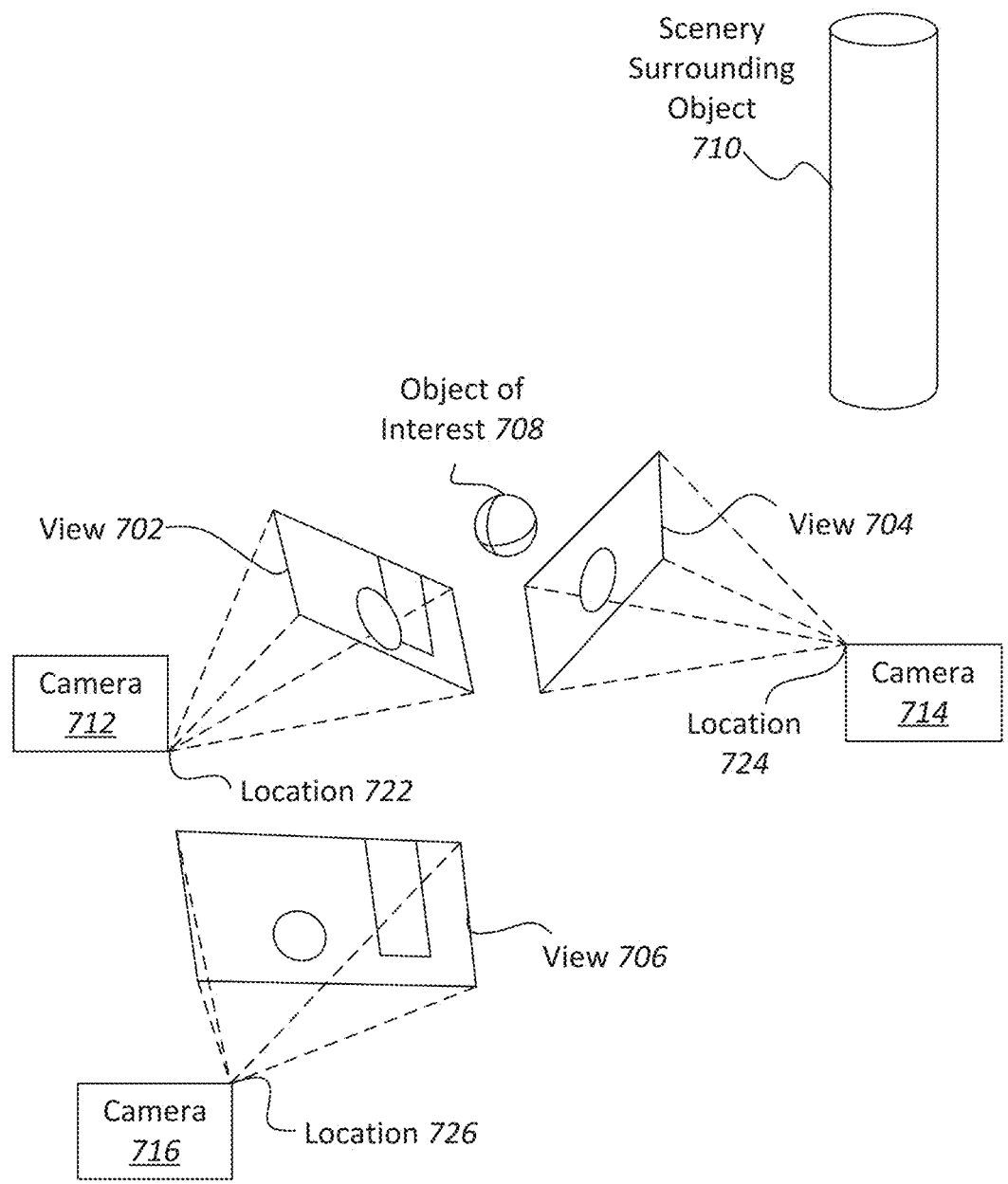

FIG. 7 illustrates one example of multiple camera views that can be fused into a three-dimensional (3D) model to create an immersive experience.

Figure 8:
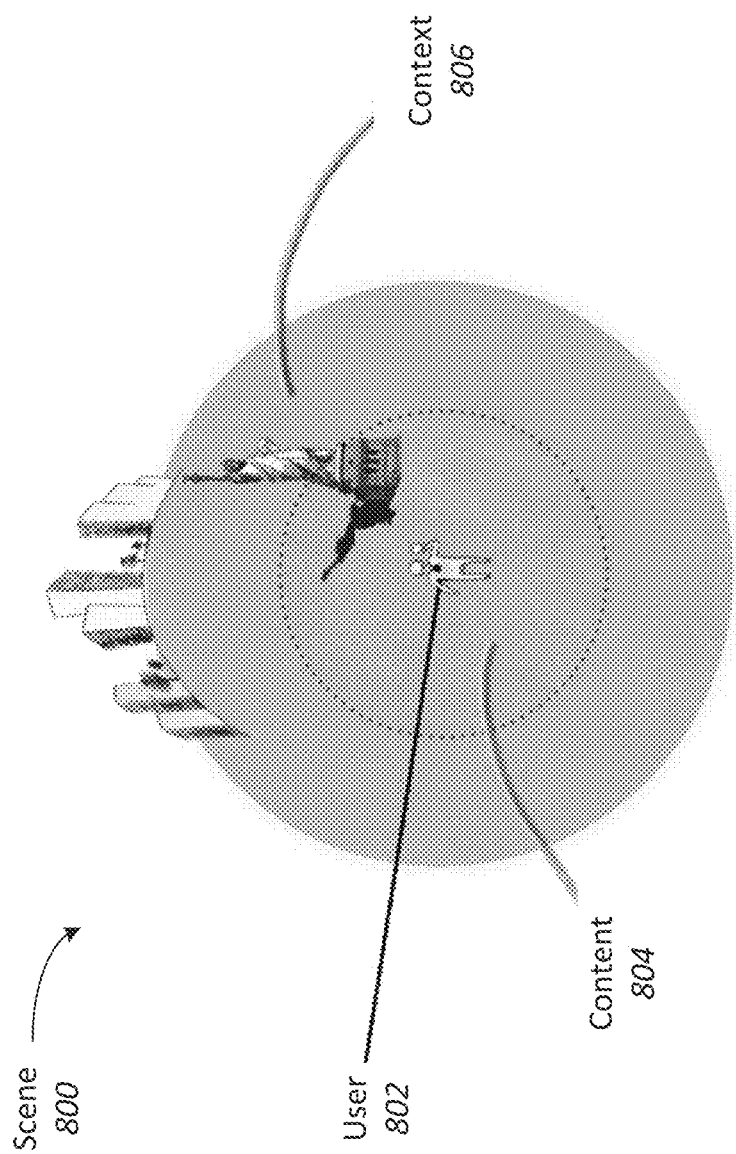

FIG. 8 illustrates one example of separation of content and context in a surround view.

Figures 9A, 9B:
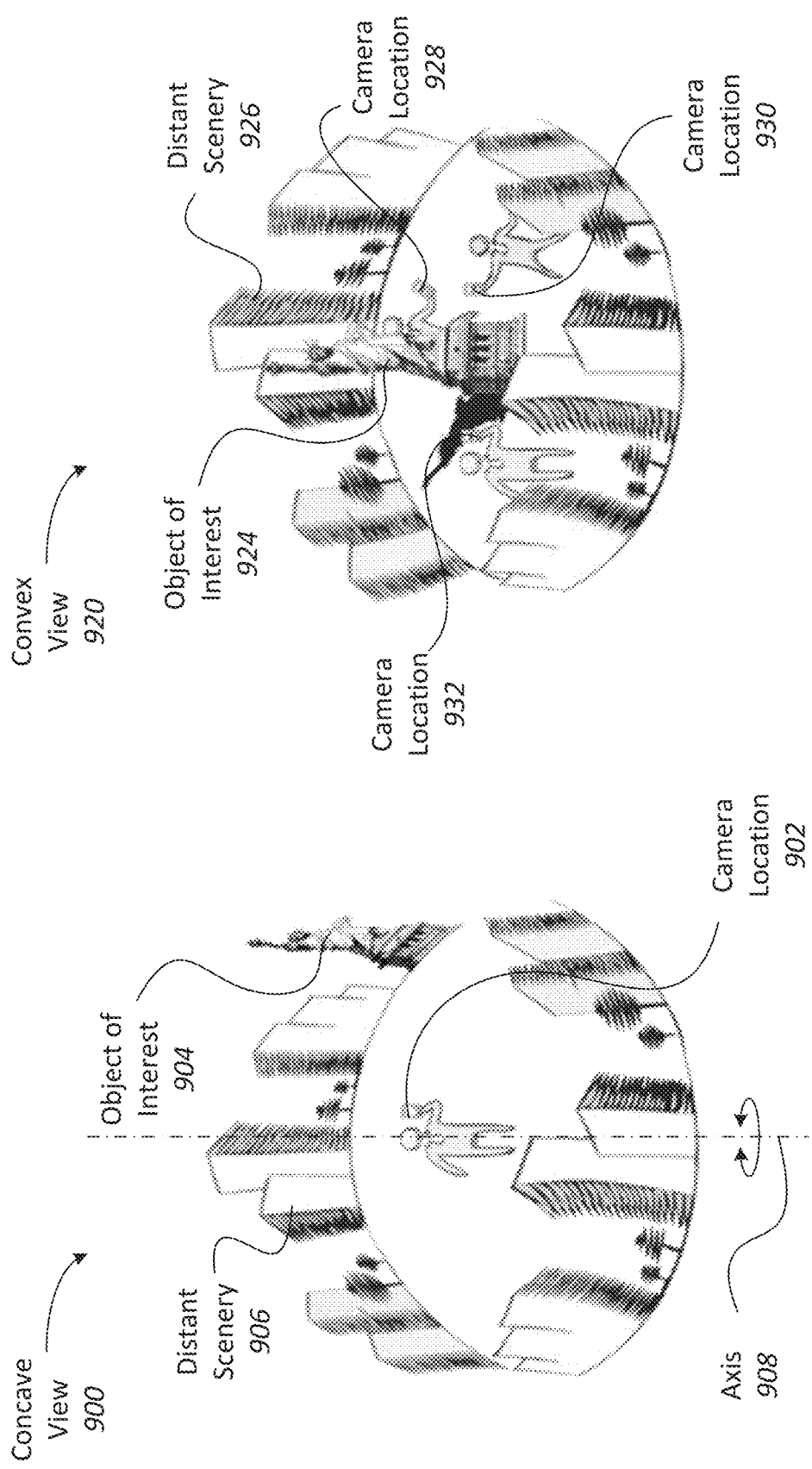

FIGS. 9A-9B illustrate examples of concave view and convex views, respectively, where both views use a back-camera capture style.

Figure 10A:
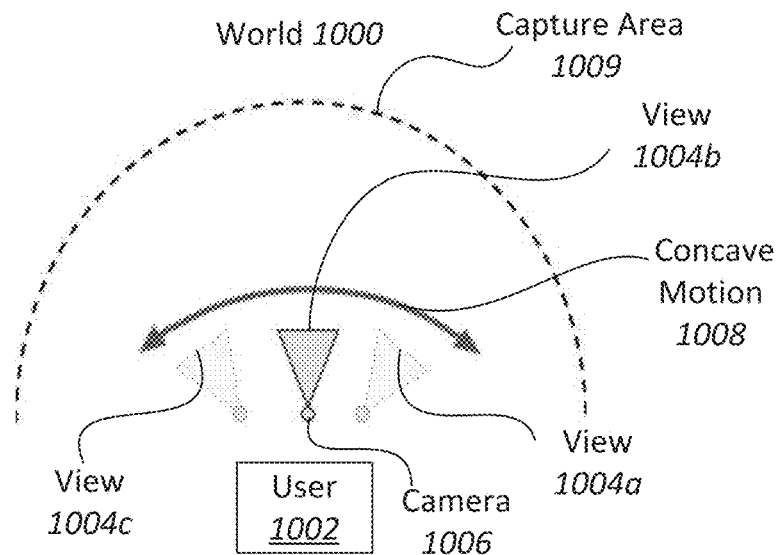
Figure 10B:
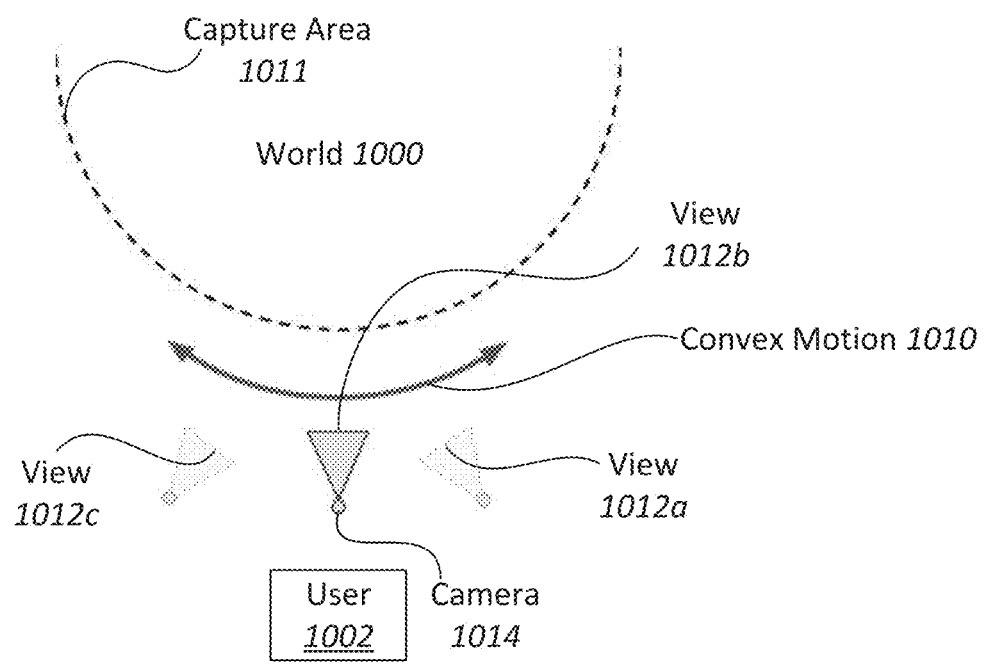

FIGS. 10A-10B illustrate examples of various capture modes for surround views.

Figure 11A:
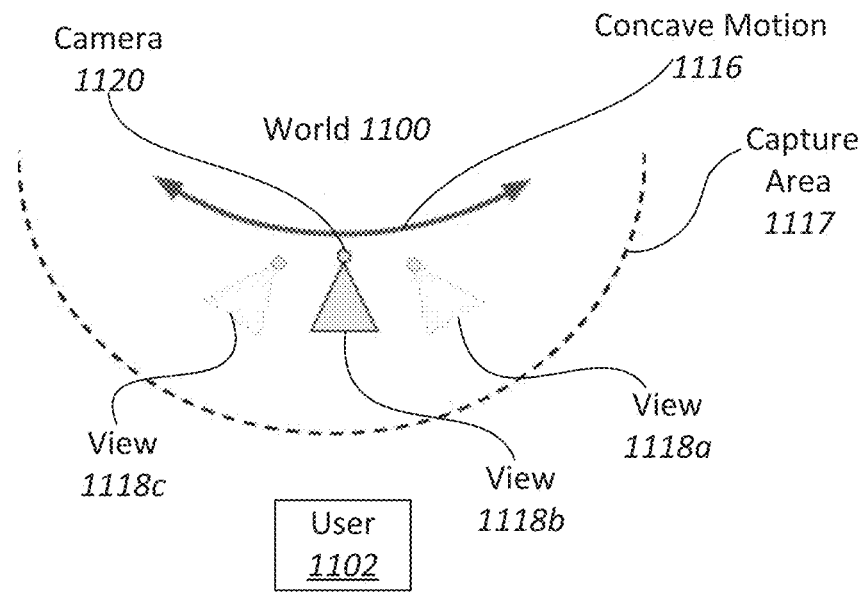
Figure 11B:
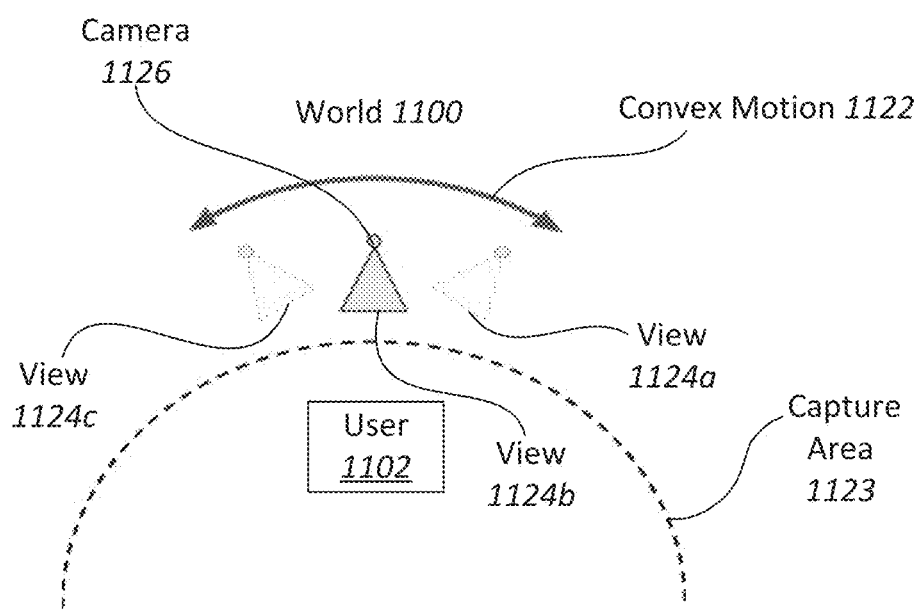

FIGS. 11A-11B illustrate examples of various capture modes for surround views.

Figure 12:
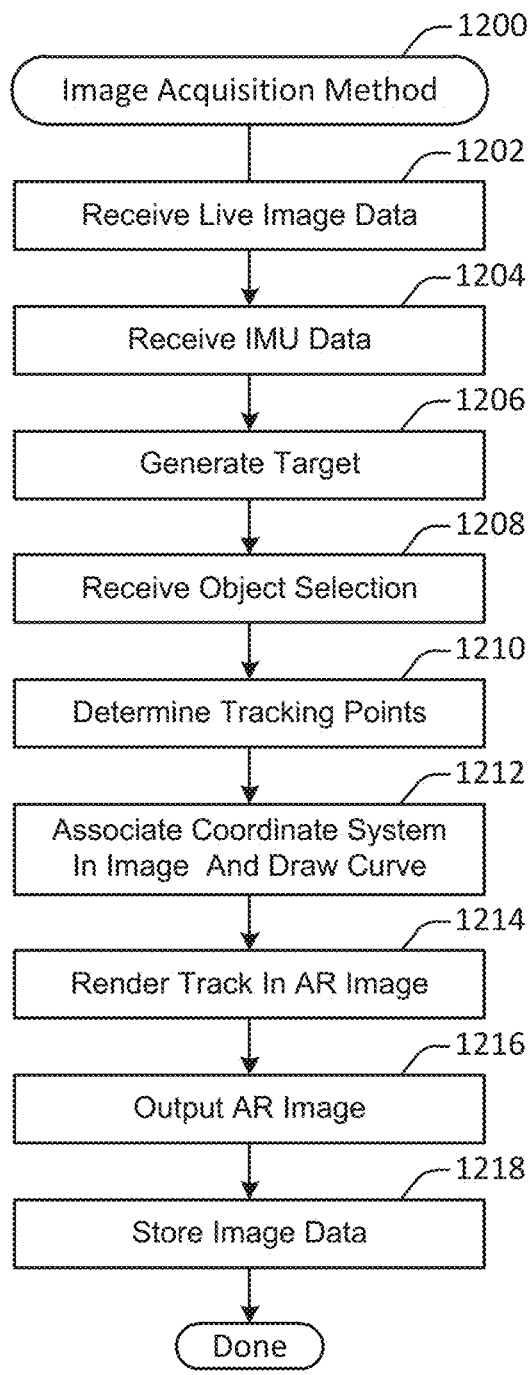

FIG. 12 illustrates an example of a process flow for capturing images in a surround view using augmented reality.

Figure 13:
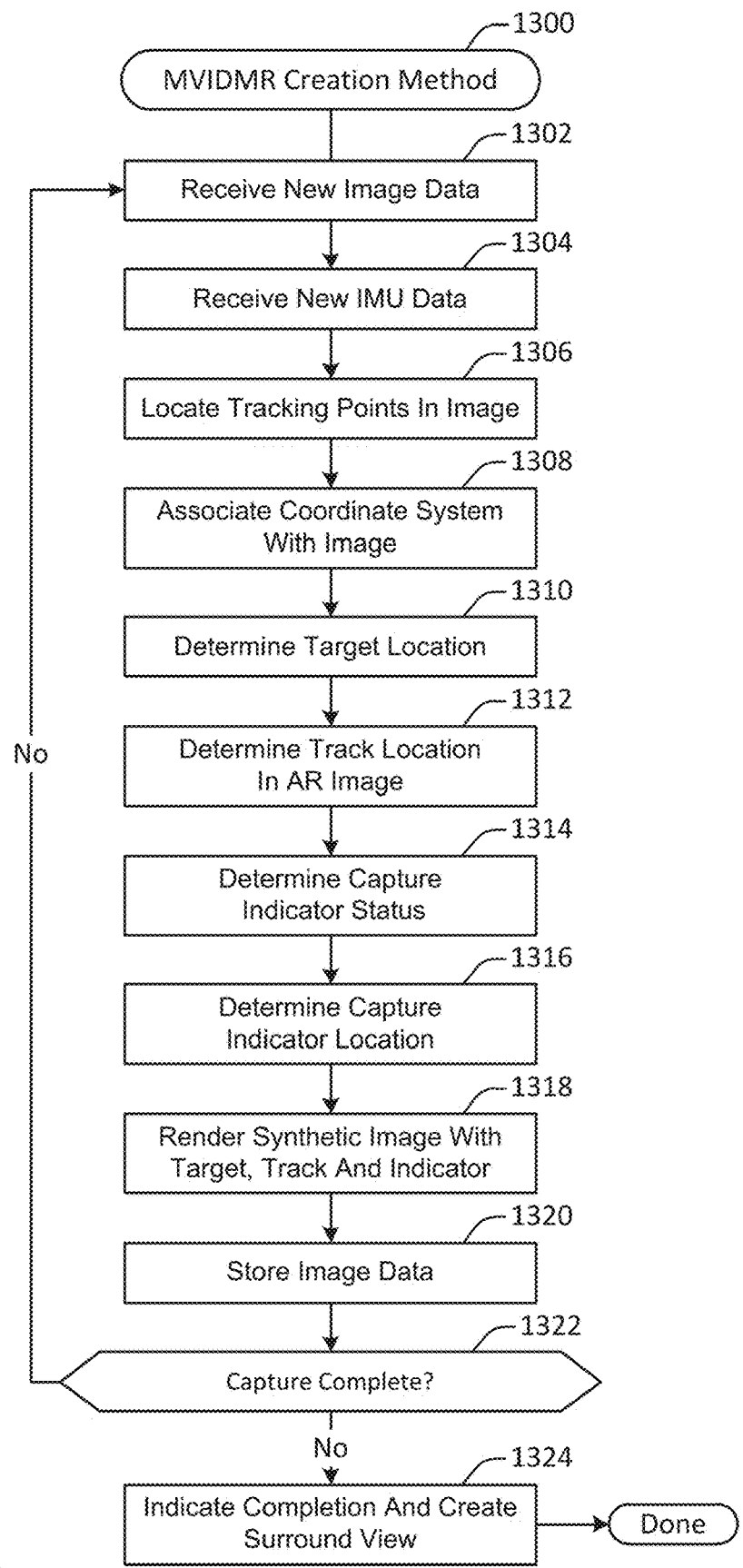

FIG. 13 illustrates an example of a process flow for capturing images in a surround view using augmented reality.

Figure 14A:
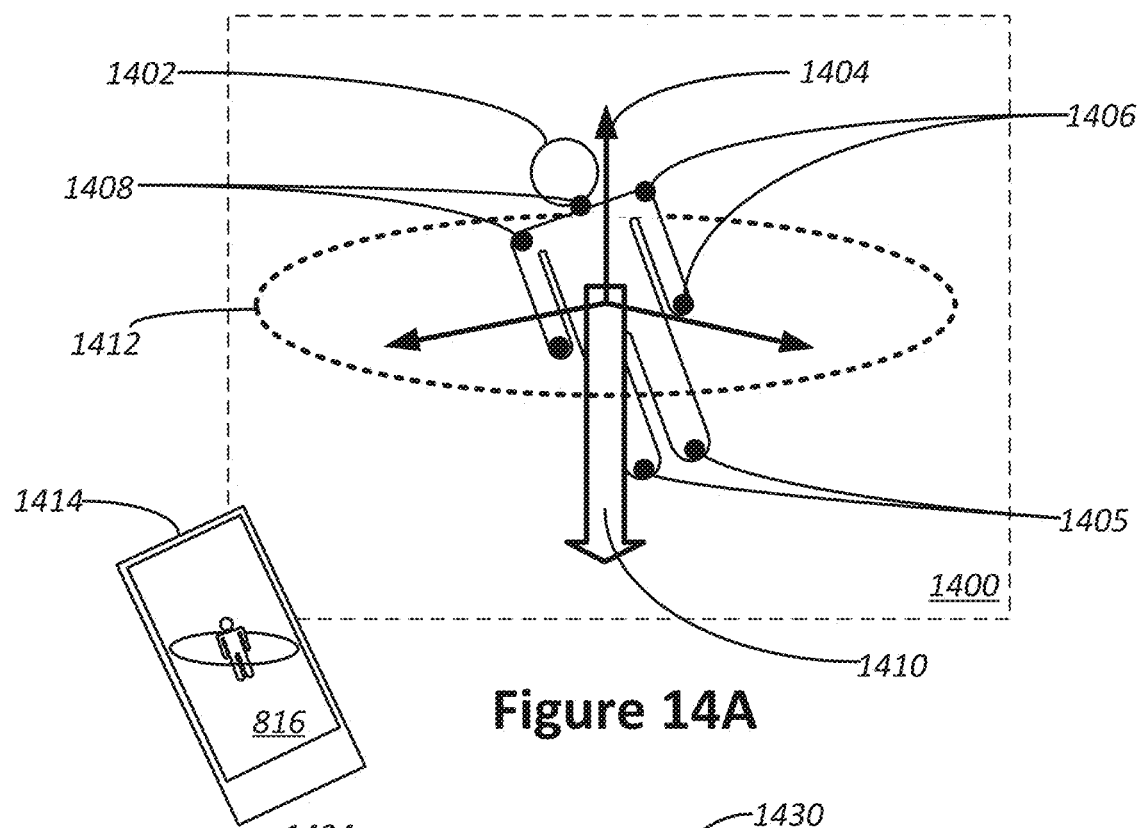
Figure 14B:
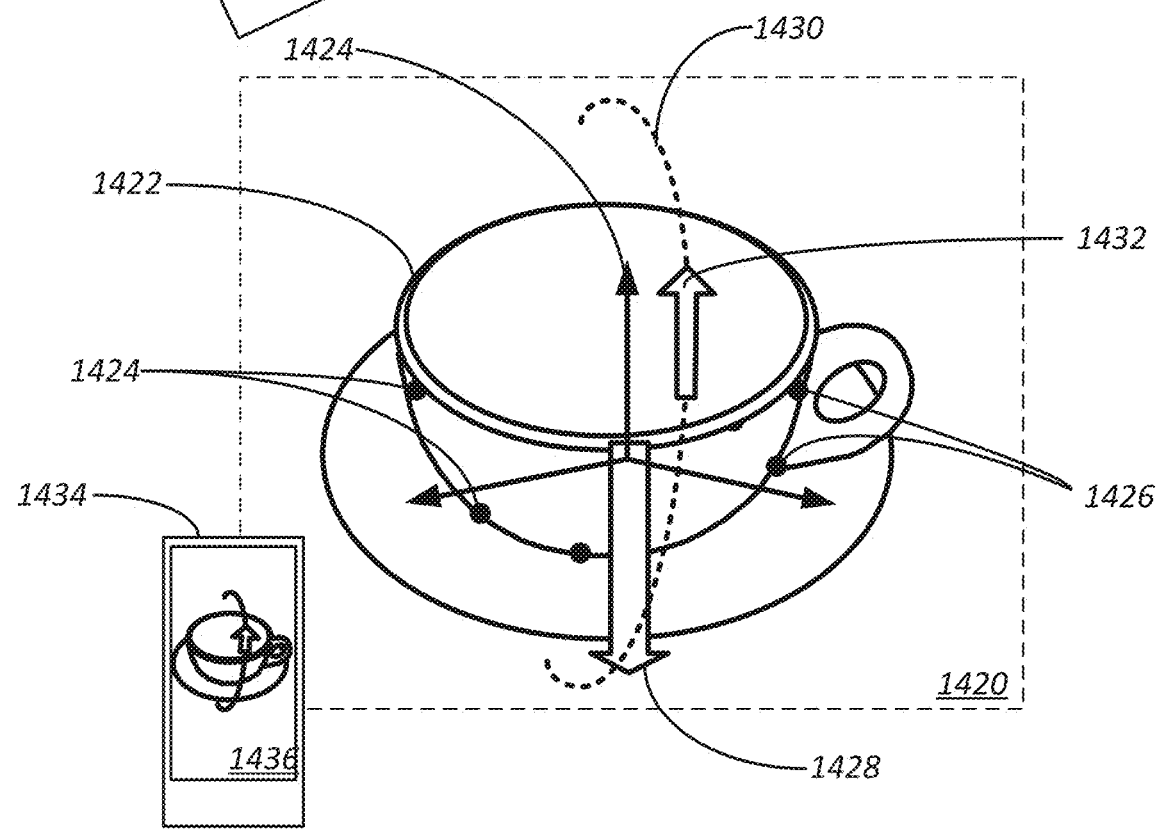

FIGS. 14A and 14B illustrate examples of generating an Augmented Reality (AR) image capture track for capturing images used in a surround view.

Figure 15:
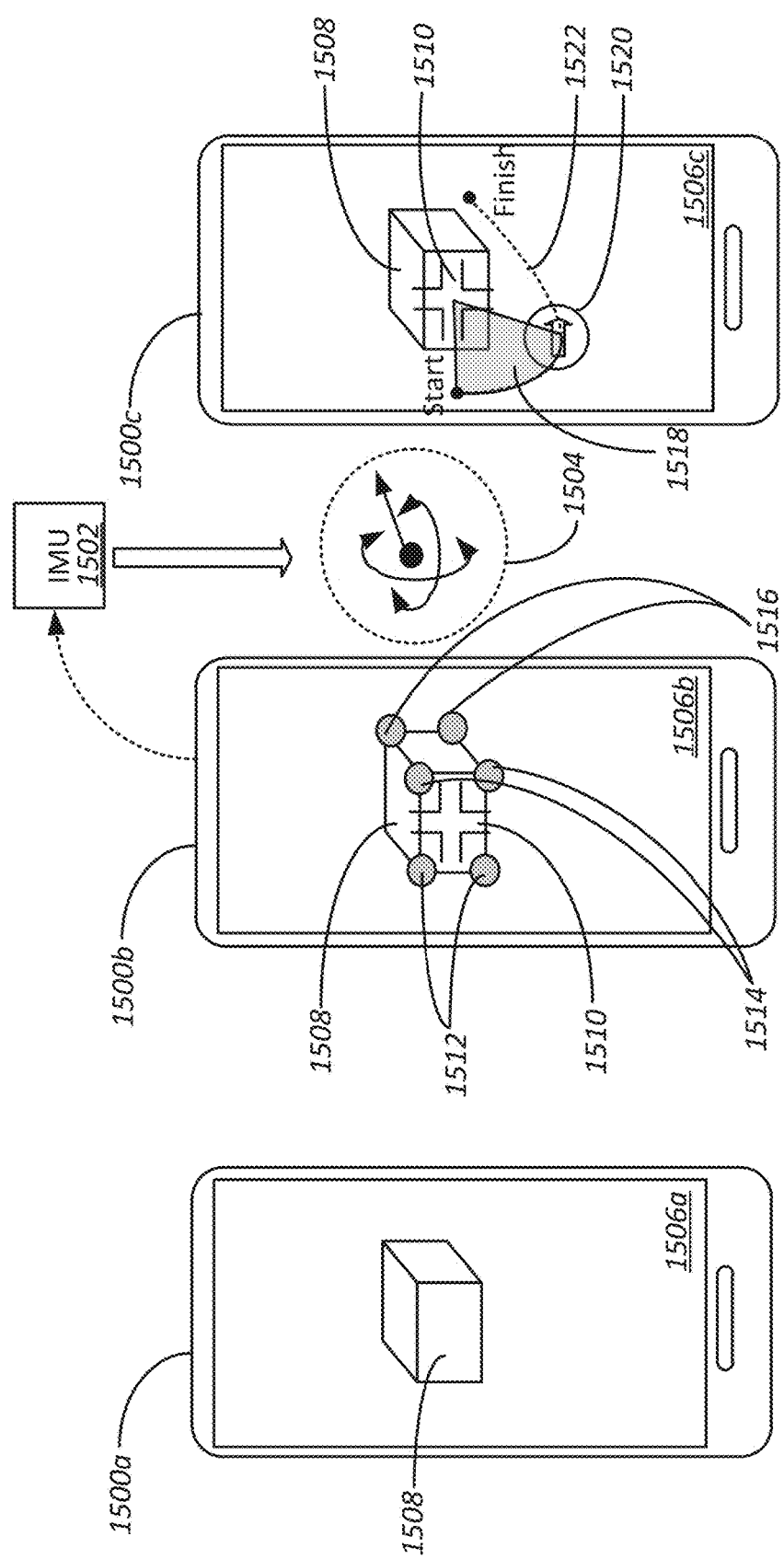

FIG. 15 illustrates an example of generating an Augmented Reality (AR) image capture track for capturing images used in a surround view on a mobile device.

Figure 16A:
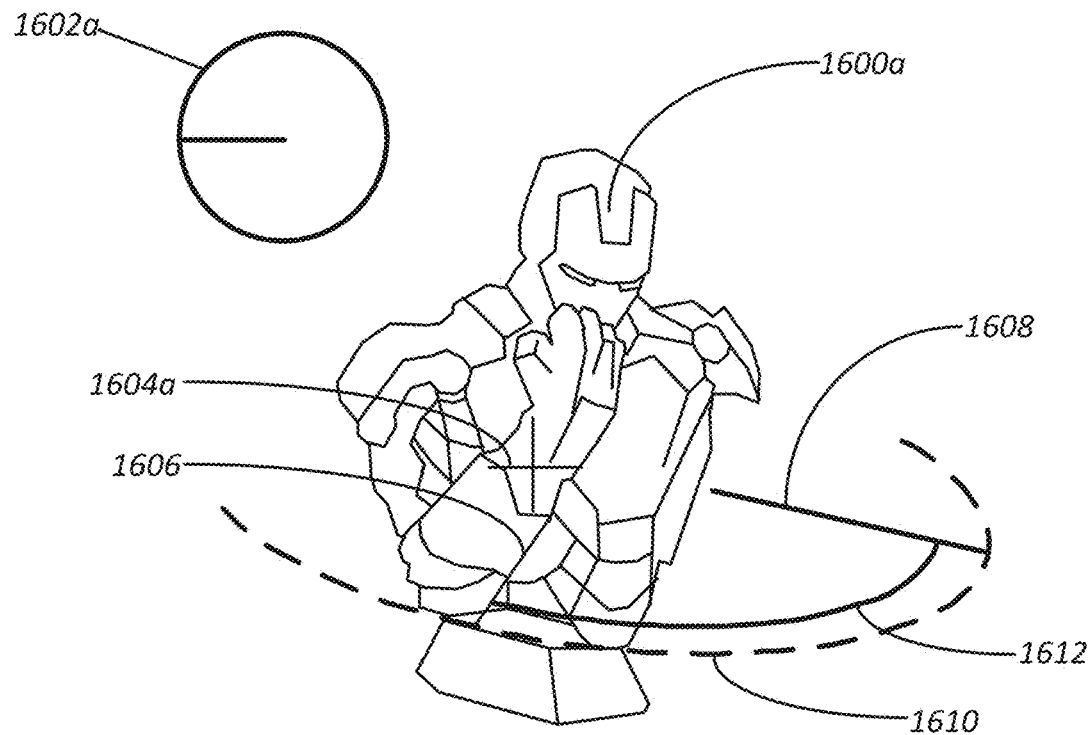
Figure 16B:
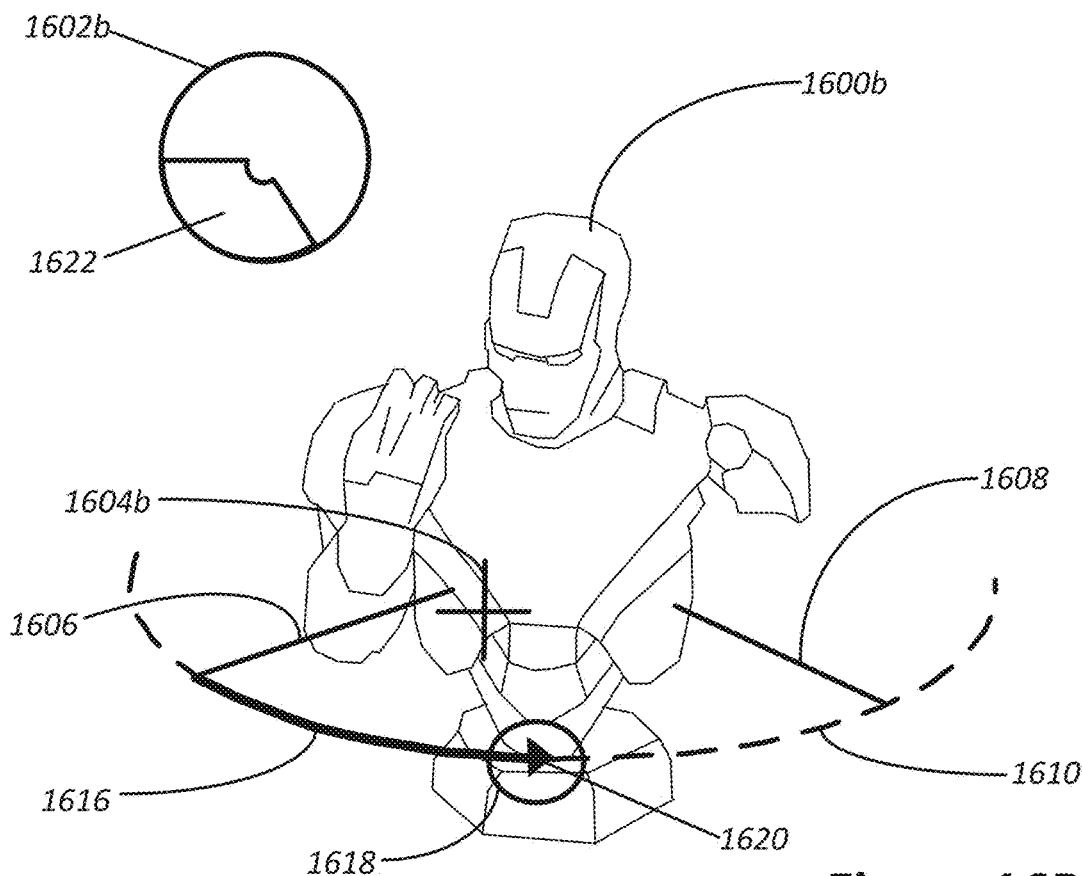

FIGS. 16A and 16B illustrate an example of generating an Augmented Reality (AR) image capture track including status indicators for capturing images used in a surround view.

Figure 17:
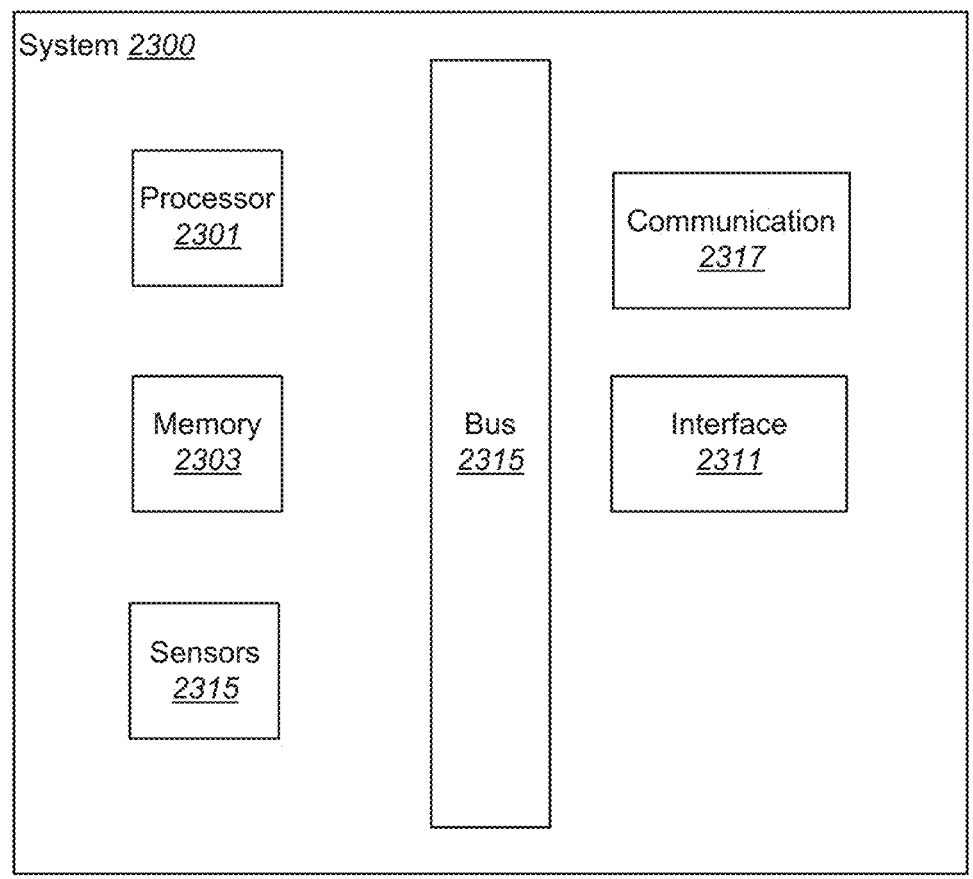

FIG. 17 illustrates a particular example of a computer system configured in accordance with one or more embodiments.

Figure 18:
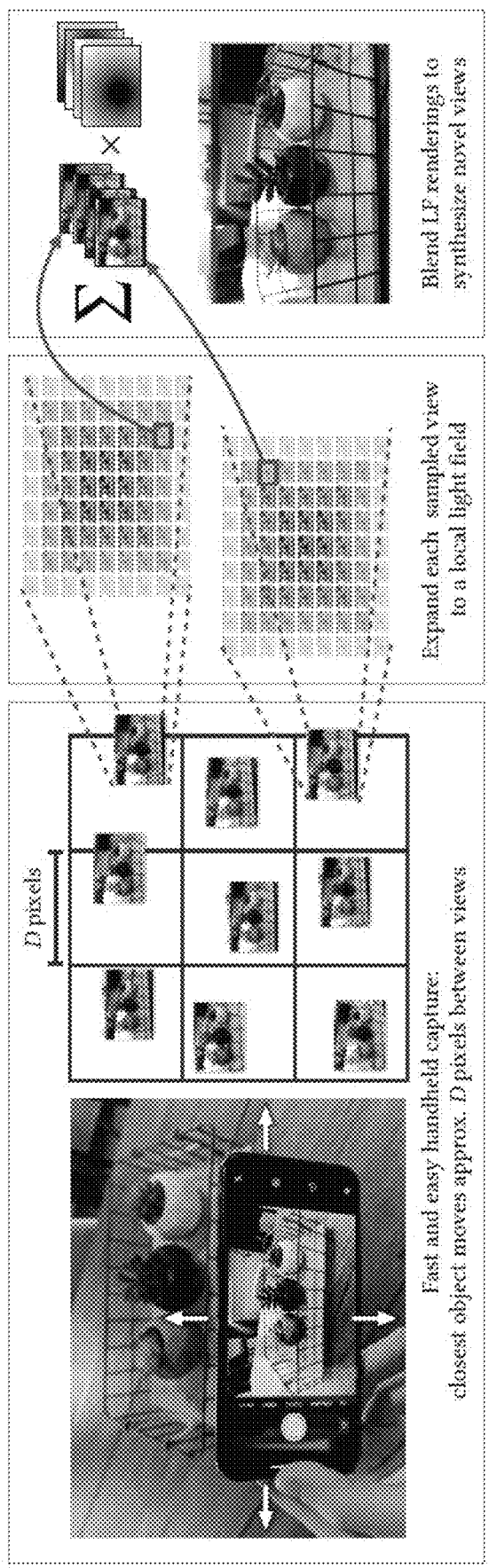

FIG. 18 illustrates an example application of a process for synthesizing one or more novel views, performed in accordance with one or more embodiments.

Figure 19:
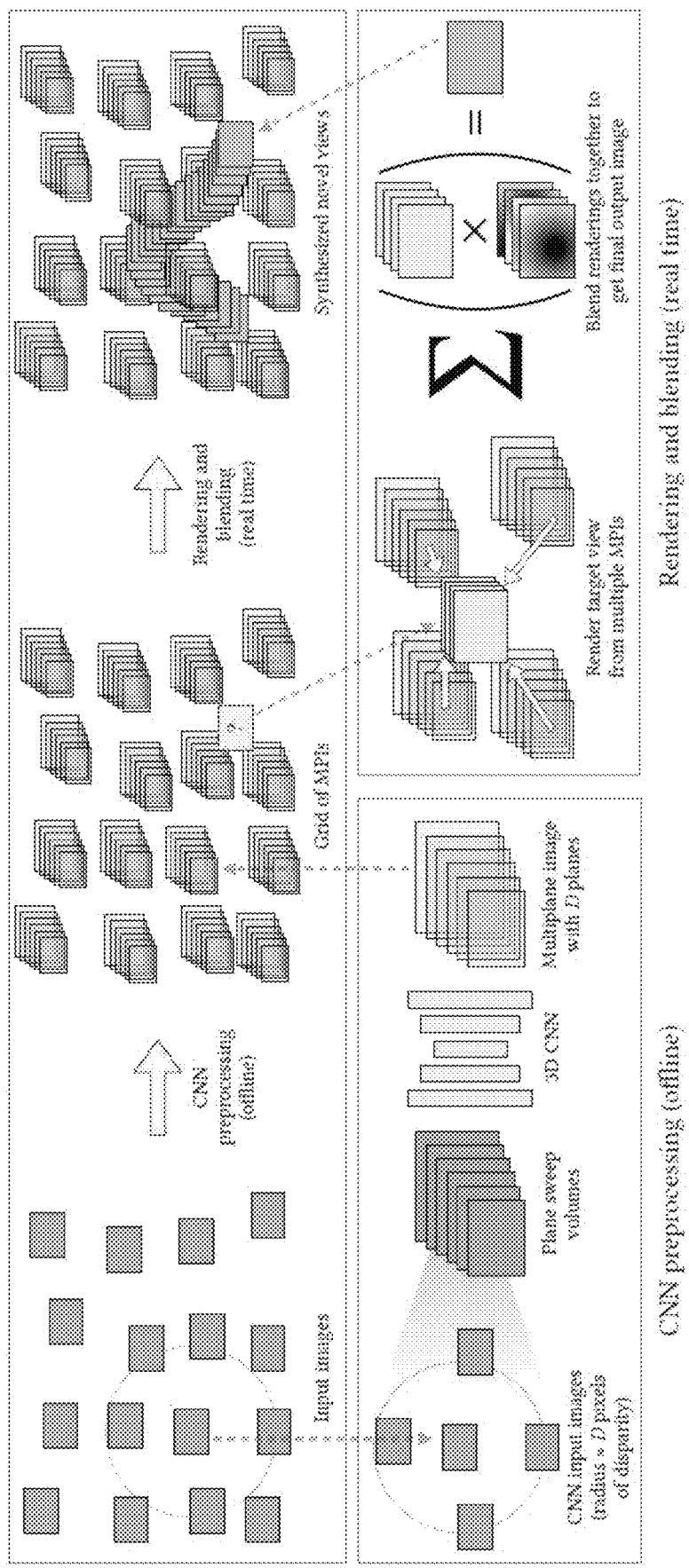

FIG. 19 illustrates a diagram providing an overview of a process for synthesizing one or more novel views, performed in accordance with one or more embodiments.

Figure 20:
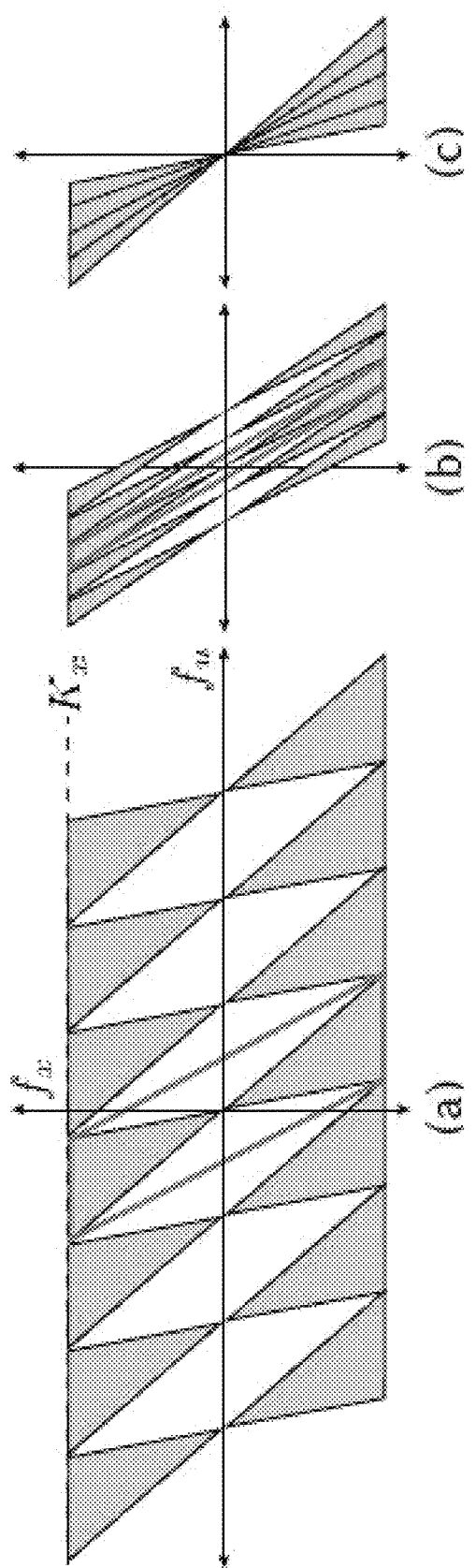

FIG. 20 illustrates a diagram representing traditional plenoptic sampling without occlusions.

Figure 21:
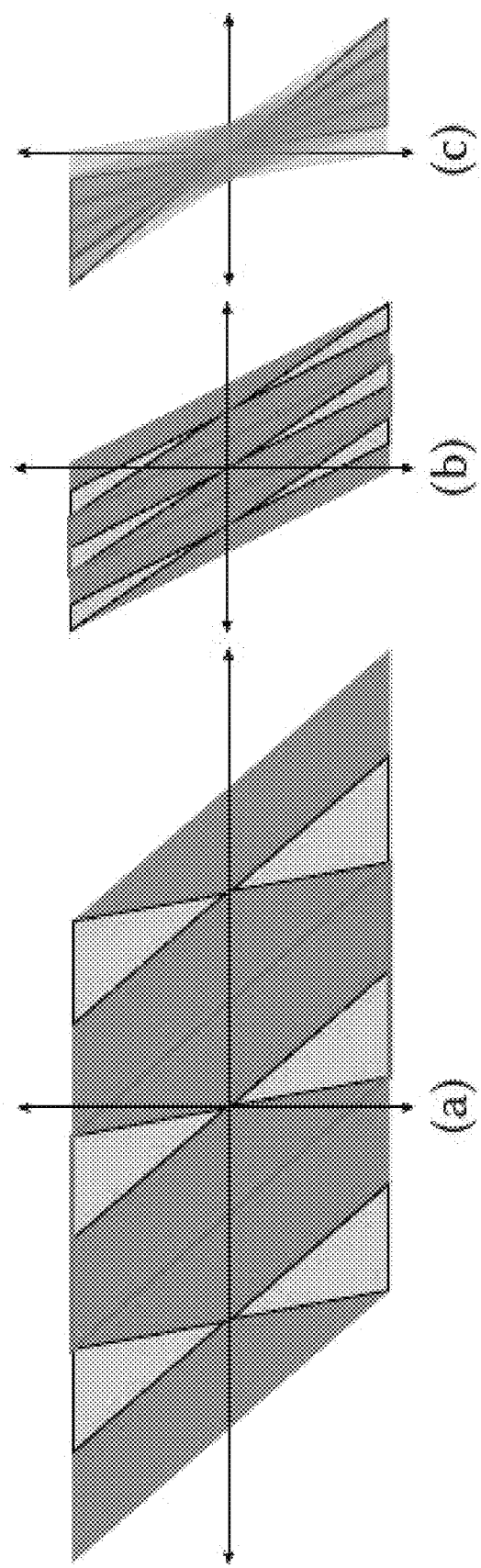

FIG. 21 illustrates a diagram representing traditional plenoptic sampling extended to consider occlusions when reconstructing a continuous light field from MPIs.

Figure 22:
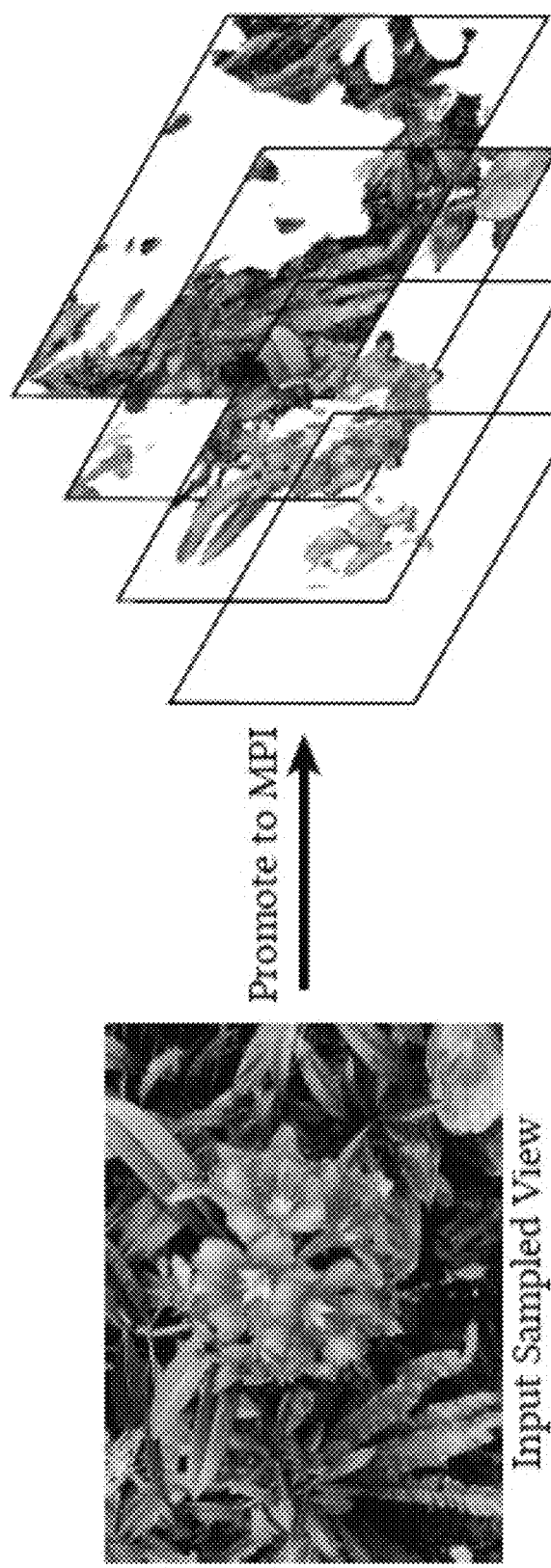

FIG. 22 illustrates a diagram representing the promotion of an input view sample to an MPI scene representation.

Figure 23:
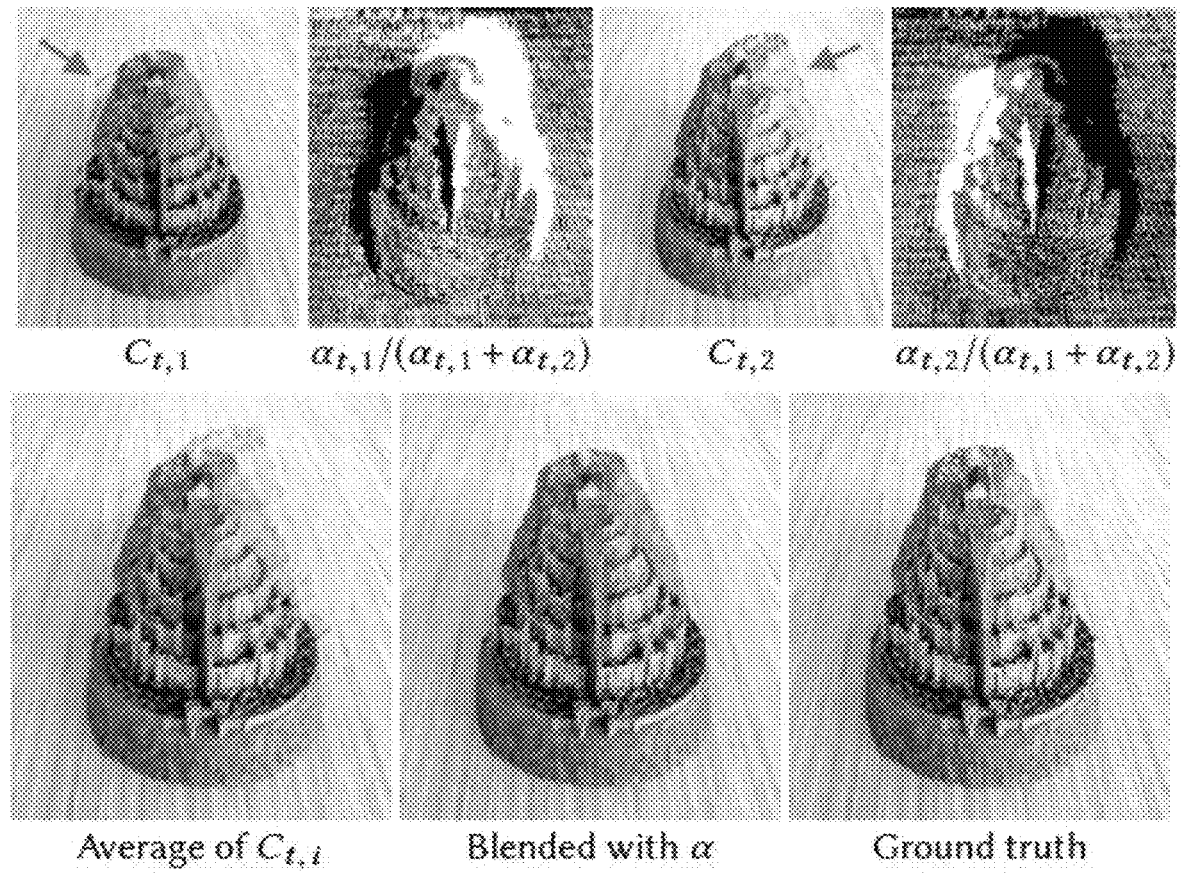

FIG. 23 illustrates an example of different approaches to constructing a novel viewpoint, performed in accordance with one or more embodiments.

Figure 24:
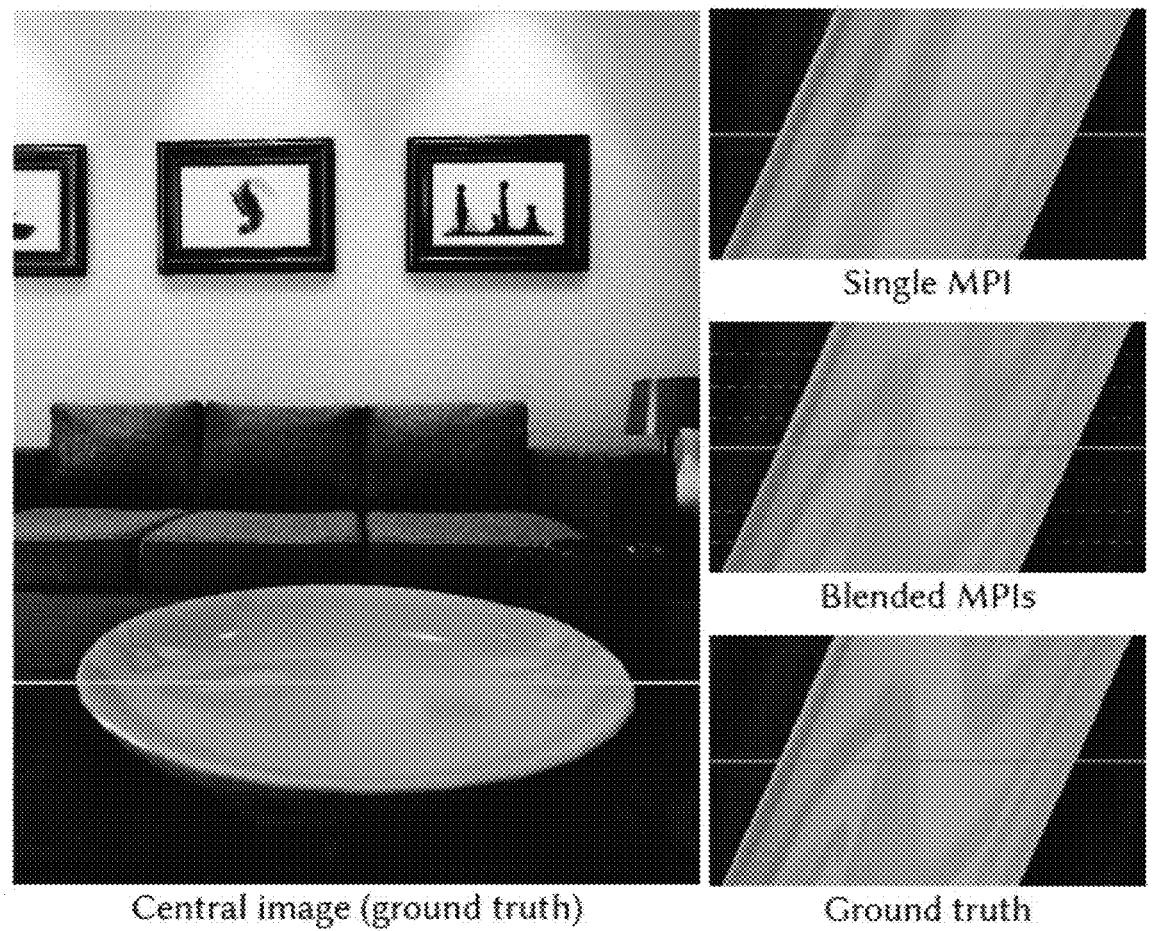

FIG. 24 illustrates an example of different approaches to constructing a novel viewpoint, performed in accordance with one or more embodiments.

Figure 25:
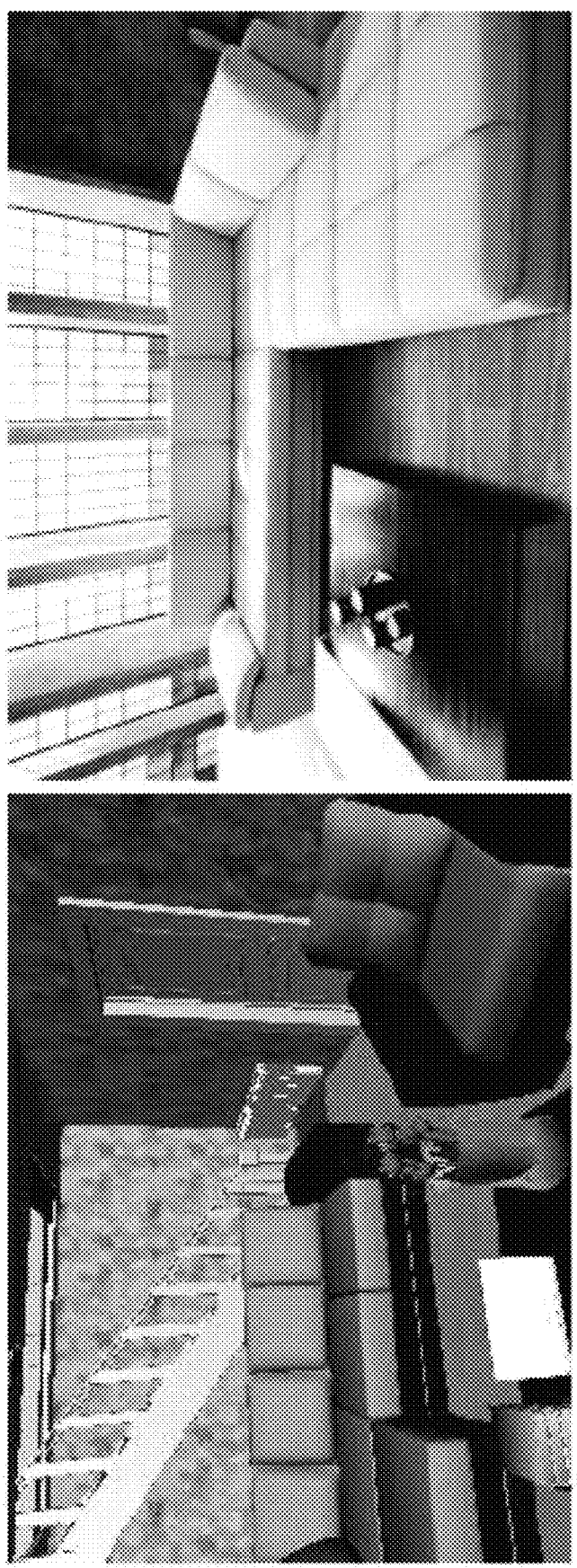

FIG. 25 illustrates example images from a training dataset that may be used to train a neural network in accordance with techniques and mechanisms described herein.

Figure 26:
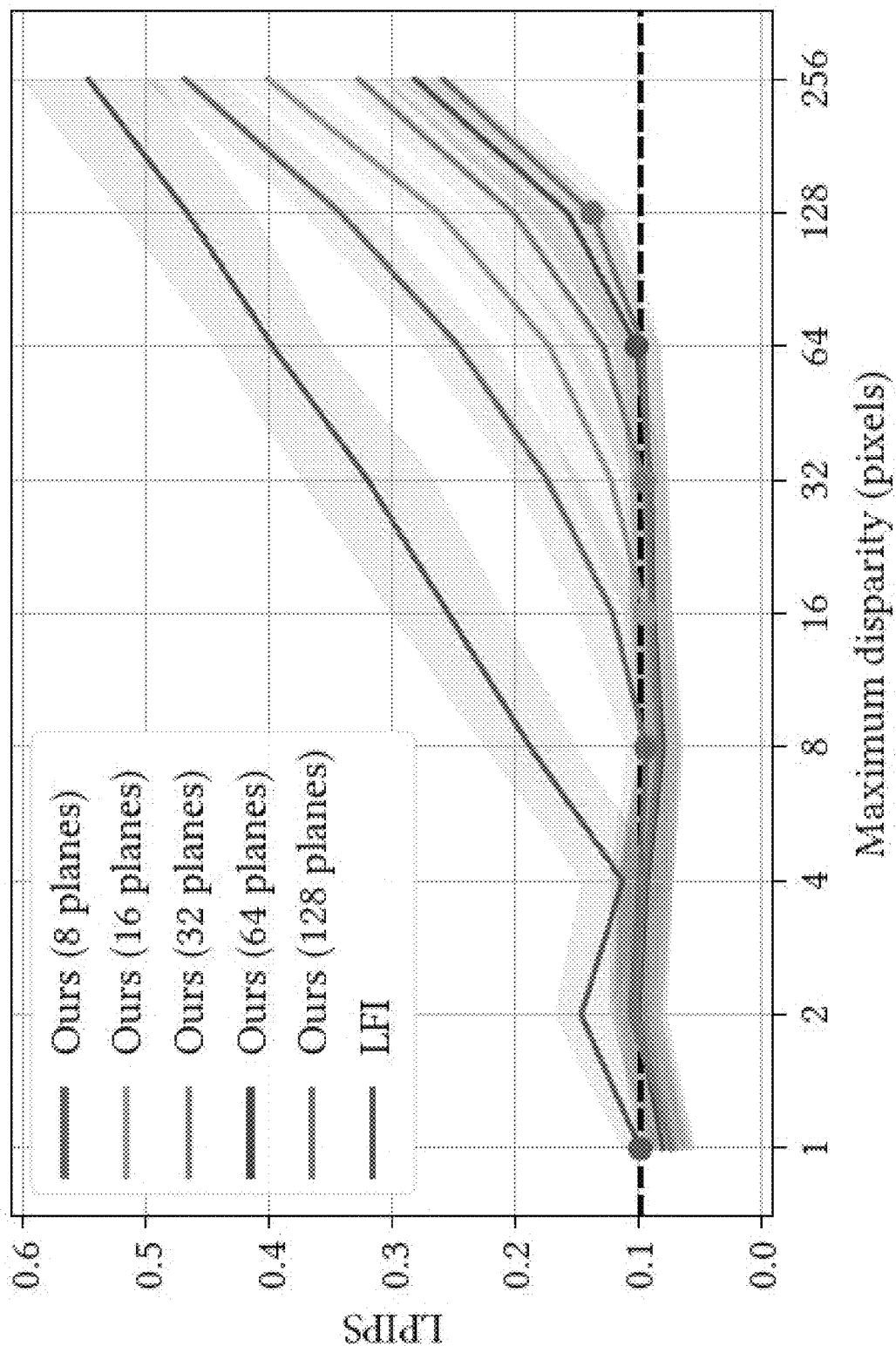

FIG. 26 illustrates a diagram plotting the performance of various techniques and mechanisms.

Figure 27:
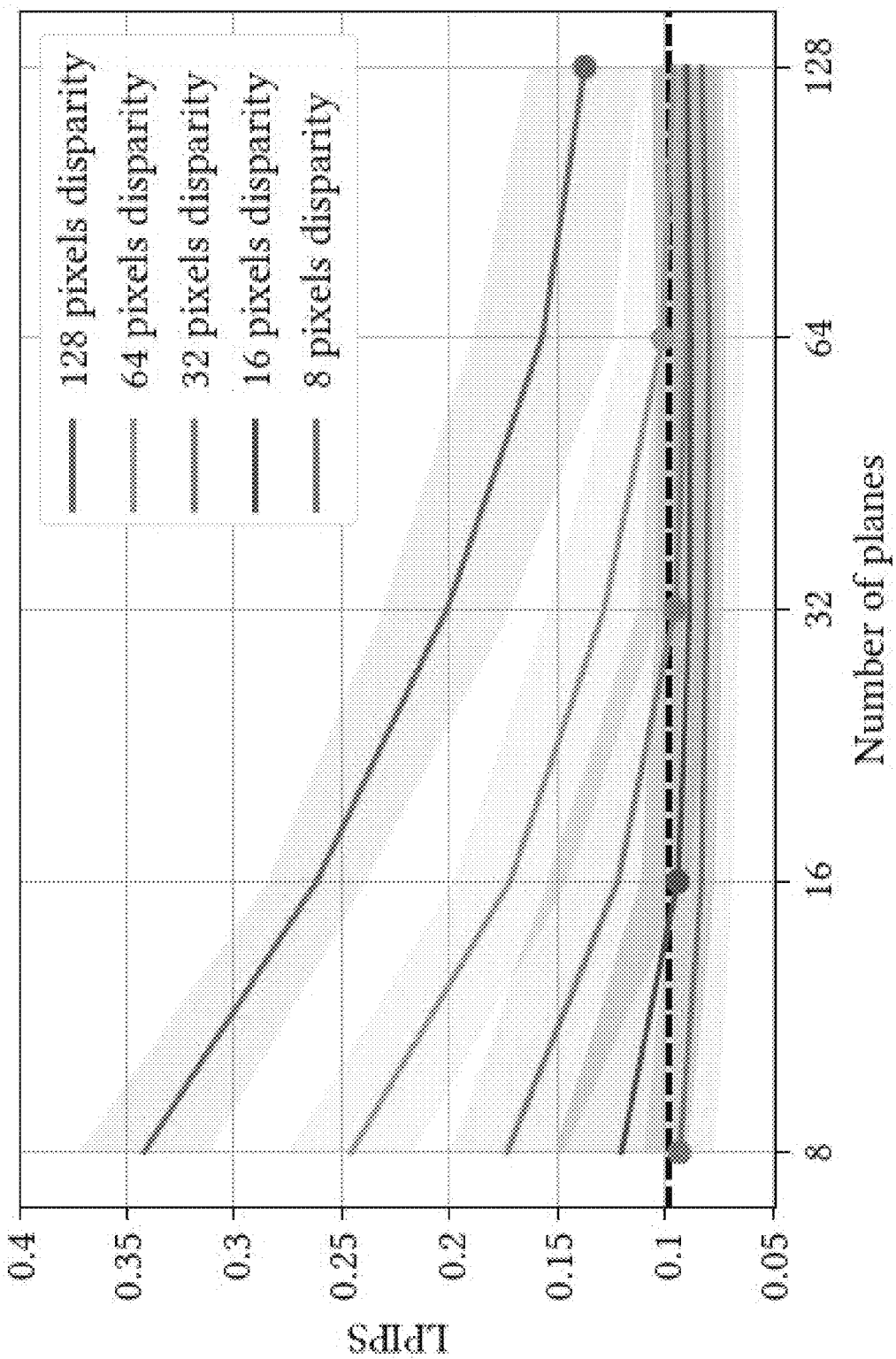

FIG. 27 illustrates a diagram plotting the performance of various techniques and mechanisms.

Figure 28:
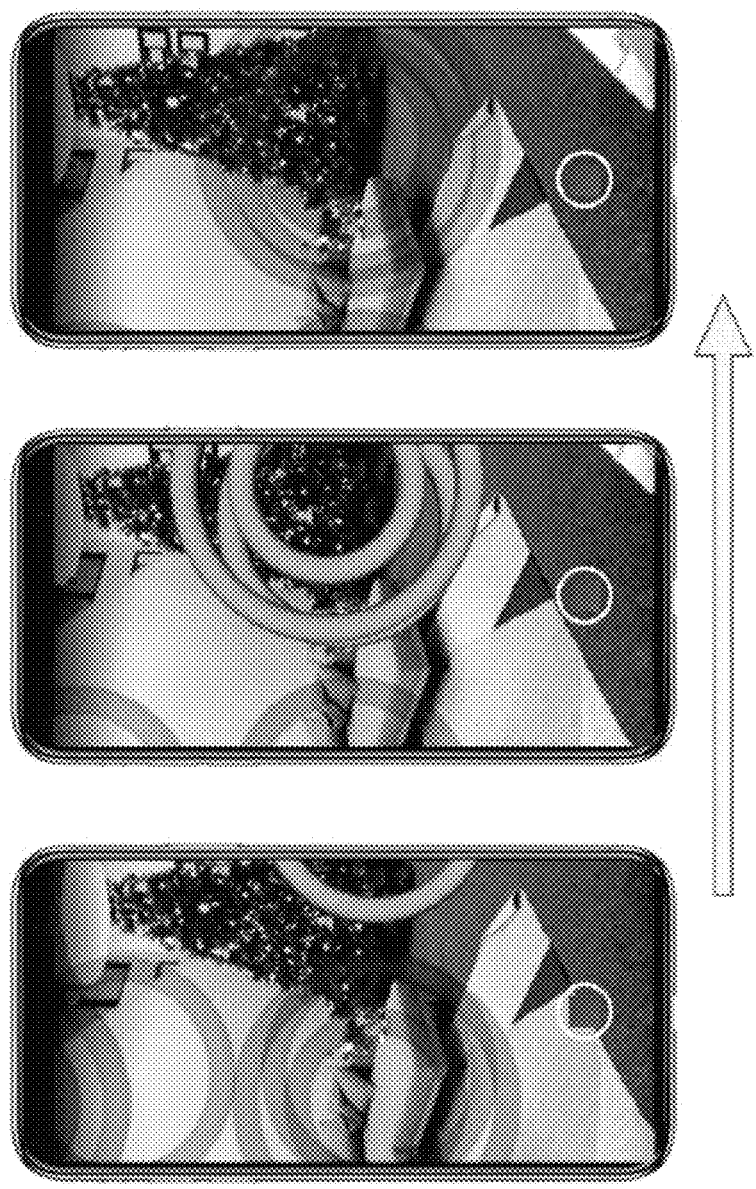

FIG. 28 illustrates an example of how guidance may be provided for the capture of images in accordance with one or more embodiments.

Figure 29:
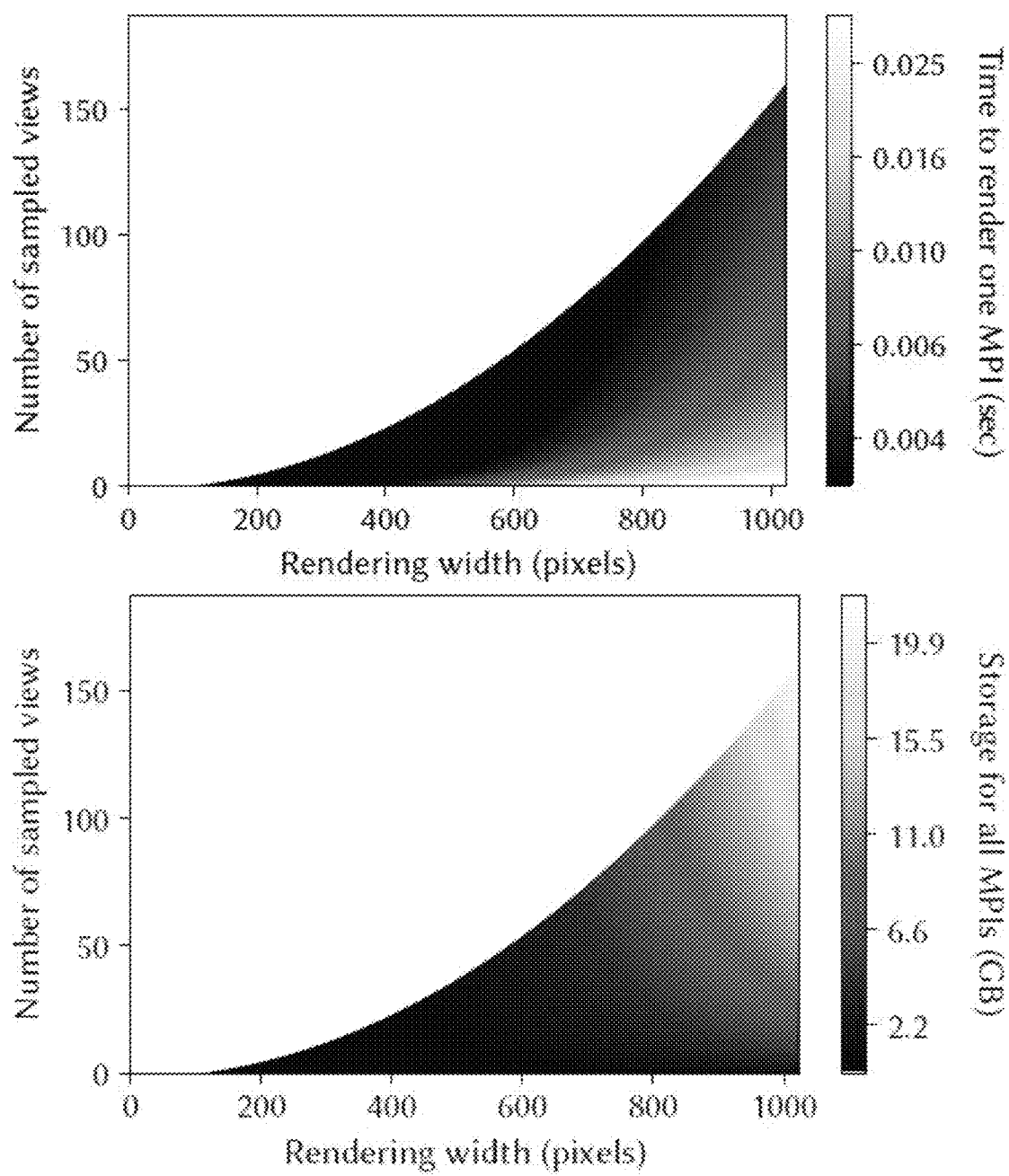

FIG. 29 illustrates a diagram plotting time and storage cost tradeoffs within the space of target rendering resolution and number of sample views that result in Nyquist level perceptual quality, in accordance with one or more embodiments.

Figure 30:
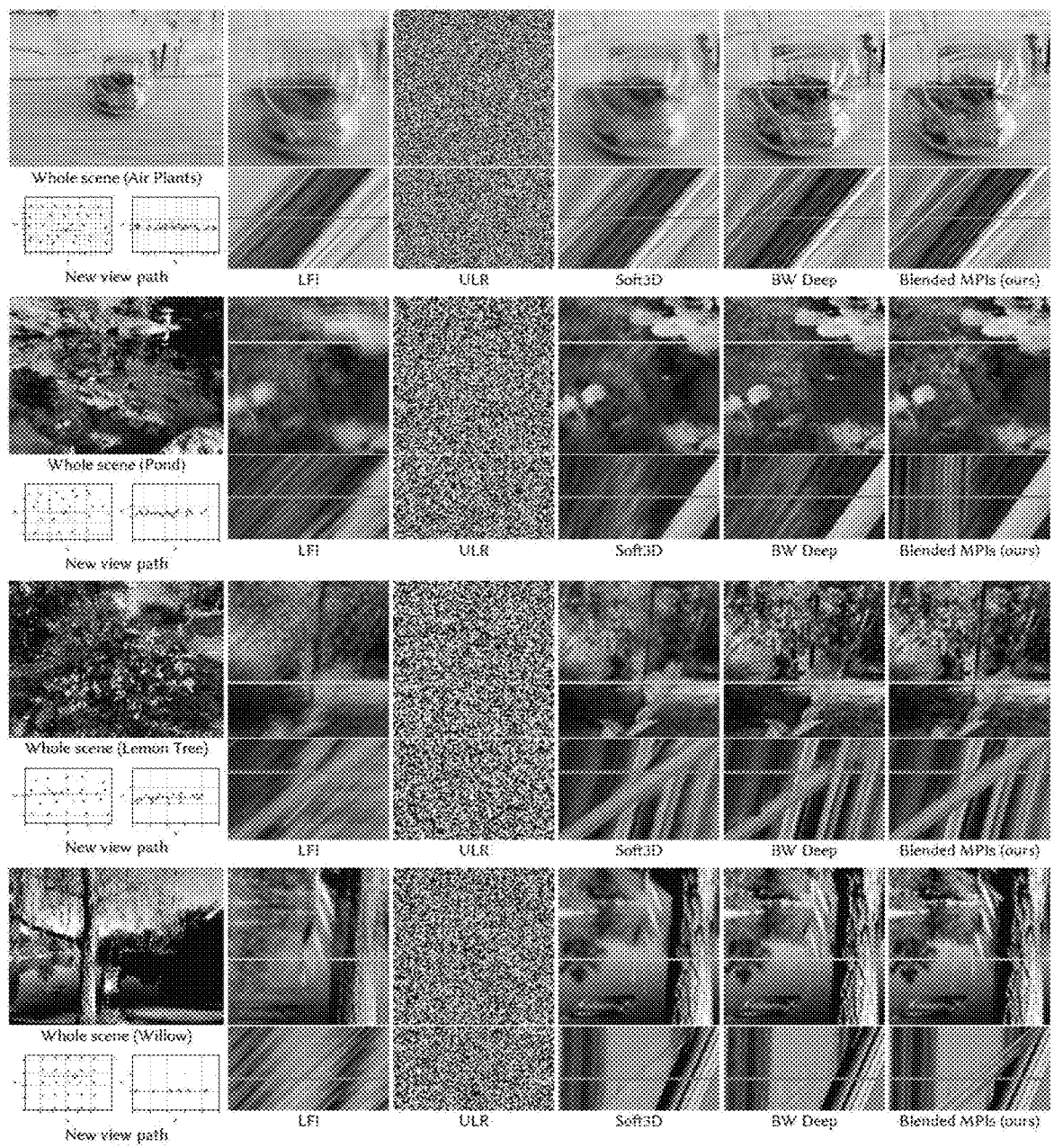

FIG. 30 illustrates an example of different approaches to constructing a novel viewpoint, performed in accordance with one or more embodiments.

Figure 31:
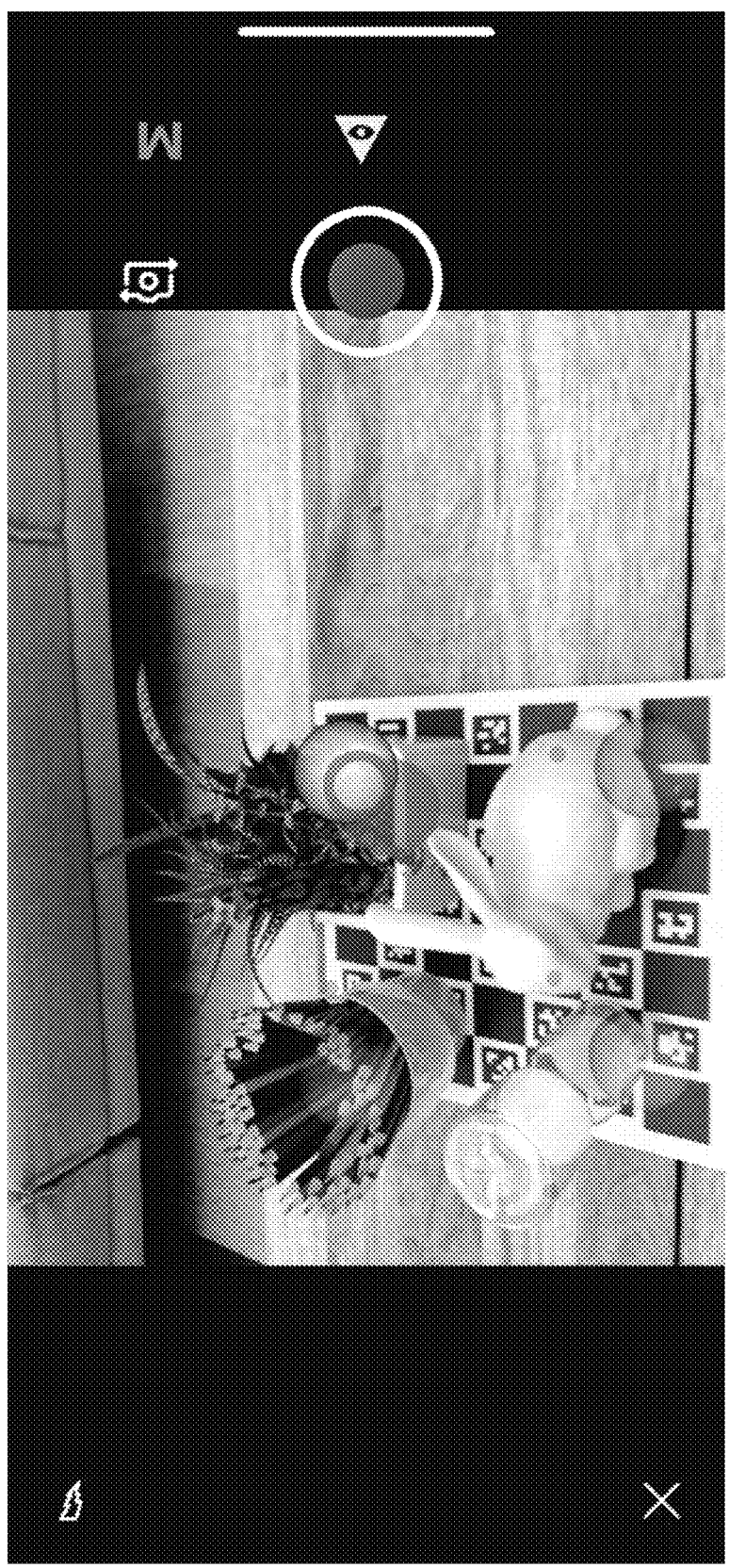

FIG. 31 illustrates an image of a user interface showing recording guidance for collecting an image for generating a novel view, provided in accordance with one or more embodiments.

Figure 32:
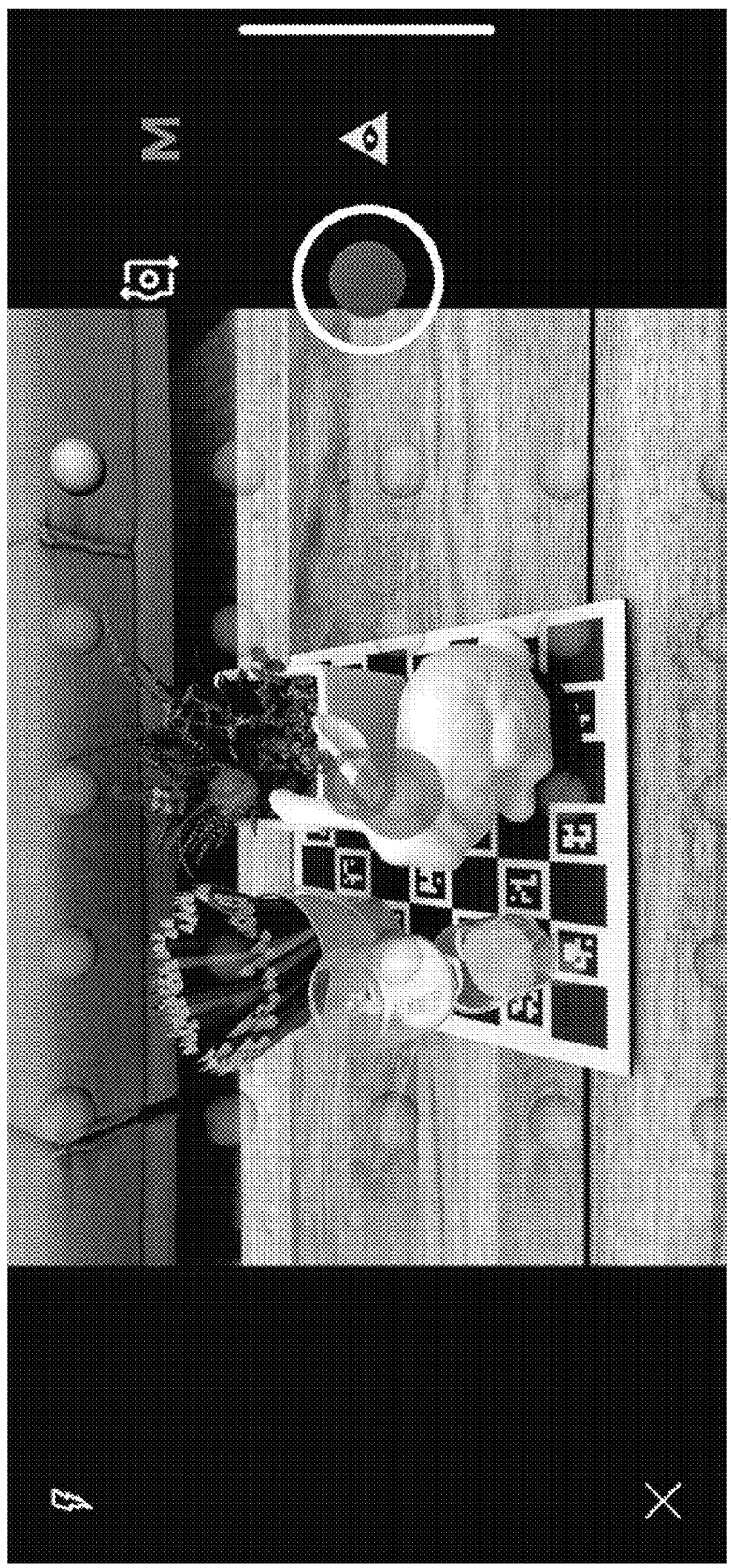

FIG. 32 illustrates an image of a user interface showing recording guidance for collecting an image for generating a novel view, provided in accordance with one or more embodiments.

FIG. 33 illustrates a table presenting quantitative comparisons on a synthetic test set of data analyzed in accordance with one or more embodiments.

Figure 34:
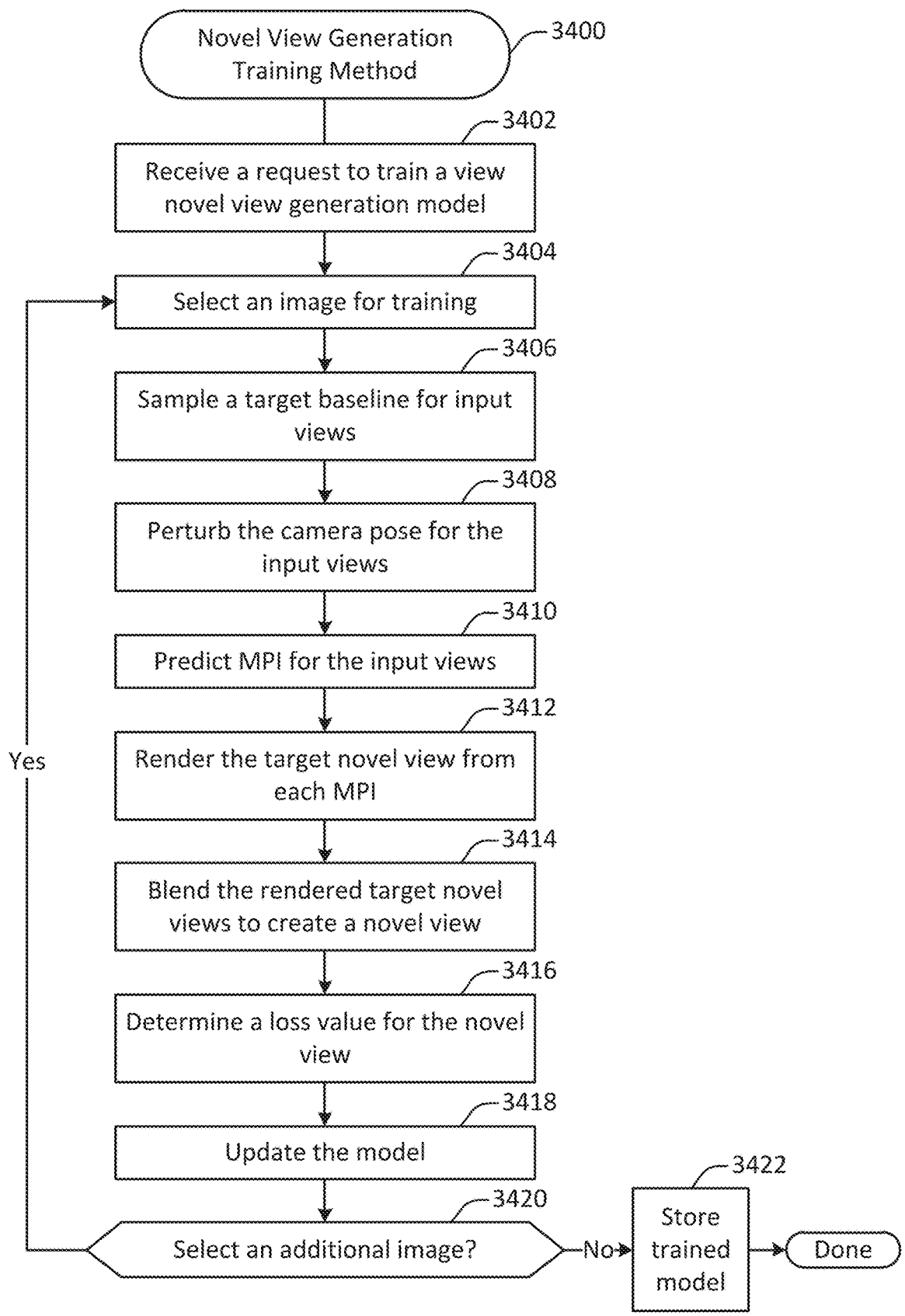

FIG. 34 illustrates a method for training a novel view model, performed in accordance with one or more embodiments.

Figure 35:
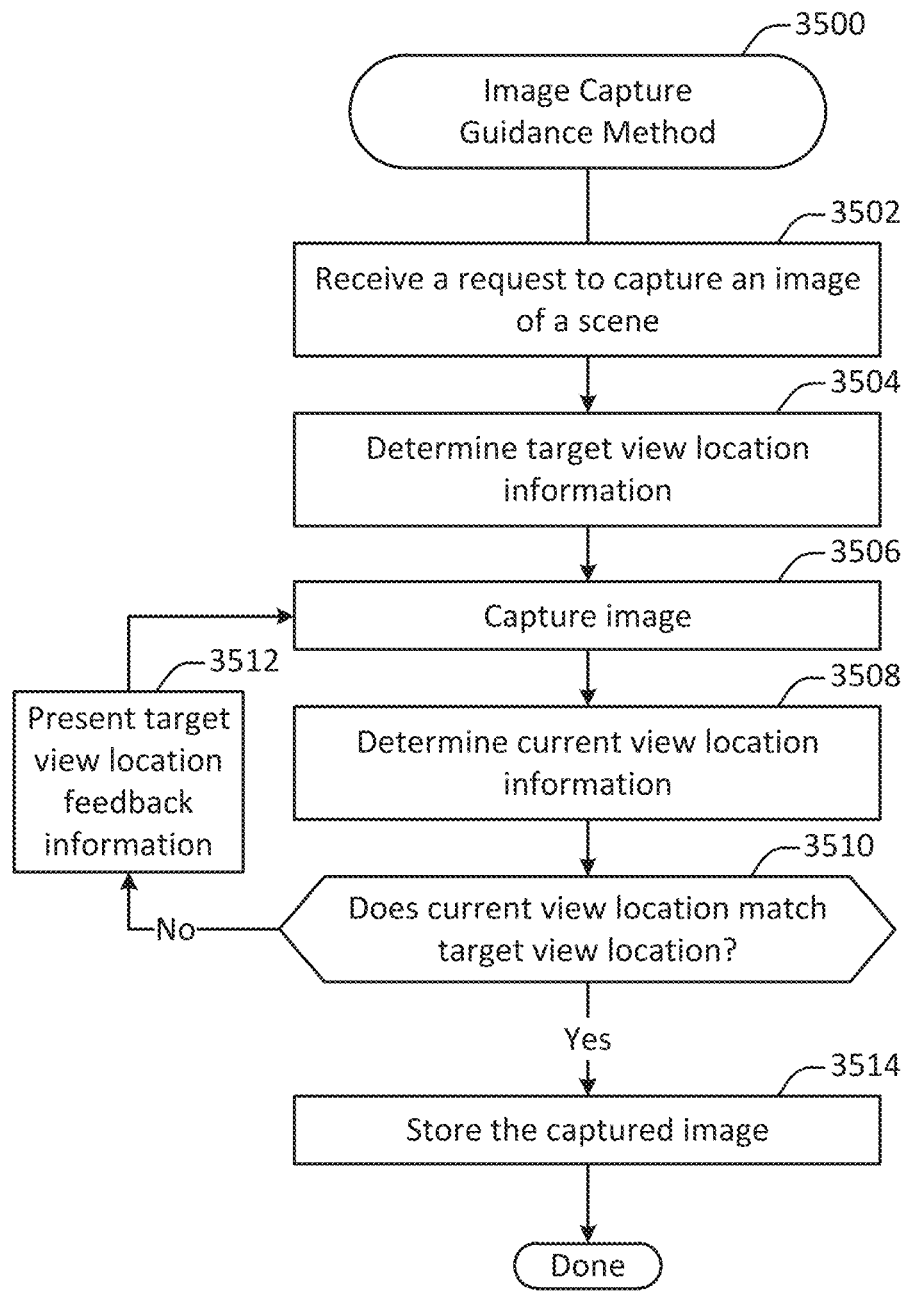

FIG. 35 illustrates a particular example of a process flow for providing target view location feedback, performed in accordance with one or more embodiments.

FIG. 36 illustrates a table describing definitions of variables referred to in the discussion of one or more embodiments.

DETAILED DESCRIPTION

The most compelling virtual experiences completely immerse the viewer in a scene, and a hallmark of such experiences is the ability to view the scene from a close interactive distance. Using conventional approaches, such experiences are possible with novel rendered scenes, but this level of intimacy has been very difficult to achieve for virtual experiences of real-world scenes.

Techniques and mechanisms described herein provide for the recording, representation, and rendering of 3D photorealistic scenes. According to various embodiments, the system provides interactive guidance during the recording stage to capture the scene with a set of photographs and additional metadata. The data is processed to represent the scene as discrete set of connected point of views. Each point of view encodes the appearance of the scene from that perspective with layers of color and transparencies at different of depths from the viewpoint. The rendering procedure uses the processed scene to produce real-time photorealistic images of the scene based on view manipulation in a global coordinate space. The images can be visualized on any suitable display such as the capture device's display, a desktop computer's display, a head-mounted display, or a holographic display.

According to various embodiments, view synthesis may be performed from a set of input images captured by a handheld camera on a slightly irregular grid pattern. Techniques and mechanisms described herein exhibit a prescriptive sampling rate 4000× less than Nyquist for high-fidelity view synthesis of natural scenes, and in some configurations this rate can be interpreted as a requirement on the pixel-space disparity of the closest object to the camera between captured views. After capture, in some configurations less than a minute of preprocessing is needed to expand all sampled views into local light fields. For example, on some hardware configurations a data set may require less than 2 seconds per image to process. Renderings from these local light fields may then be blended to synthesize dense paths of new views. The rendering includes simple and fast computations (homography warping and alpha compositing) that can be run in real-time on a GPU.

According to various embodiments, a convolutional neural network may be used to promote each input captured image to a multi-plane image (MPI) followed by blending renderings from neighboring MPIs to reconstruct any novel view. FIG. 18 illustrates an example application of a process for synthesizing one or more novel views, performed in accordance with one or more embodiments. FIG. 19 illustrates a diagram providing an overview of a process for synthesizing one or more novel views, performed in accordance with one or more embodiments. FIG. 36 illustrates a table describing definitions of variables referred to in the discussion of one or more embodiments. According to various embodiments, techniques and mechanisms described herein provide for interpolating views between a set of forward-facing images sampled close to a 2D regular grid pattern on a plane parallel to the cameras' image plane.

According to various embodiments, a user may be presented with sampling guidelines to assist in correctly sampling views to enable high-quality view interpolation with a smartphone camera app that guides users to easily capture such input images. Furthermore, a fast mobile viewer implemented on such a device is able to render novel views from the predicted MPIs in real-time or near-real time. FIG. 30 illustrates example rendered results from handheld smartphone captures.

Conventional photo-realistic rendering requires intensive manual and computational effort to create scenes and render realistic images. Thus, creation of content for high quality digital imagery has traditionally been limited to experts, and highly realistic rendering via conventional techniques still requires significant computational time. In contrast, techniques and mechanisms described herein provide an alternative to, and improvement over, conventional rendering techniques. High-quality photo-realistic imagery may be generated with a high degree of automation on relatively limited hardware, making high-quality content creation and image rendering accessible to even casual users.

Conventional rendering techniques that render novel views of a scene from a discrete set of photographs of the scene involve first creating a geometric mesh representation of the scene, which requires substantial computing resources. In contrast, techniques and mechanisms described herein provide for the creation of novel views of a scene from a discrete set of photographs of the scene without the creation of a geometric mesh representation. Such techniques and mechanisms include stages such as scene capture, scene processing, and view rendering.

Conventional techniques for scene rendering involve various deficiencies. For example, ray tracing is a technique in which simulated light rays are projected between a target viewpoint and a simulated light source, reflecting off elements in the scene along the way. However, such an approach is much too computationally intensive for real-time applications and for application on devices of limited computing power. As another example, rasterization is a technique by which objects in an image are converted into a set of polygons (e.g., triangles), which can be translated and used to determine pixel values for a newly rendered view. Although such an approach can be less computationally intensive than ray tracing, the computational power required for high-quality rendering is still far beyond that available on devices of limited computing power and does not support real-time rendering of novel viewpoints. Further, rasterization often results in images that are unrealistic and subject to various visual artifacts.

Using conventional techniques, the scene's light field may be sampled, and the relevant captured images interpolated to render new views. Such light field sampling strategies are particularly appealing because they pose the problem of image-based rendering (IBR) in a signal processing framework where we can directly reason about the density and pattern of sampled views required for any given scene.

However, Nyquist rate-view sampling is intractable for scenes with content at interactive distances because the required view sampling rate increases linearly with the maximum view scene disparity (i.e. the reciprocal of the closest scene depth). Since it is not feasible to sample all the required images, the IBR community has moved towards view synthesis algorithms that leverage geometry estimation to predict the missing views.

Conventional algorithms pose the view synthesis problem as predicting a novel view from an unstructured set of input camera views and poses. While the generality of this problem statement is appealing, abandoning a plenoptic sampling framework sacrifices the ability to reason about the view sampling requirements of these methods and predict how their performance will be affected by the input view sampling pattern. When faced with a new scene, users of these conventional methods are limited to trial-and-error to figure out whether a set of sampled views will produce acceptable results for a virtual experience.

According to various embodiments, techniques and mechanisms described herein provide for a view synthesis approach that is grounded within a plenoptic sampling framework and can prescribe how densely a user must capture a given scene for reliable rendering performance. In some embodiments, a deep network learning is first used to promote each source view to a volumetric representation of the scene that can render a limited range of views, advancing recent work on the multiplane image representation. Next, adjacent volumetric renderings are blended to render novel views.

Theoretical analysis shows that the number of views required by one or more embodiments decreases quadratically with the number of planes predicted for each volumetric scene representation, up to limits set by camera field-of-view and network receptive field. This theoretical analysis is borne out by experimental analysis. In some embodiments, novel views may be rendered with the perceptual quality of Nyquist view sampling while using up to $64^2 \approx 4000 \times$ fewer images.

According to various embodiments, techniques and mechanisms described herein provide for Nyquist level performance with greatly reduced view sampling can be achieved by specializing to the subset of natural scenes. Some embodiments involve high-quality geometry estimation by a deep learning pipeline trained on renderings of natural scenes and the use of an intermediate volumetric scene representation that ensures consistency among local views.

In some embodiments, techniques and mechanisms described herein provide for a practical and simple solution for capturing and rendering real world scenes for virtual exploration. In addition, an extension of plenoptic sampling theory is describes that indicates how users should sample input images for reliable high-quality view synthesis. In accordance with techniques and mechanisms described herein, end-to-end deep learning pipelines based on local volumetric scene representations can achieve state-of-the-art view interpolation results.

According to various embodiments, the derived prescriptive view sampling requirements are extensively validated. Further, one or more methods presented herein quantitatively outperforms traditional light field reconstruction methods as well as state-of-the-art view interpolation algorithms across a range of sub-Nyquist view sampling rates. An augmented reality app can guide users to capture input images with, for example, a smartphone camera and can render novel views in real-time after a quick preprocess.

In particular embodiments, one or more techniques described herein may be applied to augmented reality and/or virtual reality. In such application, a scene may be rendered from two or more view-points. For example, a viewpoint may be rendered for each eye.

According to various embodiments, the system guides a user with a mobile computing device such as a smartphone to capture a discrete set of images of a scene. The system uses the taken photographs to represent the scene as a set-depth layer of calibrated photos. For instance, the photos may be RGB-calibrated. The constructed representation may be referred to herein as a Multiplane Image (MPI). MPIs may be linked in 3D space to create a graph structure. The graph structure may be produced by a camera calibration algorithm, followed by a triangulation of the camera positions and a deep network to inference-produce the layers of each MPI. The system may receive information designating a novel viewpoint from which to product an image. The system may then use the previously-computed graph of MPIs to produce the requested image.

In some embodiments, some or all of the stages may be performed on a mobile computing device. However, the rendered image may be viewed on the mobile computing device, a desktop computer, a head-mounted display, or any other suitable display device.

In some implementations, the techniques and mechanisms described herein may provide any or all of a number of different advantages. First, the system may provide a natural way to obtain scene geometry for view synthesis by using conventional images without further user intervention or specialized devices. Second, the system may present guidance for facilitating screen capture. Third, the system may need only limited computing resources such as computation power or memory to perform viewpoint rendering. Fourth, the system may allow for the rapid rendering of novel viewpoints and/or allow for interactive rendering rates. Fifth, the system may allow for free-viewpoint rendering, including up to 6 degrees of freedom for camera motions. Sixth, the system may provide high-quality rendering of photorealistic views, including effects such as parallax, perspective, semi-transparent surfaces, specular surfaces, and view-dependent lighting and texturing. Seventh, the system may provide for the generation of complete views of a scene, as opposed to partial views. Eighth, the system may provide for seamless transitions between different viewpoints. Ninth, the system may provide for representations that contain the appearance of occluded objects in different layers that make in-painting unnecessary. Tenth, the system may include representations having alpha layers allowing for the capture of partially reflective or transparent objects as well as objects with soft edges. Eleventh, the system may provide for the generation of stackable images from different viewpoints. Twelfth, the system may provide for the generation of viewpoints to facilitate applications in virtual and/or augmented reality.

Image-based rendering (IBR) is the fundamental computer graphics problem of rendering novel views of objects and scenes from sampled views. Light field rendering generally eschews geometric reasoning and simply samples images on a regular grid so that new views can be rendered as slices of the sampled light field. Lumigraph rendering uses a similar strategy and additionally shows how approximate scene geometry can be used to compensate for irregular view sampling.

The plenoptic sampling framework analyzes light field rendering using signal processing techniques. In this framework, the Nyquist view sampling rate for light fields depends on the minimum and maximum scene depths. Furthermore, the Nyquist view sampling rate can be lowered with more knowledge of scene geometry. Non-Lambertian and occlusion effects increase the spectral support of a light field.

Rendering algorithms based on plenoptic sampling provide for prescriptive sampling. That is, given a new scene, it is easy to compute the required view sampling density to enable high-quality renderings. The unstructured light field capture method leverages this to design an interface that assists users in adequately sampling images of a scene for virtual exploration.

According to various embodiments, prescriptive sampling facilitates practical and useful IBR algorithms. Techniques and mechanisms described herein employ a plenoptic sampling framework in combination with deep-learning-based view synthesis to significantly decrease the dense sampling requirements of traditional light field rendering.

Many IBR algorithms attempt to leverage explicit scene geometry in efforts to synthesize new views from arbitrary unstructured sets of input views. These approaches can be categorized as using either global or local geometry. Techniques that use global geometry typically compute a single texture-mapped global mesh from a set of unstructured input images. This approach has been effective for constrained situations such as panoramic viewing with mostly rotational and little translational viewer movement, but a major shortcoming is its inability to simulate view-dependent effects.

Many conventional free-viewpoint IBR algorithms are based upon a strategy of locally texture mapping a global mesh. One influential view-dependent texture mapping algorithm proposed an approach to render novel views by blending nearby captured views that have been reprojected using a global mesh. Work on unstructured Lumigraph rendering focused on computing per-pixel blending weights for reprojected images and proposed an algorithm that satisfied key properties for high-quality rendering. Unfortunately, it is very difficult to estimate high-quality meshes whose geometric boundaries align well with image edges, and IBR algorithms based on global geometry typically suffer from significant artifacts.

Some conventional algorithms attempt to remedy this shortcoming with complicated pipelines that involve both global mesh and local depth map estimation. However, methods that rely on a global mesh methods suffer from their inability to precisely define minimum input view sampling requirements for acceptable results. Users are limited to trial-and-error to determine if an input view sampling is adequate, and this combined with a mesh estimation procedure that takes multiple hours on many systems renders these algorithms impractical for many content capture scenarios. Furthermore, methods that rely on a global mesh face a fundamental tension when attempting to render non-Lambertian effects: reprojecting specularities cannot be represented by reprojecting images to the true scene geometry. In fact, specularities in general do not even lie at a single virtual depth. Reprojecting images using a global mesh is therefore fundamentally flawed when attempting to render non-Lambertian reflectances.

Conventional IBR algorithms that use local geometry and local texture avoid difficult and expensive global mesh estimation. Instead, they typically compute local detailed geometry for each input image and render novel views by re-projecting and blending nearby input images. The Soft3D algorithm is a local geometry and local texture approach that forward projects and blends local layered representations to render novel views. However, in contrast to Soft3D, some embodiments described herein employ a plenoptic sampling framework. Furthermore, Soft3D computes each local layered representation by aggregating a heuristic measure of depth estimation uncertainty over a large neighborhood of views. In contrast, embodiments described herein include a deep learning pipeline optimized end-to-end to predict each local layered representation for novel view rendering quality, an approach that provides for synthesizing superior renderings.

In contrast to conventional techniques, some embodiments described herein involve training a deep learning pipeline end-to-end to predict each local layered representation for optimal novel view rendering quality using only local blending. The high quality of the deep learning predicted local scene representations allows the synthesis of superior renderings without requiring aggregating geometry estimates over large view neighborhoods, as done in Soft3D. Such an approach may be especially advantageous for rendering non-Lambertian effects because the apparent depth of specularities generally varies with the observation viewpoint, so smoothing the estimated geometry over large viewpoint neighborhoods prevents accurate rendering of non-Lambertian effects. Finally, one or more procedures described herein may be posed within a plenoptic sampling framework and/or the Soft3D algorithm.

Some conventional approaches have involved deep learning pipelines may be trained end-to-end for view synthesis. For example, DeepStereo performs unstructured view synthesis by separately predict a layered scene representation for each novel view. The light field camera view interpolation method and the single view local light field synthesis method both predict a depth map for each novel view. These methods separately predict local geometry for each novel view, which results in inconsistent renderings across smoothly-varying viewpoints. Finally, a deep learning pipeline may be used to predict an MPI from a narrow baseline stereo pair for the task of stereo magnification. As opposed to conventional deep learning local scene representations, MPIs can be used to render consistent novel views by simple alpha compositing into a target viewpoint.

In some embodiments described herein, MPIs are employed as a local light field representation to support a view synthesis strategy based on blending between MPIs estimated at each input view location. Such an approach produces improved renderings and provides one or more of the prescriptive benefits of the plenoptic sampling framework.

FIG. 1 illustrates an overview method 100 for generating a novel view, performed in accordance with one or more embodiments. According to various embodiments, the method 100 may be performed at a mobile computing device such as a mobile phone. Alternately, a portion of the method 100 may be performed at a remote server.

At 102, one or more images of a scene are captured. According to various embodiments, the images may be captured via a camera at a mobile computing device.

Alternately, previously-captured images may be analyzed. In some instances, recording guidance may be provided to aid in the capture of images. Techniques related to image capture are discussed in further detail with respect to the method 200 shown in FIG. 2.

At 104, the captured images are processed. According to various embodiments, capturing the processed images may involve operations such as estimating camera pose and scene depth range for each image and promoting each image to a local multiplane image (MPI). In particular embodiments, each sampled view may be promoted to a scene representation that can render views at a density below the Nyquist rate, but achieving the perceptual quality of Nyquist rate. Techniques related to image processing are discussed in further detail with respect to the method 300 shown in FIG. 3.

At 106, a novel viewpoint image of the scene is rendered. According to various embodiments, rendering a novel viewpoint image of the scene may involve operations such as rendering a target viewpoint from each of a set of selected multiplane images. For example, novel views may be rendered by blending between renderings from neighboring scene representations. The MPI scene representation fits into the plenoptic sampling framework to enable high quality view interpolation with sub-Nyquist rate view sampling. Techniques related to rendering a novel viewpoint image of the scene are discussed in further detail with respect to the method 400 shown in FIG. 4.

FIG. 2 illustrates a method 200 for capturing images for generating a novel view, performed in accordance with one or more embodiments. According to various embodiments, the method may be performed at a mobile computing device such as a smartphone.

At 202, a request to generate a novel view of a scene is received. In some implementations, the request may be generated based on user input. Alternately, the request may be generated automatically.

At 204, one or more images of the scene are received. In some implementations, the images of the scene may be generated in real time. For example, a user may be capturing video via a live camera feed or may be capturing a series of images.

In some embodiments, the images of the scene may be pre-generated. For example, the user may identify a set of images or one or more videos of a scene that have already been captured, and then initiate a request to generate a novel view of the scene.

At 206, a sampling density based on the images are determined. According to various embodiments, the sampling density may be determined based on various characteristics. Examples of these characteristics are described in the sections below, titled "Nyquist Rate View Sampling" and "View Sampling Rate Reduction".

At 208, a determination is made as to whether to capture an additional image. In some implementations, the determination may be made at least in part by comparing the one or more images received at 204 with the sampling density identified at 206. When it is determined that the number and/or density of the images falls below the sampling density determined at 206, one or more additional images may be captured.

At 210, if it is determined to capture an additional image, one or more additional viewpoints to capture are identified. According to various embodiments, a smartphone app (e.g., based on the ARKit framework) may guide users to capture input views for the view synthesis algorithm. The user first taps the screen to mark the closest object, and the app uses the corresponding scene depth computed by ARKit as $z_{min}$. Next, the user may select the size of the view plane S within which the algorithm will render novel views. The rendering resolution for the smartphone app may be fixed based on the prescribed number and spacing of required images based on Equation 13 and the definition $\Delta u = S/\sqrt{N}$.

At 212, augmented-reality capture guidance for capturing the identified viewpoints is determined. In some implementations, a user may have a camera with a field of view $\theta$ and a view plane with side length S that bounds the viewpoints they wish to render. Based on this, the application prescribes a design space of image resolution W and a number of images to sample N that users can select from to reliably render novel views at Nyquist level perceptual quality. In some embodiments, the empirical limit on the maximum disparity dmax between adjacent input views for the deep learning pipeline may be approximately 64 pixels. In such a configuration, substituting Equation 7 yields:

$$\frac{\Delta_u f}{\Delta_x z_{min}} \leq 64 \quad (11)$$

In some embodiments, this target may be converted into user-friendly quantities by noting that $\Delta u = S/\sqrt{N}$ and that the ratio of sensor width to focal length $W\Delta_x/f = 2\tan\theta//2$:

$$\frac{SW}{2\sqrt{N} z_{min} \tan(\theta/2)} \leq 64 \quad (12)$$

$$\frac{W}{\sqrt{N}} \leq \frac{128 z_{min} \tan(\theta/2)}{S}$$

Using a smartphone camera with a 64-degree field of view, this system simplifies to:

$$\frac{W}{\sqrt{N}} \leq \frac{80 z_{min}}{S} \quad (13)$$

In some implementations, once the extent of viewpoints to render and the depth of the closest scene point are determined, any target rendering resolution W and number of images to capture N may be chosen such that the ratio $W/\sqrt{N}$ satisfies Expression 13.

At 214, the augmented-reality capture guidance is provided. In some implementations, the app may then guide the user to capture these views using an intuitive augmented reality overlay, as visualized in FIG. 28. When the phone detects that the camera has been moved to a new sample location, it may automatically record an image and highlight the next sampling point. Alternately, the user may manually capture an image when the camera has been moved to a new sample location.

FIG. 28 illustrates guidance provided for the capture of images. According to various embodiments, Equation 7 dictates one possible sampling bound related only to the maximum scene disparity. Based on such a bound, an app may help a user sample a real scene with a fixed camera baseline. Smartphone software may be used to track the phone's position and orientation, providing sampling guides that allow the user to space photos evenly at the target disparity. FIG. 28 illustrates three screenshots as the phone moves to the right (so that the scene content appears to move left). Once the user has centered the phone so that the three light green circles are concentric, a photo is automatically taken and the set of target rings around the next unsampled view are lit up.

At 216, the captured images are stored for viewpoint synthesis. According to various embodiments, the captured images may be stored for further processing, or may be processed immediately. Storing the images may involve transmitting the images to a local storage device. Alternately, or additionally, one or more of the captured images may be transmitted to a server via a network. In some implementations, the captured images may be combined to generate a multi-view interactive digital media representation.

Nyquist Rate View Sampling

The Fourier support of a light field, ignoring occlusion and non-Lambertian effects, lies within a double-wedge shape whose bounds are set by the minimum and maximum depth of scene content. As shown in FIG. 3a, the Nyquist view sampling rate for a light field is the minimum packing distance between replicas of this double-wedge spectra such that they do not overlap. The resulting range of camera sampling intervals $\Delta_u$ that adequately sample the light field is defined by equation (1).

$$\Delta_u \leq \frac{1}{K_x f(1/z_{min} - 1/z_{max})} \quad (1)$$

In Equation (1), f is the camera focal length and $z_{max}$ and $z_{min}$ are the maximum and minimum scene disparities. Further, $K_x$ is the highest spatial frequency represented in the sampled light field, determined based on Equation (2). In Equation (2), $B_x$ is the highest frequency in the continuous light field and $\Delta_x$ is the camera spatial resolution.

$$K_x = \min\left(B_x, \frac{1}{2\Delta_x}\right). \quad (2)$$

FIG. 20 illustrates traditional plenoptic sampling without occlusions. In representation (a) in FIG. 20, the Fourier support of a light field without occlusions lies within a double-wedge, shown in blue. Nyquist rate view sampling is set by the double-wedge width, which is determined by the minimum and maximum scene depths $1/z_{min}$, $1/z_{max}$ and the maximum spatial frequency $K_x$. The ideal reconstruction filter is shown in orange. In representation (b) in in FIG. 20, splitting the light field up into D non-overlapping layers with equal disparity width decreases the Nyquist rate by D times. In representation (c) in FIG. 20, without occlusions, the full light field spectrum is the sum of the spectra from each layer.

Occlusions expand the light field's Fourier support into the parallelogram shape illustrated in representation (a) in FIG. 21, which is twice as wide as the double-wedge due to the effect of the nearest scene content occluding the furthest. Considering occlusions therefore halves the required maximum camera sampling interval:

$$\Delta_u \leq \frac{1}{2K_x f(1/z_{min} - 1/z_{max})}. \quad (3)$$

FIG. 21 illustrates traditional plenoptic sampling extended to consider occlusions when reconstructing a continuous light field from MPIs. In representation (a) in FIG. 21, considering occlusions expands the Fourier support to a parallelogram (shown in purple) and doubles the Nyquist view sampling rate. In representation (b) in FIG. 21, as in the no-occlusions case, separately reconstructing the light field for D layers decreases the Nyquist rate by D times. In representation (c) in FIG. 21, with occlusions the full light field spectrum cannot be reconstructed by summing the individual layer spectra because their supports overlap as shown. Instead, the full light field is computed by alpha compositing the individual layer light fields from back to front in the primal domain.

View Sampling Rate Reduction

The ability to decompose a scene into multiple depth ranges and separately sample the light field from each range in a joint image and geometry space allows the camera sampling interval to be increased by a factor equal to the number of layers D. This benefit stems from the fact the spectrum of the light field emitted by scene content within each range lies within a double-wedge that is tighter than that of the spectrum of the light field emitted by the full scene. Therefore, a tighter reconstruction filter with a different depth can be used for each depth range, as illustrated in representation (b) in FIG. 21. The reconstructed light field, ignoring occlusion effects, may be constructed as the sum of the reconstructions of all layers (representation (c) in FIG. 20).

In some embodiments, the predicted MPI layers at each camera sampling location may be interpreted as view samples of scene content within non-overlapping depth ranges. Then, applying the optimal reconstruction filter for each depth range is equivalent to reprojecting planes from neighboring MPIs to their corresponding depths before blending them to render.

It is not straightforward to extend this analysis from conventional approaches to handle occlusions, because the Fourier supports of adjacent depth ranges can overlap, as visualized in representation (c) in FIG. 21. According to various embodiments, occlusions can be handled in the primal domain by alpha compositing the continuous light fields we reconstruct from each depth layer. Some techniques described herein related to MPI layers differ from traditional plenoptic sampling layered renderings because some techniques described herein involve predicting opacities in addition to color at each layer, which allows reconstructing continuous light fields for each depth layer as discussed above and then alpha compositing them from back to front. This allows the plenoptic sampling to be extended with layered light field reconstruction framework to correct handling occlusions and still increase the required camera sampling interval by a factor of D:

$$\Delta_u \leq \frac{D}{2K_x f(1/z_{min} - 1/z_{max})}. \quad (4)$$

Techniques described herein also differ from classic layered plenoptic sampling in that each MPI may be sampled within a reference camera view frustum with a finite field-of-view, instead of the infinite field-of-view assumed in conventional techniques. In order for the MPI prediction procedure to perform, every or nearly every point within the scene's bounding volume should fall within the frustums of at least two neighboring sampled views. This requirement may be satisfied by enforcing the fields-of-view of adjacent cameras to overlap by at least 50% on the scene's near bounding plane. The resulting target camera sampling interval Δu is specified by Equation (5), whereas Equation (6) describes the overall camera sampling interval target.

$$\Delta_u \leq \frac{W \Delta_x z_{min}}{2f} \quad (5)$$

-continued $$\Delta_u \leq \min\left(\frac{D}{2K_x f(1/z_{min} - 1/z_{max})}, \frac{W \Delta_x z_{min}}{2f}\right). \quad (6)$$

In some embodiments, the target camera sampling interval may be interpreted in terms of the maximum pixel disparity $d_{max}$ of any scene point between adjacent input views. Setting $z_{max}=\infty$ to allow scenes with content up to an infinite depth and additionally setting $K_x=1/2\Delta_x$ to allow spatial frequencies up to the maximum representable frequency, specified by Equation (7).

$$\frac{\Delta_u f}{\Delta_x z_{min}} = d_{max} \leq \min\left(D, \frac{W}{2}\right). \quad (7)$$

In some embodiments, the maximum disparity of the closest scene point between adjacent views is min(D,W/2) pixels. When D=1, this inequality reduces to the Nyquist bound: a maximum of 1-pixel disparity between views.

According to various embodiments, promoting each view sample to an MPI scene representation with D depth layers allows decreasing the required view sampling rate by a factor of D, up to the required field-of-view overlap for stereo geometry estimation. Light fields for real 3D scenes may be sampled in two or more viewing directions, so this benefit may be compounded into a sampling reduction of $D^2$ or more.

FIG. 3 illustrates a method 300 for novel view analysis, performed in accordance with one or more embodiments. According to various embodiments, the method 300 may be performed during or after the capture of images as discussed with respect to the method 200 shown in FIG. 2. The method 300 may be performed on a client machine such as a mobile phone. Alternately, the method 300 may be performed on a server, for instance after the transmission of data from the client machine to the server. The transmitted data may include raw image data, raw IMU data, one or more multi-view interactive digital media representations (MVIDMRs), or any other suitable information.

At 302, a request to analyze images to generate a novel view of a scene is received. In some implementations, the request may be generated based on user input. Alternately, the request may be generated automatically, for instance after the capture of the images in FIG. 2.

At 304, an image is selected for analysis. According to various embodiments, the images may be analyzed in sequence of capture, based on their relative location, at random, or in any suitable order. For example, images may be positioned in a spatial grid, with each image analyzed in an order determined based on a grid traversal. Alternately, or additionally, the images may be analyzed in parallel.

At 306, structure from motion is run to estimate an input camera pose and scene depth range for the selected image. Structure from motion is a photogrammetric range imaging technique for estimating three-dimensional structures from two-dimensional image sequences that may be coupled with local motion signals. For example, camera motion information may be used to determine that two images were captured in sequence and that the camera was moved in a particular direction in between the two image captures. Then, features such as corner points (edges with gradients in multiple directions) may be tracked from one image to the next to find correspondence between the images. The relative movement of the tracked features may be used to determine information about camera pose and scene depth. For example, a tracked feature that moves a greater amount between two images may be located closer to the camera than a tracked feature that moves a lesser amount between the two images.

In particular embodiments, an estimated depth from the camera may be computed for every pixel in an image. The pixels may then be grouped by depth to form a multi-plane image. Such processing may be performed even on a mobile computing device having relatively limited computational power, such as a smart phone.

At 308, the captured image is promoted to a local multiplane image. In some implementations, the MPI scene representation includes of a set of fronto-parallel RGBα planes, evenly sampled in disparity, within a reference camera's view frustum. Novel views may be created from an MPI at continuously-valued camera poses within a local neighborhood by alpha compositing the color along rays into the novel view camera using the "over" operator, as illustrated in FIG. 22. FIG. 22 illustrates how each input view sample is promoted to an MPI scene representation that includes of D RGBα planes at regularly sampled disparities within the input view's camera frustum. Each MPI can render continuously-valued novel views within a local neighborhood by alpha compositing color along rays into the novel view's camera. Such an approach is analogous to reprojecting each MPI plane onto the sensor plane of the novel view camera and alpha compositing the MPI planes from back to front.

In some implementations, after capturing the input images, the input camera poses may be estimated and an MPI predicted for each input view using a trained neural network. For example, the open source COLMAP software package may be used. In some configurations, such an approach may take fewer than 10 minutes for sets of 25-50 input images, even with the relatively limited resources available on a mobile computing device. Alternately, native smartphone pose estimation may be used. Then, the deep learning pipeline may be used to predict an MPI for each input sampled view.

In some embodiments, the captured image may be promoted to an MPI by applying a convolutional neural network (CNN) to the focal image. The CNN may also receive as an input one or more other images proximate to the focal image. For example, the sampled view may be used along with 4 of its neighbors to predict the MPI for that location in space.

In some embodiments, to predict each MPI from this set of images, each of the images are re-projected to D depth planes, sampled linearly in disparity within the reference view frustum, to form plane sweep volumes (PSVs) each of size H×W×D×3.

In some implementations, the MPI prediction CNN takes these PSVs (concatenated along the last axis) as input. This CNN outputs opacities $\alpha(x,y,d)$ and a set of blending weights $b_i(x,y,d)$ that sum to 1 at each MPI coordinate (x,y,d). These weights parameterize the RGB values in the output MPI as a weighted combination of the input plane sweep volumes. Intuitively, this enables each predicted MPI to softly "select" its color values at each MPI coordinate from the pixel colors at that (x,y,d) location in each of the input PSVs. In contrast to conventional techniques, this approach allows an MPI to directly use content occluded from the reference view but visible in other input views.

According to various embodiments, the MPI prediction convolutional neural network architecture involves 3D convolutional layers. Since the network is fully convolutional along height, width, and depth axes, MPIs with a variable number of planes D can be predicted in order to jointly choose D and the camera sampling density to satisfy the rate in Equation 7. Table 2 illustrates one or more benefits from being able to change the number of MPI planes to correctly match the derived sampling requirements.

At 310, a determination is made as to whether to select an additional image for analysis. According to various embodiments, additional images may be selected while unanalyzed images remain. Alternately, the system may continue to analyze images until a sufficient quality threshold has been reached.

At 312, the local multiplane images for viewpoint synthesis are stored. According to various embodiments, the images may be stored on a local storage device. Alternatively, or additionally, the images may be transmitted via a network to a remote machine for storage at that remote machine.

FIG. 4 illustrates a method 400 for novel view creation, performed in accordance with one or more embodiments. In some implementations, the method 400 may be performed on a mobile device such as a smartphone. Alternately, the method 400 may be performed at a server.

In some embodiments, the method 400 may be performed live. For example, a user may navigate an MVIDMR on a mobile device. As the user is navigating between viewpoints that have been captured, novel viewpoints may be generated to make the navigation appear more seamless. That is, interpolated viewpoints may be generated between the viewpoints that have actually been captured and stored as images.

At 402, a request to generate a novel view of a scene is received. In some implementations, the request may be generated based on user input. For example, a user may request to generate a specific viewpoint. Alternatively, the request may be generated automatically. For example, the request may be generated automatically in the process of a user accessing an MVIDMR at the client machine.

At 404, a target viewpoint for the novel view is identified. In some implementations, the target viewpoint may be identified automatically, for instance during the navigation of an MVIDMR between different viewpoints. Alternately, the target viewpoint may be identified at least in part based on user input, such as by selecting a particular viewpoint in a user interface.

At 406, a multi-plane image proximate to the target view is selected. In some implementations, the four MPIs immediately adjacent to the target view in a grid of viewpoints may be selected. Alternately, a different selection criterion may be used. For instance, all MPIs within a designated distance from the target view may be selected.

At 408, the target viewpoint is analyzed based on the selected multi-plane image is rendered. In some embodiments, given a set of predicted MPIs $M_k$ at input camera poses $P_k$, a novel view's RGB color $C_{t,k}$ and accumulated alpha $\alpha_{t,k}$ may be rendered at target pose $p_t$ by homography warping each MPI plane onto the target view's sensor plane and alpha compositing the warped RGB and a planes from back to front:

$$C_{t,k}, \alpha_{t,k} = \text{render}(M_k, p_k, p_t). \quad (8)$$

At 410, a determination is made as to whether to select an additional multi-plane image. According to various embodiments, multi-plane images may be selected and analyzed in any suitable sequence or in parallel. Images may continue to be selected until the selection criteria are met.

At 412, a weighted combination of the target viewpoint renderings is determined. According to various embodiments, interpolated views may be rendered as a weighted combination of renderings from multiple different MPIs. The accumulated alpha values from each MPI rendering may be considered when blending, which allows each MPI rendering to "fill in" content that is occluded from other camera views.

In some implementations, the target view's RGB colors $C_t$ may then be rendered by blending the rendered RGB images from each MPI using blending weights $w_k$, each modulated by the corresponding accumulated alpha images and normalized so that the resulting rendered image is fully opaque:

$$C_t = \frac{\sum_k w_k \alpha_{t,k} C_{t,k}}{\sum_k w_k \alpha_{t,k}}. \tag{9}$$

According to various embodiments, modulating the blending weights by the accumulated alpha values may help to prevent artifacts, as shown in FIG. 23. FIG. 33 presents a table that illustrates how in some embodiments blending with alpha provides results quantitatively superior to both a single MPI and blending multiple MPIs without alpha.

In some implementations, the blending weights $w_k$ can be any sufficiently smooth filter. In the case of data sampled on a regular grid, bilinear interpolation from the nearest four MPIs may be used. For irregularly sampled data, $w_k$ may be proportional to the inverse distance to that viewpoint, for k ranging over the five nearest MPIs:

$$w_k \propto \exp(-\gamma d_k) \tag{10}$$

In Equation (10), $d_k$ is the L2 distance to the novel view, $\gamma = f/D_{z0}$ for focal length f, minimum distance to the scene $z_0$, and number of planes D. The quantity $\gamma = f/D_{z0}$ represents $d_k$ converted into units of pixel disparity.

According to various embodiments, blending between neighboring MPIs may be particularly effective for rendering non-Lambertian effects. For general curved surfaces, the virtual apparent depth of a specularity changes with the viewpoint. As a result, specularities appear as curves in epipolar slices of the light field, while diffuse points appear as lines. Each of the predicted MPIs can represent a specularity for a local range of views by placing the specularity at a single virtual depth. FIG. 24 illustrates how the rendering procedure effectively models a specularity's curve in the light field by blending locally linear approximations, as opposed to the limited extrapolation provided by a single MPI.

FIG. 24 illustrates how a collection of MPIs can approximate a highly non-Lambertian light field. The curved plate reflects the paintings on the wall, leading to quickly-varying specularities as the camera moves horizontally, as can be seen in the ground truth epipolar plot (bottom right). A single MPI (top right) can only place a specular reflection at a single virtual depth, but multiple blended MPIs (middle right) can much better approximate the true light field. In this example, blending is performed between MPIs evenly distributed at every 32 pixels of disparity along a horizontal path, as indicated by the dashed lines in the epipolar plot.

In some embodiments, novel views from a single MPI may be rendered by simply rasterizing each plane from back to front as a texture-mapped rectangle in 3D space, using a standard shader API to correctly handle the alpha compositing, perspective projection, and texture resampling. For each new view, the system may determine which MPIs should be blended and render them into separate framebuffers. A fragment shader may then be used to perform the alpha-weighted blending. In some implementations, such rendering may be performed in real-time or near real-time on a mobile computing device having limited computational power.

At 414, the weighted combination is stored as a novel view. In some implementations, the weighted combination may be stored in any suitable image format. Alternately, or additionally, storing the weighted combination may involve presenting it live on a display screen such as at a mobile computing device. As yet another example, the weighted combination may be transmitted to a remote machine via a network.

Sampling Theory Validation According to various embodiments, the prescriptive sampling benefits and ability to render high fidelity novel views from undersampled light fields of techniques described herein are quantitatively and qualitatively validated. In addition, evidence is presented that techniques described herein outperform conventional approaches for regular view interpolation. Quantitative comparisons presented herein rely on a synthetic test set rendered from an UnrealCV scene that was not used to generate any training data. The test set contains 8 camera viewpoints, each rendered at 640×480 resolution and at 8 different view sampling densities such that the maximum disparity between adjacent input views ranges from 1 to 256 pixels. A maximum disparity of 1 pixel between input views corresponds to Nyquist rate view sampling.

According to various embodiments, techniques described herein are able to render high-quality novel views while significantly decreasing the required input view sampling density. The graph in FIG. 26 shows that how techniques described herein are able to render novel views with minimal degradation in quality up to and including D=64 pixels of disparity between input view samples, as long as the number of planes in each MPI is matched to the maximum pixel disparity between input views.

FIG. 26 illustrates performance of an embodiment of techniques described herein (with D=8, 16, 32, 64, and 128) and light field interpolation versus maximum scene disparity $d_{max}$. This approach uses the LPIPS perceptual metric, which is a weighted combination of neural network activations tuned to match human judgements of image similarity. The shaded region indicates ±1 standard deviation. The black line indicates light field interpolation performance with Nyquist rate sampling (dmax=1). The point on each line where the number of planes equals the disparity range is indicated, where equality is achieved in the sampling bound (Equation 7). Except at D=128 planes, the embodiment of techniques described herein renders views effectively as LFI using Nyquist sampling until the undersampling rate exceeds the number of planes. At D=64, this means that techniques described herein achieve same quality as LFI with 642≈4000× fewer views.

FIG. 27 illustrates a subset of the same data plotted in FIG. 26. FIG. 27 shows that (for D≤64) the line representing $d_{max}$ pixels of disparity reaches LFI Nyquist quality (dashed line) precisely when D=$d_{max}$. Furthermore, continuing into the region where D>$d_{max}$ does not meaningfully improve performance; adding additional planes once satisfying the sampling bound is not necessary.

In some embodiments, the degradation at 128 planes/pixels of disparity may be due to the following factors. The training phase was completed using only used a maximum of 128 planes. At 128 pixels of disparity, a significant portion of the background pixels are occluded in at least one input view, which makes it harder for the network to find matches in the plane sweep volume. At the test resolution of 640×

480, field of view overlap between neighboring images drops significantly at 128 pixels of disparity (at 256 pixels our field of view inequality Equation 5 is not satisfied).

FIG. 26 also illustrates that in some embodiments once the sampling bound is satisfied, adding additional planes does not increase performance below the Nyquist limit. For example, at 32 pixels of disparity, increasing from 8 to 16 to 32 planes decreases the LPIPS error, but performance stays constant from 32 to 128 planes. Accordingly, for scenes up to 64 pixels of disparity, adding additional planes past the maximum pixel disparity between input views is of limited value, in accordance with the theoretical claim that partitioning a scene with disparity variation of D pixels into D depth ranges is sufficient for continuous reconstruction.

Comparisons to Baseline Methods

According to various embodiments, evidence presented herein quantitatively (FIG. 33) and qualitatively (FIG. 30) demonstrate that techniques described herein produce renderings superior to conventional techniques, particularly for non-Lambertian effects, without flickering and ghosting artifacts seen in renderings by competing methods. The synthetic test set described above was used to compare techniques described herein to conventional techniques for view interpolation from regularly sampled inputs as well as view-dependent texture-mapping using a global mesh proxy geometry.

The table shown in FIG. 33 presents quantitative comparisons on the synthetic test set. The best measurement in each column is presented in bold. LPIPS is a perceptual metric based on weighted differences of neural network activations and decreases to zero as image quality improves. For methods that depend on a plane sweep volume (e.g., Soft3D, BW Deep), the number of depth planes used in the volumes is set to $d_{max}$.

Soft3D is a conventional view synthesis algorithm that computes a local volumetric scene representation for each input view and projects and blends these volumes to render each novel view. However, it is based on classic local stereo and guided filtering to compute each volumetric representation instead of our end-to-end deep learning based MPI prediction. Furthermore, since classic stereo methods are unreliable for smooth or repetitive image textures and non-Lambertian materials, Soft3D relies on smoothing their geometry estimation across many (up to 25) input views.

According to various embodiments, the table shown in FIG. 33 quantitatively demonstrates that an embodiment of techniques described herein outperforms Soft3D overall. In particular, Soft3D's performance degrades much more rapidly as the input view sampling rate decreases since their aggregation is less effective as fewer input images view the same scene content. FIG. 30 qualitatively demonstrates that Soft3D generally contains blurred geometry artifacts due to errors in local depth estimation. The same Figure also illustrates how Soft3D's approach fails for rendering non-Lambertian effects because their aggregation procedure blurs the specularity geometry, which changes with the input image viewpoint. One advantage of this approach is its temporal consistency, visible in the epipolar plots in FIG. 30.

The Backwards warping deep network (BW Deep) baseline subsumes recent conventional deep learning view synthesis techniques that use a CNN to estimate geometry for each novel view and then backwards warp and blend nearby input images to render the target view. This baseline involves training a network that uses the same 3D CNN architecture as the MPI prediction network but instead outputs a single depth map at the pose of the new target view. This baseline then backwards warps the five input images into the new view using this depth map and uses a second 2D CNN to composite these warped input images into a single output rendered view.

FIG. 33 shows that one embodiment of techniques described herein quantitatively outperforms the BW Deep baseline. Further, the BW Deep approach suffers from extreme temporal inconsistency when rendering video sequences. Because a CNN is used to estimate depth separately for each output frame, artifacts can appear and disappear over the course of only a few frames, causes rapid flickers and pops in the output sequence. This inconsistency is visible as corruption in the epipolar plots in FIG. 30. Errors can also be found in single frames where the depth is ambiguous (e.g., around thin structures or non-Lambertian surfaces), seen in the crops in FIG. 30.

The Unstructured Lumigraph Rendering (ULR) baseline is representative of conventional view dependent texture mapping using an estimated global mesh as a geometry proxy. A global mesh is reconstructed from all inputs. For each pixel in a new target view, heuristic blending weights are used to blend input images reprojected using the global mesh geometry. This baseline suffers from the problem that mesh reconstruction often fails to fill in large portions of the scene. Where there are holes in the global mesh, the mean scene disparity is used to reproject, which causes the same ghosting that is seen in light field interpolation. This results in low quantitative performance when averaged over multiple scenes, as seen in FIG. 33. FIG. 30 shows examples of distracting visual artifacts resulting from the inevitable errors in mesh estimation under this approach.

The Light Field Interpolation (LFI) baseline is representative of classic signal processing based continuous view reconstruction. Following the method of plenoptic sampling, this baseline renders novel views using a bilinear interpolation reconstruction filter sheared to the mean scene disparity. FIG. 30 demonstrates that increasing the camera spacing past the Nyquist rate results in extreme aliasing and ghosting artifacts when using this method.

FIG. 30 illustrates example results on real cellphone datasets. A sequence of new views is rendered, and FIG. 30 shows both a crop from a single rendered output and an epipolar slice over the sequence. The conventional LFI approach fails to cleanly represent objects at different depths because it only uses a single depth plane for reprojection, leading to ghosting visible in the crops (tree trunk in Willow) and depth inconsistency visible in all epipolar images. In the conventional Soft3D approach, depth uncertainty across views leads to consistent softness relative to our method. In the conventional BW Deep approach, use of a CNN to render every frame in the new path leads to depth inconsistency, visible as choppiness across the rows of the epipolar images. Additionally, BW Deep selects a single depth per pixel, often leading to errors in the cases of ambiguous depth caused by thin structures (Lemon Tree and Willow), transparency (Air Plants), and reflection (Pond). Each of these synthesized paths can be found in the supplemental video.

Ablation Studies

Ablation studies were performed to validate the overall strategy of blending between multiple MPIs as well as the blending procedure that considers accumulated alphas.

The fifth row of the table shown in FIG. 33 (Single MPI) shows that in some implementations using only one MPI to produce new views results in significantly decreased performance due to the limited field-of-view represented in a single MPI as well as depth discretization artifacts as the target view moves far from the MPI reference viewpoint.

Additionally, FIG. 24 shows an example of complex non-Lambertian reflectance that cannot be represented by a single MPI.

The sixth row of the table shown in FIG. 33 (Average MPIs) shows that in some implementations blending multiple MPI outputs for each novel view without using the accumulated alpha channels results in decreased performance. FIG. 23 visualizes that this simple blending leads to ghosting in regions that are occluded from the inputs of any of the MPIs used for rendering, because they will contain incorrect content in disoccluded regions.

Asymptotic Rendering Time and Space Complexity

In some embodiments, within the possible choices of rendering resolution W and number of sampled views N that satisfy the above guideline, different users or applications may value the capture time, rendering time, and storage costs differently. The asymptotic complexities of these quantities is evaluated to further assist in choosing correct parameters for an application.

In some embodiments, the capture time is O(N). The render time of each MPI generated is proportional to the number of planes times the pixels per plane:

$$W^2 D = \frac{W^3 S}{2\sqrt{N} z_{min} \tan(\theta/2)} = O(W^3 N^{-1/2}). \quad (14)$$

In some embodiments, the total MPI storage cost is proportional to:

$$W^2 D \cdot N = \frac{W^3 S \sqrt{N}}{2 z_{min} \tan(\theta/2)} = O(W^3 \sqrt{N}). \quad (15)$$

In some implementations, rendering time and storage constraints may be indicated, and then the image resolution and number of sampled views may be maximized to satisfy those constraints as well as the guideline in Equation 12. FIG. 29 visualizes these constraints for an example user.

FIG. 29 illustrates the time and storage cost tradeoff within the space of target rendering resolution and number of sampled views that result in Nyquist level perceptual quality, in accordance with one or more embodiments. The tradeoff space is visualized for an example scene with close depth $z_{min}=1.0$ m and target view plane with side length 0.5 m, captured with a camera with a 64-degree field-of-view.

According to various embodiments, the time and storage cost tradeoff may be used to balance factors such as rendering time and storage constraints. For example, factors such as image resolution may be automatically adjusted. As another example, as part of the image collection process, a user may provide user input indicating a desired quality level or processing speed.

Multi-view Interactive Digital Media Representations

Various embodiments described herein relate generally to systems and methods for analyzing the spatial relationship between multiple images and video together with location information data, for the purpose of creating a single representation, a multi-view interactive digital media representations (MVIDMR), which eliminates redundancy in the data, and presents a user with an interactive and immersive active viewing experience. According to various embodiments, active is described in the context of providing a user with the ability to control the viewpoint of the visual information displayed on a screen.

In particular example embodiments, augmented reality (AR) is used to aid a user in capturing the multiple images used in a MVIDMR. For example, a virtual guide can be inserted into live image data from a mobile. The virtual guide can help the user guide the mobile device along a desirable path useful for creating the MVIDMR. The virtual guide in the AR images can respond to movements of the mobile device. The movement of mobile device can be determined from a number of different sources, including but not limited to an Inertial Measurement Unit and image data.

Various aspects also relate generally to systems and methods for providing feedback when generating a MVIDMR. For example, object recognition may be used to recognize an object present in a MVIDMR. Then, feedback such as one or more visual indicators may be provided to guide the user in collecting additional MVIDMR data to collect a high-quality MVIDMR of the object. As another example, a target view may be determined for a MVIDMR, such as the terminal point when capturing a 360-degree MVIDMR. Then, feedback such as one or more visual indicators may be provided to guide the user in collecting additional MVIDMR data to reach the target view.

FIG. 5 shows and example of a MVIDMR acquisition system 500, configured in accordance with one or more embodiments. The MVIDMR acquisition system 500 is depicted in a flow sequence that can be used to generate a MVIDMR. According to various embodiments, the data used to generate a MVIDMR can come from a variety of sources.

In particular, data such as, but not limited to two-dimensional (2D) images 504 can be used to generate a MVIDMR. These 2D images can include color image data streams such as multiple image sequences, video data, etc., or multiple images in any of various formats for images, depending on the application. As will be described in more detail below with respect to FIGS. 7A-11B, during an image capture process, an AR system can be used. The AR system can receive and augment live image data with virtual data. In particular, the virtual data can include guides for helping a user direct the motion of an image capture device.

Another source of data that can be used to generate a MVIDMR includes environment information 506. This environment information 506 can be obtained from sources such as accelerometers, gyroscopes, magnetometers, GPS, WiFi, IMU-like systems (Inertial Measurement Unit systems), and the like. Yet another source of data that can be used to generate a MVIDMR can include depth images 508. These depth images can include depth, 3D, or disparity image data streams, and the like, and can be captured by devices such as, but not limited to, stereo cameras, time-of-flight cameras, three-dimensional cameras, and the like.

In some embodiments, the data can then be fused together at sensor fusion block 510. In some embodiments, a MVIDMR can be generated a combination of data that includes both 2D images 504 and environment information 506, without any depth images 508 provided. In other embodiments, depth images 508 and environment information 506 can be used together at sensor fusion block 510. Various combinations of image data can be used with environment information at 506, depending on the application and available data.

In some embodiments, the data that has been fused together at sensor fusion block 510 is then used for content modeling 512 and context modeling 514. As described in more detail with regard to FIG. $, the subject matter featured in the images can be separated into content and context. The content can be delineated as the object of interest and the context can be delineated as the scenery surrounding the object of interest. According to various embodiments, the content can be a three-dimensional model, depicting an object of interest, although the content can be a two-dimensional image in some embodiments, as described in more detail below with regard to FIG. $. Furthermore, in some embodiments, the context can be a two-dimensional model depicting the scenery surrounding the object of interest. Although in many examples the context can provide two-dimensional views of the scenery surrounding the object of interest, the context can also include three-dimensional aspects in some embodiments. For instance, the context can be depicted as a "flat" image along a cylindrical "canvas," such that the "flat" image appears on the surface of a cylinder. In addition, some examples may include three-dimensional context models, such as when some objects are identified in the surrounding scenery as three-dimensional objects. According to various embodiments, the models provided by content modeling 512 and context modeling 514 can be generated by combining the image and location information data, as described in more detail with regard to FIG. #.

According to various embodiments, context and content of a MVIDMR are determined based on a specified object of interest. In some embodiments, an object of interest is automatically chosen based on processing of the image and location information data. For instance, if a dominant object is detected in a series of images, this object can be selected as the content. In other examples, a user specified target 502 can be chosen, as shown in FIG. 5. It should be noted, however, that a MVIDMR can be generated without a user-specified target in some applications.

In some embodiments, one or more enhancement algorithms can be applied at enhancement algorithm(s) block 516. In particular example embodiments, various algorithms can be employed during capture of MVIDMR data, regardless of the type of capture mode employed. These algorithms can be used to enhance the user experience. For instance, automatic frame selection, stabilization, view interpolation, filters, and/or compression can be used during capture of MVIDMR data. In some embodiments, these enhancement algorithms can be applied to image data after acquisition of the data. In other examples, these enhancement algorithms can be applied to image data during capture of MVIDMR data.

According to various embodiments, automatic frame selection can be used to create a more enjoyable MVIDMR. Specifically, frames are automatically selected so that the transition between them will be smoother or more even. This automatic frame selection can incorporate blur- and over-exposure-detection in some applications, as well as more uniformly sampling poses such that they are more evenly distributed.

In some embodiments, stabilization can be used for a MVIDMR in a manner similar to that used for video. In particular, keyframes in a MVIDMR can be stabilized for to produce improvements such as smoother transitions, improved/enhanced focus on the content, etc. However, unlike video, there are many additional sources of stabilization for a MVIDMR, such as by using IMU information, depth information, computer vision techniques, direct selection of an area to be stabilized, face detection, and the like.

For instance, IMU information can be very helpful for stabilization. In particular, IMU information provides an estimate, although sometimes a rough or noisy estimate, of the camera tremor that may occur during image capture. This estimate can be used to remove, cancel, and/or reduce the effects of such camera tremor.

In some embodiments, depth information, if available, can be used to provide stabilization for a MVIDMR. Because points of interest in a MVIDMR are three-dimensional, rather than two-dimensional, these points of interest are more constrained and tracking/matching of these points is simplified as the search space reduces. Furthermore, descriptors for points of interest can use both color and depth information and therefore, become more discriminative. In addition, automatic or semi-automatic content selection can be easier to provide with depth information. For instance, when a user selects a particular pixel of an image, this selection can be expanded to fill the entire surface that touches it. Furthermore, content can also be selected automatically by using a foreground/background differentiation based on depth. According to various embodiments, the content can stay relatively stable/visible even when the context changes.

According to various embodiments, computer vision techniques can also be used to provide stabilization for MVIDMRs. For instance, keypoints can be detected and tracked. However, in certain scenes, such as a dynamic scene or static scene with parallax, no simple warp exists that can stabilize everything. Consequently, there is a trade-off in which certain aspects of the scene receive more attention to stabilization and other aspects of the scene receive less attention. Because a MVIDMR is often focused on a particular object of interest, a MVIDMR can be content-weighted so that the object of interest is maximally stabilized in some examples.

Another way to improve stabilization in a MVIDMR includes direct selection of a region of a screen. For instance, if a user taps to focus on a region of a screen, then records a convex MVIDMR, the area that was tapped can be maximally stabilized. This allows stabilization algorithms to be focused on a particular area or object of interest.

In some embodiments, face detection can be used to provide stabilization. For instance, when recording with a front-facing camera, it is often likely that the user is the object of interest in the scene. Thus, face detection can be used to weight stabilization about that region. When face detection is precise enough, facial features themselves (such as eyes, nose, and mouth) can be used as areas to stabilize, rather than using generic keypoints. In another example, a user can select an area of image to use as a source for keypoints.

According to various embodiments, view interpolation can be used to improve the viewing experience. In particular, to avoid sudden "jumps" between stabilized frames, synthetic, intermediate views can be rendered on the fly. This can be informed by content-weighted keypoint tracks and IMU information as described above, as well as by denser pixel-to-pixel matches. If depth information is available, fewer artifacts resulting from mismatched pixels may occur, thereby simplifying the process. As described above, view interpolation can be applied during capture of a MVIDMR in some embodiments. In other embodiments, view interpolation can be applied during MVIDMR generation.

In some embodiments, filters can also be used during capture or generation of a MVIDMR to enhance the viewing experience. Just as many popular photo sharing services provide aesthetic filters that can be applied to static, two-dimensional images, aesthetic filters can similarly be applied to surround images. However, because a MVIDMR representation is more expressive than a two-dimensional image, and three-dimensional information is available in a MVIDMR, these filters can be extended to include effects that are ill-defined in two dimensional photos. For instance, in a MVIDMR, motion blur can be added to the background (i.e. context) while the content remains crisp. In another example, a drop-shadow can be added to the object of interest in a MVIDMR.

According to various embodiments, compression can also be used as an enhancement algorithm 516. In particular, compression can be used to enhance user-experience by reducing data upload and download costs. Because MVIDMRs use spatial information, far less data can be sent for a MVIDMR than a typical video, while maintaining desired qualities of the MVIDMR. Specifically, the IMU, keypoint tracks, and user input, combined with the view interpolation described above, can all reduce the amount of data that must be transferred to and from a device during upload or download of a MVIDMR. For instance, if an object of interest can be properly identified, a variable compression style can be chosen for the content and context. This variable compression style can include lower quality resolution for background information (i.e. context) and higher quality resolution for foreground information (i.e. content) in some examples. In such examples, the amount of data transmitted can be reduced by sacrificing some of the context quality, while maintaining a desired level of quality for the content.

In the present embodiment, a MVIDMR 518 is generated after any enhancement algorithms are applied. The MVIDMR can provide a multi-view interactive digital media representation. According to various embodiments, the MVIDMR can include three-dimensional model of the content and a two-dimensional model of the context. However, in some examples, the context can represent a "flat" view of the scenery or background as projected along a surface, such as a cylindrical or other-shaped surface, such that the context is not purely two-dimensional. In yet other examples, the context can include three-dimensional aspects.

According to various embodiments, MVIDMRs provide numerous advantages over traditional two-dimensional images or videos. Some of these advantages include: the ability to cope with moving scenery, a moving acquisition device, or both; the ability to model parts of the scene in three-dimensions; the ability to remove unnecessary, redundant information and reduce the memory footprint of the output dataset; the ability to distinguish between content and context; the ability to use the distinction between content and context for improvements in the user-experience; the ability to use the distinction between content and context for improvements in memory footprint (an example would be high quality compression of content and low quality compression of context); the ability to associate special feature descriptors with MVIDMRs that allow the MVIDMRs to be indexed with a high degree of efficiency and accuracy; and the ability of the user to interact and change the viewpoint of the MVIDMR. In particular example embodiments, the characteristics described above can be incorporated natively in the MVIDMR representation, and provide the capability for use in various applications. For instance, MVIDMRs can be used to enhance various fields such as e-commerce, visual search, 3D printing, file sharing, user interaction, and entertainment.

According to various example embodiments, once a MVIDMR 518 is generated, user feedback for acquisition 520 of additional image data can be provided. In particular, if a MVIDMR is determined to need additional views to provide a more accurate model of the content or context, a user may be prompted to provide additional views. Once these additional views are received by the MVIDMR acquisition system 500, these additional views can be processed by the system 500 and incorporated into the MVIDMR.

FIG. 6 shows an example of a process flow diagram for generating a MVIDMR 600. In the present example, a plurality of images is obtained at 602. According to various embodiments, the plurality of images can include two-dimensional (2D) images or data streams. These 2D images can include location information that can be used to generate a MVIDMR. In some embodiments, the plurality of images can include depth images, which can also include location information in various examples.

In some embodiments, when the plurality of images is captured, images output to the user can be augmented with the virtual data. For example, the plurality of images can be captured using a camera system on a mobile device. The live image data, which is output to a display on the mobile device, can include virtual data, such as guides and status indicators, rendered into the live image data. The guides can help a user guide a motion of the mobile device. The status indicators can indicate what portion of images needed for generating a MVIDMR have been captured. The virtual data may not be included in the image data captured for the purposes of generating the MVIDMR.

According to various embodiments, the plurality of images obtained at 602 can include a variety of sources and characteristics. For instance, the plurality of images can be obtained from a plurality of users. These images can be a collection of images gathered from the internet from different users of the same event, such as 2D images or video obtained at a concert, etc. In some embodiments, the plurality of images can include images with different temporal information. In particular, the images can be taken at different times of the same object of interest. For instance, multiple images of a particular statue can be obtained at different times of day, different seasons, etc. In other examples, the plurality of images can represent moving objects. For instance, the images may include an object of interest moving through scenery, such as a vehicle traveling along a road or a plane traveling through the sky. In other instances, the images may include an object of interest that is also moving, such as a person dancing, running, twirling, etc.

In some embodiments, the plurality of images is fused into content and context models at 604. According to various embodiments, the subject matter featured in the images can be separated into content and context. The content can be delineated as the object of interest and the context can be delineated as the scenery surrounding the object of interest. According to various embodiments, the content can be a three-dimensional model, depicting an object of interest, and the content can be a two-dimensional image in some embodiments.

According to the present example embodiment, one or more enhancement algorithms can be applied to the content and context models at 606. These algorithms can be used to enhance the user experience. For instance, enhancement algorithms such as automatic frame selection, stabilization, view interpolation, filters, and/or compression can be used. In some embodiments, these enhancement algorithms can be applied to image data during capture of the images. In other examples, these enhancement algorithms can be applied to image data after acquisition of the data.

In the present embodiment, a MVIDMR is generated from the content and context models at 608. The MVIDMR can provide a multi-view interactive digital media representation. According to various embodiments, the MVIDMR can include a three-dimensional model of the content and a two-dimensional model of the context. According to various embodiments, depending on the mode of capture and the viewpoints of the images, the MVIDMR model can include certain characteristics. For instance, some examples of different styles of MVIDMRs include a locally concave MVIDMR, a locally convex MVIDMR, and a locally flat MVIDMR. However, it should be noted that MVIDMRs can include combinations of views and characteristics, depending on the application.

FIG. 7 shows an example of multiple camera views that can be fused together into a three-dimensional (3D) model to create an immersive experience. According to various embodiments, multiple images can be captured from various viewpoints and fused together to provide a MVIDMR. In some embodiments, three cameras 712, 714, and 716 are positioned at locations 722, 724, and 726, respectively, in proximity to an object of interest 708. Scenery can surround the object of interest 708 such as object 710. Views 702, 704, and 706 from their respective cameras 712, 714, and 716 include overlapping subject matter. Specifically, each view 702, 704, and 706 includes the object of interest 708 and varying degrees of visibility of the scenery surrounding the object 710. For instance, view 702 includes a view of the object of interest 708 in front of the cylinder that is part of the scenery surrounding the object 710. View 706 shows the object of interest 708 to one side of the cylinder, and view 704 shows the object of interest without any view of the cylinder.

In some embodiments, the various views 702, 704, and 716 along with their associated locations 722, 724, and 726, respectively, provide a rich source of information about object of interest 708 and the surrounding context that can be used to produce a MVIDMR. For instance, when analyzed together, the various views 702, 704, and 726 provide information about different sides of the object of interest and the relationship between the object of interest and the scenery. According to various embodiments, this information can be used to parse out the object of interest 708 into content and the scenery as the context. Furthermore, various algorithms can be applied to images produced by these viewpoints to create an immersive, interactive experience when viewing a MVIDMR.

FIG. 8 illustrates one example of separation of content and context in a MVIDMR. According to various embodiments, a MVIDMR is a multi-view interactive digital media representation of a scene 800. With reference to FIG. 8, shown is a user 802 located in a scene 800. The user 802 is capturing images of an object of interest, such as a statue. The images captured by the user constitute digital visual data that can be used to generate a MVIDMR.

According to various embodiments of the present disclosure, the digital visual data included in a MVIDMR can be, semantically and/or practically, separated into content 804 and context 806. According to particular embodiments, content 804 can include the object(s), person(s), or scene(s) of interest while the context 806 represents the remaining elements of the scene surrounding the content 804. In some embodiments, a MVIDMR may represent the content 804 as three-dimensional data, and the context 806 as a two-dimensional panoramic background. In other examples, a MVIDMR may represent both the content 804 and context 806 as two-dimensional panoramic scenes. In yet other examples, content 804 and context 806 may include three-dimensional components or aspects. In particular embodiments, the way that the MVIDMR depicts content 804 and context 806 depends on the capture mode used to acquire the images.

In some embodiments, such as but not limited to: recordings of objects, persons, or parts of objects or persons, where only the object, person, or parts of them are visible, recordings of large flat areas, and recordings of scenes where the data captured appears to be at infinity (i.e., there are no subjects close to the camera), the content 804 and the context 806 may be the same. In these examples, the MVIDMR produced may have some characteristics that are similar to other types of digital media such as panoramas. However, according to various embodiments, MVIDMRs include additional features that distinguish them from these existing types of digital media. For instance, a MVIDMR can represent moving data. Additionally, a MVIDMR is not limited to a specific cylindrical, spherical or translational movement. Various motions can be used to capture image data with a camera or other capture device. Furthermore, unlike a stitched panorama, a MVIDMR can display different sides of the same object.

FIGS. 9A-5B illustrate examples of concave and convex views, respectively, where both views use a back-camera capture style. In particular, if a camera phone is used, these views use the camera on the back of the phone, facing away from the user. In particular embodiments, concave and convex views can affect how the content and context are designated in a MVIDMR.

With reference to FIG. 9A, shown is one example of a concave view 900 in which a user is standing along a vertical axis 908. In this example, the user is holding a camera, such that camera location 902 does not leave axis 908 during image capture. However, as the user pivots about axis 908, the camera captures a panoramic view of the scene around the user, forming a concave view. In this embodiment, the object of interest 904 and the distant scenery 906 are all viewed similarly because of the way in which the images are captured. In this example, all objects in the concave view appear at infinity, so the content is equal to the context according to this view.

With reference to FIG. 9B, shown is one example of a convex view 920 in which a user changes position when capturing images of an object of interest 924. In this example, the user moves around the object of interest 924, taking pictures from different sides of the object of interest from camera locations 928, 930, and 932. Each of the images obtained includes a view of the object of interest, and a background of the distant scenery 926. In the present example, the object of interest 924 represents the content, and the distant scenery 926 represents the context in this convex view.

FIGS. 10A-11B illustrate examples of various capture modes for MVIDMRs. Although various motions can be used to capture a MVIDMR and are not constrained to any particular type of motion, three general types of motion can be used to capture particular features or views described in conjunction MVIDMRs. These three types of motion, respectively, can yield a locally concave MVIDMR, a locally convex MVIDMR, and a locally flat MVIDMR. In some embodiments, a MVIDMR can include various types of motions within the same MVIDMR.

With reference to FIG. 10A, shown is an example of a back-facing, concave MVIDMR being captured. According to various embodiments, a locally concave MVIDMR is one in which the viewing angles of the camera or other capture device diverge. In one dimension this can be likened to the motion required to capture a spherical 360 panorama (pure rotation), although the motion can be generalized to any curved sweeping motion in which the view faces outward. In the present example, the experience is that of a stationary viewer looking out at a (possibly dynamic) context.

In some embodiments, a user 1002 is using a back-facing camera 1006 to capture images towards world 1000, and away from user 1002. As described in various examples, a back-facing camera refers to a device with a camera that faces away from the user, such as the camera on the back of a smart phone. The camera is moved in a concave motion 1008, such that views 1004a, 1004b, and 1004c capture various parts of capture area 1009.

With reference to FIG. 10B, shown is an example of a back-facing, convex MVIDMR being captured. According to various embodiments, a locally convex MVIDMR is one in which viewing angles converge toward a single object of interest. In some embodiments, a locally convex MVIDMR can provide the experience of orbiting about a point, such that a viewer can see multiple sides of the same object. This object, which may be an "object of interest," can be segmented from the MVIDMR to become the content, and any surrounding data can be segmented to become the context. Previous technologies fail to recognize this type of viewing angle in the media-sharing landscape.

In some embodiments, a user 1002 is using a back-facing camera 1014 to capture images towards world 1000, and away from user 1002. The camera is moved in a convex motion 1010, such that views 1012a, 1012b, and 1012c capture various parts of capture area 1011. As described above, world 1000 can include an object of interest in some examples, and the convex motion 1010 can orbit around this object. Views 1012a, 1012b, and 1012c can include views of different sides of this object in these examples.

With reference to FIG. 11A, shown is an example of a front-facing, concave MVIDMR being captured. As described in various examples, a front-facing camera refers to a device with a camera that faces towards the user, such as the camera on the front of a smart phone. For instance, front-facing cameras are commonly used to take "selfies" (i.e., self-portraits of the user).

In some embodiments, camera 1120 is facing user 1102. The camera follows a concave motion 1106 such that the views 1118a, 1118b, and 1118c diverge from each other in an angular sense. The capture area 1117 follows a concave shape that includes the user at a perimeter.

With reference to FIG. 11B, shown is an example of a front-facing, convex MVIDMR being captured. In some embodiments, camera 1126 is facing user 1102. The camera follows a convex motion 1122 such that the views 1124a, 1124b, and 1124c converge towards the user 1102. As described above, various modes can be used to capture images for a MVIDMR. These modes, including locally concave, locally convex, and locally linear motions, can be used during capture of separate images or during continuous recording of a scene. Such recording can capture a series of images during a single session.

In some embodiments, the augmented reality system can be implemented on a mobile device, such as a cell phone. In particular, the live camera data, which is output to a display on the mobile device, can be augmented with virtual objects. The virtual objects can be rendered into the live camera data. In some embodiments, the virtual objects can provide a user feedback when images are being captured for a MVIDMR.

FIG. 12 illustrates an example of a process flow for capturing images in a MVIDMR using augmented reality. In 1202, live image data can be received from a camera system. For example, live image data can be received from one or more cameras on a hand-held mobile device, such as a smartphone. The image data can include pixel data captured from a camera sensor. The pixel data varies from frame to frame. In some embodiments, the pixel data can be 2-D. In other embodiments, depth data can be included with the pixel data.

In 1204, sensor data can be received. For example, the mobile device can include an IMU with accelerometers and gyroscopes. The sensor data can be used to determine an orientation of the mobile device, such as a tilt orientation of the device relative to the gravity vector. Thus, the orientation of the live 2-D image data relative to the gravity vector can also be determined. In addition, when the user applied accelerations can be separated from the acceleration due to gravity, it may be possible to determine changes in position of the mobile device as a function of time.

In particular embodiments, a camera reference frame can be determined. In the camera reference frame, one axis is aligned with a line perpendicular to the camera lens. Using an accelerometer on the phone, the camera reference frame can be related to an Earth reference frame. The earth reference frame can provide a 3-D coordinate system where one of the axes is aligned with the Earths' gravitational vector. The relationship between the camera frame and Earth reference frame can be indicated as yaw, roll and tilt/pitch. Typically, at least two of the three of yaw, roll and pitch are available typically from sensors available on a mobile device, such as smart phone's gyroscopes and accelerometers.

The combination of yaw-roll-tilt information from the sensors, such as a smart phone or tablets accelerometers and the data from the camera including the pixel data can be used to relate the 2-D pixel arrangement in the camera field of view to the 3-D reference frame in the real world. In some embodiments, the 2-D pixel data for each picture can be translated to a reference frame as if the camera where resting on a horizontal plane perpendicular to an axis through the gravitational center of the Earth where a line drawn through the center of lens perpendicular to the surface of lens is mapped to a center of the pixel data. This reference frame can be referred as an Earth reference frame. Using this calibration of the pixel data, a curve or object defined in 3-D space in the earth reference frame can be mapped to a plane associated with the pixel data (2-D pixel data). If depth data is available, i.e., the distance of the camera to a pixel. Then, this information can also be utilized in a transformation.

In alternate embodiments, the 3-D reference frame in which an object is defined doesn't have to be an Earth reference frame. In some embodiments, a 3-D reference in which an object is drawn and then rendered into the 2-D pixel frame of reference can be defined relative to the Earth reference frame. In another embodiment, a 3-D reference frame can be defined relative to an object or surface identified in the pixel data and then the pixel data can be calibrated to this 3-D reference frame.

As an example, the object or surface can be defined by a number of tracking points identified in the pixel data. Then, as the camera moves, using the sensor data and a new position of the tracking points, a change in the orientation of the 3-D reference frame can be determined from frame to frame. This information can be used to render virtual data in a live image data and/or virtual data into a MVIDMR.

Returning to FIG. 12, in 1206, virtual data associated with a target can be generated in the live image data. For example, the target can be cross hairs. In general, the target can be rendered as any shape or combinations of shapes. In some embodiments, via an input interface, a user may be able to adjust a position of the target. For example, using a touch screen over a display on which the live image data is output, the user may be able to place the target at a particular location in the synthetic image. The synthetic image can include a combination of live image data rendered with one or more virtual objects.

For example, the target can be placed over an object that appears in the image, such as a face or a person. Then, the user can provide an additional input via an interface that indicates the target is in a desired location. For example, the user can tap the touch screen proximate to the location where the target appears on the display. Then, an object in the image below the target can be selected. As another example, a microphone in the interface can be used to receive voice commands which direct a position of the target in the image (e.g., move left, move right, etc.) and then confirm when the target is in a desired location (e.g., select target).

In some instances, object recognition can be available. Object recognition can identify possible objects in the image. Then, the live images can be augmented with a number of indicators, such as targets, which mark identified objects. For example, objects, such as people, parts of people (e.g., faces), cars, wheels, can be marked in the image. Via an interface, the person may be able to select one of the marked objects, such as via the touch screen interface. In another embodiment, the person may be able to provide a voice command to select an object. For example, the person may be to say something like "select face," or "select car."

In 1208, the object selection can be received. The object selection can be used to determine an area within the image data to identify tracking points. When the area in the image data is over a target, the tracking points can be associated with an object appearing in the live image data.

In 1210, tracking points can be identified which are related to the selected object. Once an object is selected, the tracking points on the object can be identified on a frame to frame basis. Thus, if the camera translates or changes orientation, the location of the tracking points in the new frame can be identified and the target can be rendered in the live images so that it appears to stay over the tracked object in the image. This feature is discussed in more detail below. In particular embodiments, object detection and/or recognition may be used for each or most frames, for instance to facilitate identifying the location of tracking points.

In some embodiments, tracking an object can refer to tracking one or more points from frame to frame in the 2-D image space. The one or more points can be associated with a region in the image. The one or more points or regions can be associated with an object. However, the object doesn't have to be identified in the image. For example, the boundaries of the object in 2-D image space don't have to be known. Further, the type of object doesn't have to be identified. For example, a determination doesn't have to be made as to whether the object is a car, a person or something else appearing in the pixel data. Instead, the one or more points may be tracked based on other image characteristics that appear in successive frames. For instance, edge tracking, corner tracking, or shape tracking may be used to track one or more points from frame to frame.

One advantage of tracking objects in the manner described in the 2-D image space is that a 3-D reconstruction of an object or objects appearing in an image don't have to be performed. The 3-D reconstruction step may involve operations such as "structure from motion (SFM)" and/or "simultaneous localization and mapping (SLAM)." The 3-D reconstruction can involve measuring points in multiple images, and the optimizing for the camera poses and the point locations. When this process is avoided, significant computation time is saved. For example, avoiding the SLAM/SFM computations can enable the methods to be applied when objects in the images are moving. Typically, SLAM/SFM computations assume static environments.

In 1212, a 3-D coordinate system in the physical world can be associated with the image, such as the Earth reference frame, which as described above can be related to camera reference frame associated with the 2-D pixel data. In some embodiments, the 2-D image data can be calibrated so that the associated 3-D coordinate system is anchored to the selected target such that the target is at the origin of the 3-D coordinate system.

Then, in 1214, a 2-D or 3-D trajectory or path can be defined in the 3-D coordinate system. For example, a trajectory or path, such as an arc or a parabola can be mapped to a drawing plane which is perpendicular to the gravity vector in the Earth reference frame. As described above, based upon the orientation of the camera, such as information provided from an IMU, the camera reference frame including the 2-D pixel data can be mapped to the Earth reference frame. The mapping can be used to render the curve defined in the 3-D coordinate system into the 2-D pixel data from the live image data. Then, a synthetic image including the live image data and the virtual object, which is the trajectory or path, can be output to a display.

In general, virtual objects, such as curves or surfaces can be defined in a 3-D coordinate system, such as the Earth reference frame or some other coordinate system related to an orientation of the camera. Then, the virtual objects can be rendered into the 2-D pixel data associated with the live image data to create a synthetic image. The synthetic image can be output to a display.

In some embodiments, the curves or surfaces can be associated with a 3-D model of an object, such as person or a car. In another embodiment, the curves or surfaces can be associated with text. Thus, a text message can be rendered into the live image data. In other embodiments, textures can be assigned to the surfaces in the 3-D model. When a synthetic image is created, these textures can be rendered into the 2-D pixel data associated with the live image data.

When a curve is rendered on a drawing plane in the 3-D coordinate system, such as the Earth reference frame, one or more of the determined tracking points can be projected onto the drawing plane. As another example, a centroid associated with the tracked points can be projected onto the drawing plane. Then, the curve can be defined relative to one or more points projected onto the drawing plane. For example, based upon the target location, a point can be determined on the drawing plane. Then, the point can be used as the center of a circle or arc of some radius drawn in the drawing plane.

In 1214, based upon the associated coordinate system, a curve can be rendered into to the live image data as part of the AR system. In general, one or more virtual objects including plurality of curves, lines or surfaces can be rendered into the live image data. Then, the synthetic image including the live image data and the virtual objects can be output to a display in real-time.

In some embodiments, the one or more virtual object rendered into the live image data can be used to help a user capture images used to create a MVIDMR. For example, the user can indicate a desire to create a MVIDMR of a real object identified in the live image data. The desired MVIDMR can span some angle range, such as forty-five, ninety, one hundred eighty degrees or three hundred sixty degrees. Then, a virtual object can be rendered as a guide where the guide is inserted into the live image data. The guide can indicate a path along which to move the camera and the progress along the path. The insertion of the guide can involve modifying the pixel data in the live image data in accordance with coordinate system in 1212.

In the example above, the real object can be some object which appears in the live image data. For the real object, a 3-D model may not be constructed. Instead, pixel locations or pixel areas can be associated with the real object in the 2-D pixel data. This definition of the real object is much less computational expensive than attempting to construct a 3-D model of the real object in physical space.

The virtual objects, such as lines or surfaces can be modeled in the 3-D space. The virtual objects can be defined a priori. Thus, the shape of the virtual object doesn't have to be constructed in real-time, which is computational expensive. The real objects which may appear in an image are not known a priori. Hence, 3-D models of the real object are not typically available. Therefore, the synthetic image can include "real" objects which are only defined in the 2-D image space via assigning tracking points or areas to the real object and virtual objects which are modeled in a 3-D coordinate system and then rendered into the live image data.

Returning to FIG. 12, in 1216, AR image with one or more virtual objects can be output. The pixel data in the live image data can be received at a particular frame rate. In particular embodiments, the augmented frames can be output at the same frame rate as it received. In other embodiments, it can be output at a reduced frame rate. The reduced frame rate can lessen computation requirements. For example, live data received at 30 frames per second can be output at 15 frames per second. In another embodiment, the AR images can be output at a reduced resolution, such as 240 p instead of 480 p. The reduced resolution can also be used to reduce computational requirements.

In 1218, one or more images can be selected from the live image data and stored for use in a MVIDMR. In some embodiments, the stored images can include one or more virtual objects. Thus, the virtual objects can be become part of the MVIDMR. In other embodiments, the virtual objects are only output as part of the AR system. But, the image data which is stored for use in the MVIDMR may not include the virtual objects.

In yet other embodiments, a portion of the virtual objects output to the display as part of the AR system can be stored. For example, the AR system can be used to render a guide during the MVIDMR image capture process and render a label associated with the MVIDMR. The label may be stored in the image data for the MVIDMR. However, the guide may not be stored. To store the images without the added virtual objects, a copy may have to be made. The copy can be modified with the virtual data and then output to a display and the original stored or the original can be stored prior to its modification.

In FIG. 13, the method in FIG. 12 is continued. In 1302, new image data can be received. In 1304, new IMU data (or, in general sensor data) can be received. The IMU data can represent a current orientation of the camera. In 1306, the location of the tracking points identified in previous image data can be identified in the new image data.

The camera may have tilted and/or moved. Hence, the tracking points may appear at a different location in the pixel data. As described above, the tracking points can be used to define a real object appearing in the live image data. Thus, identifying the location of the tracking points in the new image data allows the real object to be tracked from image to image. The differences in IMU data from frame to frame and knowledge of the rate at which the frames are recorded can be used to help to determine a change in location of tracking points in the live image data from frame to frame.

The tracking points associated with a real object appearing in the live image data may change over time. As a camera moves around the real object, some tracking points identified on the real object may go out of view as new portions of the real object come into view and other portions of the real object are occluded. Thus, in 1306, a determination may be made whether a tracking point is still visible in an image. In addition, a determination may be made as to whether a new portion of the targeted object has come into view. New tracking points can be added to the new portion to allow for continued tracking of the real object from frame to frame.

In 1308, a coordinate system can be associated with the image. For example, using an orientation of the camera determined from the sensor data, the pixel data can be calibrated to an Earth reference frame as previously described. In 1310, based upon the tracking points currently placed on the object and the coordinate system a target location can be determined. The target can be placed over the real object which is tracked in live image data. As described above, a number and a location of the tracking points identified in an image can vary with time as the position of the camera changes relative to the camera. Thus, the location of the target in the 2-D pixel data can change. A virtual object representing the target can be rendered into the live image data. In particular embodiments, a coordinate system may be defined based on identifying a position from the tracking data and an orientation from the IMU (or other) data.

In 1312, a track location in the live image data can be determined. The track can be used to provide feedback associated with a position and orientation of a camera in physical space during the image capture process for a MVIDMR. As an example, as described above, the track can be rendered in a drawing plane which is perpendicular to the gravity vector, such as parallel to the ground. Further, the track can be rendered relative to a position of the target, which is a virtual object, placed over a real object appearing in the live image data. Thus, the track can appear to surround or partially surround the object. As described above, the position of the target can be determined from the current set of tracking points associated with the real object appearing in the image. The position of the target can be projected onto the selected drawing plane.

In 1314, a capture indicator status can be determined. The capture indicator can be used to provide feedback in regards to what portion of the image data used in a MVIDMR has been captured. For example, the status indicator may indicate that half of angle range of images for use in a MVIDMR has been captured. In another embodiment, the status indicator may be used to provide feedback in regards to whether the camera is following a desired path and maintaining a desired orientation in physical space. Thus, the status indicator may indicate the current path or orientation of the camera is desirable or not desirable. When the current path or orientation of the camera is not desirable, the status indicator may be configured to indicate what type of correction which is needed, such as but not limited to moving the camera more slowly, starting the capture process over, tilting the camera in a certain direction and/or translating the camera in a particular direction.

In 1316, a capture indicator location can be determined. The location can be used to render the capture indicator into the live image and generate the synthetic image. In some embodiments, the position of the capture indicator can be determined relative to a position of the real object in the image as indicated by the current set of tracking points, such as above and to left of the real object. In 1318, a synthetic image, i.e., a live image augmented with virtual objects, can be generated. The synthetic image can include the target, the track and one or more status indicators at their determined locations, respectively. In 1320, image data captured for the purposes of use in a MVIDMR can be captured. As described above, the stored image data can be raw image data without virtual objects or may include virtual objects.

In 1322, a check can be made as to whether images needed to generate a MVIDMR have been captured in accordance with the selected parameters, such as a MVIDMR spanning a desired angle range. When the capture is not complete, new image data may be received and the method may return to 1302. When the capture is complete, a virtual object can be rendered into the live image data indicating the completion of the capture process for the MVIDMR and a MVIDMR can be created at 1324. Some virtual objects associated with the capture process may cease to be rendered. For example, once the needed images have been captured the track used to help guide the camera during the capture process may no longer be generated in the live image data.

FIGS. 14A and 14B illustrate aspects of generating an Augmented Reality (AR) image capture track for capturing images used in a MVIDMR. In FIG. 14A, a mobile device 1414 with a display 1416 is shown. The mobile device can include at least one camera (not shown) with a field of view 1400. A real object 1402, which is a person, is selected in the field of view 1400 of the camera. A virtual object, which is a target (not shown), may have been used to help select the real object. For example, the target on a touch screen display of the mobile device 1414 may have been placed over the object 1402 and then selected.

The camera can include an image sensor which captures light in the field of view 1400. The data from the image sensor can be converted to pixel data. The pixel data can be modified prior to its output on display 1416 to generate a synthetic image. The modifications can include rendering virtual objects in the pixel data as part of an augmented reality (AR) system.

Using the pixel data and a selection of the object 1402, tracking points on the object can be determined. The tracking points can define the object in image space. Locations of a current set of tracking points, such as 1405, 1406 and 1408, which can be attached to the object 1402 are shown. As a position and orientation of the camera on the mobile device 1414, the shape and position of the object 1402 in the captured pixel data can change. Thus, the location of the tracking points in the pixel data can change. Thus, a previously defined tracking point can move from a first location in the image data to a second location. Also, a tracking point can disappear from the image as portions of the object are occluded.

Using sensor data from the mobile device 1414, an Earth reference frame 3-D coordinate system 1404 can be associated with the image data. The direction of the gravity vector is indicated by arrow 1410. As described above, in a particular embodiment, the 2-D image data can be calibrated relative to the Earth reference frame. The arrow representing the gravity vector is not rendered into the live image data.

However, if desired, an indicator representative of the gravity could be rendered into the synthetic image.

A plane which is perpendicular to the gravity vector can be determined. The location of the plane can be determined using the tracking points in the image, such as 1405, 1406 and 1408. Using this information, a curve, which is a circle, is drawn in the plane. The circle can be rendered into to the 2-D image data and output as part of the AR system. As is shown on display 1416, the circle appears to surround the object 1402. In some embodiments, the circle can be used as a guide for capturing images used in a MVIDMR.

If the camera on the mobile device 1414 is rotated in some way, such as tilted, the shape of the object will change on display 1416. However, the new orientation of the camera can be determined in space including a direction of the gravity vector. Hence, a plane perpendicular to the gravity vector can be determined. The position of the plane and hence, a position of the curve in the image can be based upon a centroid of the object determined from the tracking points associated with the object 1402. Thus, the curve can appear to remain parallel to the ground, i.e., perpendicular to the gravity vector, as the camera 1414 moves. However, the position of the curve can move from location to location in the image as the position of the object and its apparent shape in the live images changes.

In FIG. 14B, a mobile device 1434 including a camera (not shown) and a display 1436 for outputting the image data from the camera is shown. A cup 1422 is shown in the field of view of camera 1420 of the camera. Tracking points, such as 1424 and 1426, have been associated with the object 1422. These tracking points can define the object 1422 in image space. Using the IMU data from the mobile device 1434, a reference frame has been associated with the image data. As described above, In some embodiments, the pixel data can be calibrated to the reference frame. The reference frame is indicated by the 3-D axes 1424 and the direction of the gravity vector is indicated by arrow 1428.

As described above, a plane relative to the reference frame can be determined. In this example, the plane is parallel to the direction of the axis associated with the gravity vector as opposed to perpendicular to the frame. This plane is used to proscribe a path for the MVIDMR which goes over the top of the object 1430. In general, any plane can be determined in the reference frame and then a curve, which is used as a guide, can be rendered into the selected plane.

Using the locations of the tracking points, in some embodiments, a centroid of the object 1422 on the selected plane in the reference can be determined. A curve 1430, such as a circle, can be rendered relative to the centroid. In this example, a circle is rendered around the object 1422 in the selected plane.

The curve 1430 can serve as a track for guiding the camera along a particular path where the images captured along the path can be converted into a MVIDMR. In some embodiments, a position of the camera along the path can be determined. Then, an indicator can be generated which indicates a current location of the camera along the path. In this example, current location is indicated by arrow 1432.

The position of the camera along the path may not directly map to physical space, i.e., the actual position of the camera in physical space doesn't have to be necessarily determined. For example, an angular change can be estimated from the IMU data and optionally the frame rate of the camera. The angular change can be mapped to a distance moved along the curve where the ratio of the distance moved along the path 1430 is not a one to one ratio with the distance moved in physical space. In another example, a total time to traverse the path 1430 can be estimated and then the length of time during which images have been recorded can be tracked. The ratio of the recording time to the total time can be used to indicate progress along the path 1430.

The path 1430, which is an arc, and arrow 1432 are rendered into the live image data as virtual objects in accordance with their positions in the 3-D coordinate system associated with the live 2-D image data. The cup 1422, the circle 1430 and the 1432 arrow are shown output to display 1436. The orientation of the curve 1430 and the arrow 1432 shown on display 1436 relative to the cup 1422 can change if the orientation of the camera is changed, such as if the camera is tilted.

In particular embodiments, a size of the object 1422 in the image data can be changed. For example, the size of the object can be made bigger or smaller by using a digital zoom. In another example, the size of the object can be made bigger or smaller by moving the camera, such as on mobile device 1434, closer or farther away from the object 1422.

When the size of the object changes, the distances between the tracking points can change, i.e., the pixel distances between the tracking points can increase or can decrease. The distance changes can be used to provide a scaling factor. In some embodiments, as the size of the object changes, the AR system can be configured to scale a size of the curve 1430 and/or arrow 1432. Thus, a size of the curve relative to the object can be maintained.

In another embodiment, a size of the curve can remain fixed. For example, a diameter of the curve can be related to a pixel height or width of the image, such as 140 percent of the pixel height or width. Thus, the object 1422 can appear to grow or shrink as a zoom is used or a position of the camera is changed. However, the size of curve 1430 in the image can remain relatively fixed.

FIG. 15 illustrates a second example of generating an Augmented Reality (AR) image capture track for capturing images used in a MVIDMR on a mobile device. FIG. 15 includes a mobile device at three times 1500a, 1500b and 1500c. The device can include at least one camera, a display, an IMU, a processor (CPU), memory, microphone, audio output devices, communication interfaces, a power supply, graphic processor (GPU), graphical memory and combinations thereof. The display is shown with images at three times 1506a, 1506b and 1506c. The display can be overlaid with a touch screen.

In 1506a, an image of an object 1508 is output to the display in state 1506a. The object is a rectangular box. The image data output to the display can be live image data from a camera on the mobile device. The camera could also be a remote camera.

In some embodiments, a target, such as 1510, can be rendered to the display. The target can be combined with the live image data to create a synthetic image. Via the input interface on the phone, a user may be able to adjust a position of the target on the display. The target can be placed on an object and then an additional input can be made to select the object. For example, the touch screen can be tapped at the location of the target.

In another embodiment, object recognition can be applied to the live image data. Various markers can be rendered to the display, which indicate the position of the identified objects in the live image data. To select an object, the touchscreen can be tapped at a location of one of markers appearing in the image or another input device can be used to select the recognized object.

After an object is selected, a number of initial tracking points can be identified on the object, such as 1512, 1514 and 1516. In some embodiments, the tracking points may not appear on the display. In another embodiment, the tracking points may be rendered to the display. In some embodiments, if the tracking point is not located on the object of interest, the user may be able to select the tracking point and delete it or move it so that the tracking point lies on the object.

Next, an orientation of the mobile device can change. The orientation can include a rotation through one or more angles and translational motion as shown in 1504. The orientation change and current orientation of the device can be captured via the IMU data from IMU 1502 on the device.

As the orientation of the device is changed, one or more of the tracking points, such as 1512, 1514 and 1516, can be occluded. In addition, the shape of surfaces currently appearing in the image can change. Based on changes between frames, movement at various pixel locations can be determined. Using the IMU data and the determined movement at the various pixel locations, surfaces associated with the object 1508 can be predicted. The new surfaces can be appearing in the image as the position of the camera changes. New tracking points can be added to these surfaces.

As described above, the mobile device can be used to capture images used in a MVIDMR. To aid in the capture, the live image data can be augmented with a track or other guides to help the user move the mobile device correctly. The track can include indicators that provide feedback to a user while images associated with a MVIDMR are being recorded. In 1506c, the live image data is augmented with a path 1522. The beginning and end of the path is indicated by the text, "start" and "finish." The distance along the path is indicated by shaded region 1518.

The circle with the arrow 1520 is used to indicate a location on the path. In some embodiments, the position of the arrow relative to the path can change. For example, the arrow can move above or below the path or point in a direction which is not aligned with the path. The arrow can be rendered in this way when it is determined the orientation of the camera relative to the object or position of the camera diverges from a path that is desirable for generating the MVIDMR. Colors or other indicators can be used to indicate the status. For example, the arrow and/or circle can be rendered green when the mobile device is properly following the path and red when the position/orientation of the camera relative to the object is less than optimal.

FIGS. 16A and 16B illustrate yet another example of generating an Augmented Reality (AR) image capture track including status indicators for capturing images used in a MVIDMR. The synthetic image generated by the AR system can consist of live image data from a camera augmented with one or more virtual objects. For example, as described above, the live image data can be from a camera on a mobile device.

In FIG. 16A, an object 1600a, which is a statue, is shown in an image 1615 from a camera at a first position and orientation. The object 1600a can be selected via the cross hairs 1604a. Once the cross hairs are placed on the object and the object is selected, the cross hairs can move and remain on the object as the object 1600a moves in the image data. As described above, as an object's position/orientation changes in an image, a location to place the cross hairs in an image can be determined. In some embodiments, the position of the cross hairs can be determined via tracking the movements of points in the image, i.e., the tracking points.

In particular embodiments, if another object is moved in front of a tracked object, it may not be possible to associate the target 1604a with the object. For example, if a person moves in front of the camera, a hand is passed in front of the camera or the camera is moved so the object no longer appears in the camera field of view, then the object which is being tracked will no longer be visible. Hence, it may not be possible to determine a location for the target associated with the tracked object. In the instance where the object reappears in the image, such as if a person that blocked the view of the object moved into and out of the view, then the system can be configured to reacquire the tracking points and reposition the target.

A first virtual object is rendered as indicator 1602a. Indicator 1602a can be used to indicate the progress in capturing images for a MVIDMR. A second virtual object is rendered as curve 1610. Third and fourth virtual objects are rendered as lines 1606 and 1608. A fifth virtual object is rendered as curve 1612.

The curve 1610 can be used to depict a path of a camera. Whereas lines 1606 and 1608 and curve 1612 can be used to indicate an angle range for the MVIDMR. In this example, the angle range is about ninety degrees.

In FIG. 16B, the position of the camera is different as compared to FIG. 16A. Hence, a different view of object 1600b is presented in image 1625. In particular, the camera view shows more of the front of the object as compared to the view in FIG. 16A. The target 1604b is still affixed to the object 1600b. However, the target is fixed in a different location on the object, i.e., on a front surface as opposed to an arm.

The curve 1616 with arrow 1620 at the end is used to indicate the progress of the image capture along curve 1610. The circle 1618 around the arrow 1620 further highlights the current position of the arrow. As described above, a position and a direction of the arrow 1620 can be used to provide feedback to a user on a deviation of the camera position and/or orientation from curve 1610. Based upon this information, the user may adjust a position and/or orientation of the camera while it is capturing the image data.

Lines 1606 and 1608 still appear in the image but are positioned differently relative to object 1600b. The lines again indicate an angle range. In 1620, the arrow is about half way between lines 1606 and 1608. Hence, an angle of about 45 degrees has been captured around the object 1600b.

The indicator 1602b now includes a shaded region 1622. The shaded region can indicate a portion of a MVIDMR angle range currently captured. In some embodiments, lines 1606 and 1608 can only indicate a portion of the angle range in a MVIDMR that is being captured and the total angle range can be shown via indicator 1602b. In this example, the angle range shown by indicator 1602b is three hundred sixty degrees while lines 1606 and 1608 show a portion of this range which ninety degrees.

With reference to FIG. 17, shown is a particular example of a computer system that can be used to implement particular examples. For instance, the computer system 1700 can be used to provide MVIDMRs according to various embodiments described above. According to various embodiments, a system 1700 suitable for implementing particular embodiments includes a processor 1701, a memory 1703, an interface 1711, and a bus 1715 (e.g., a PCI bus).

The system 1700 can include one or more sensors, such as light sensors, accelerometers, gyroscopes, microphones, cameras including stereoscopic or structured light cameras. As described above, the accelerometers and gyroscopes may be incorporated in an IMU. The sensors can be used to detect movement of a device and determine a position of the device. Further, the sensors can be used to provide inputs into the system. For example, a microphone can be used to detect a sound or input a voice command.

In the instance of the sensors including one or more cameras, the camera system can be configured to output native video data as a live video feed. The live video feed can be augmented and then output to a display, such as a display on a mobile device. The native video can include a series of frames as a function of time. The frame rate is often described as frames per second (fps). Each video frame can be an array of pixels with color or gray scale values for each pixel. For example, a pixel array size can be 512 by 512 pixels with three color values (red, green and blue) per pixel. The three color values can be represented by varying amounts of bits, such as 24, 30, 36, 40 bits, etc. per pixel. When more bits are assigned to representing the RGB color values for each pixel, a larger number of colors values are possible. However, the data associated with each image also increases. The number of possible colors can be referred to as the color depth.

The video frames in the live video feed can be communicated to an image processing system that includes hardware and software components. The image processing system can include non-persistent memory, such as random-access memory (RAM) and video RAM (VRAM). In addition, processors, such as central processing units (CPUs) and graphical processing units (GPUs) for operating on video data and communication busses and interfaces for transporting video data can be provided. Further, hardware and/or software for performing transformations on the video data in a live video feed can be provided.

In particular embodiments, the video transformation components can include specialized hardware elements configured to perform functions necessary to generate a synthetic image derived from the native video data and then augmented with virtual data. In data encryption, specialized hardware elements can be used to perform a specific data transformation, i.e., data encryption associated with a specific algorithm. In a similar manner, specialized hardware elements can be provided to perform all or a portion of a specific video data transformation. These video transformation components can be separate from the GPU(s), which are specialized hardware elements configured to perform graphical operations. All or a portion of the specific transformation on a video frame can also be performed using software executed by the CPU.

The processing system can be configured to receive a video frame with first RGB values at each pixel location and apply operation to determine second RGB values at each pixel location. The second RGB values can be associated with a transformed video frame which includes synthetic data. After the synthetic image is generated, the native video frame and/or the synthetic image can be sent to a persistent memory, such as a flash memory or a hard drive, for storage. In addition, the synthetic image and/or native video data can be sent to a frame buffer for output on a display or displays associated with an output interface. For example, the display can be the display on a mobile device or a view finder on a camera.

In general, the video transformations used to generate synthetic images can be applied to the native video data at its native resolution or at a different resolution. For example, the native video data can be a 512 by 512 array with RGB values represented by 24 bits and at frame rate of 24 fps. In some embodiments, the video transformation can involve operating on the video data in its native resolution and outputting the transformed video data at the native frame rate at its native resolution.

In other embodiments, to speed up the process, the video transformations may involve operating on video data and outputting transformed video data at resolutions, color depths and/or frame rates different than the native resolutions. For example, the native video data can be at a first video frame rate, such as 24 fps. But, the video transformations can be performed on every other frame and synthetic images can be output at a frame rate of 12 fps. Alternatively, the transformed video data can be interpolated from the 12 fps rate to 24 fps rate by interpolating between two of the transformed video frames.

In another example, prior to performing the video transformations, the resolution of the native video data can be reduced. For example, when the native resolution is 512 by 512 pixels, it can be interpolated to a 256 by 256 pixel array using a method such as pixel averaging and then the transformation can be applied to the 256 by 256 array. The transformed video data can output and/or stored at the lower 256 by 256 resolution. Alternatively, the transformed video data, such as with a 256 by 256 resolution, can be interpolated to a higher resolution, such as its native resolution of 512 by 512, prior to output to the display and/or storage. The coarsening of the native video data prior to applying the video transformation can be used alone or in conjunction with a coarser frame rate.

As mentioned above, the native video data can also have a color depth. The color depth can also be coarsened prior to applying the transformations to the video data. For example, the color depth might be reduced from 40 bits to 24 bits prior to applying the transformation.

As described above, native video data from a live video can be augmented with virtual data to create synthetic images and then output in real-time. In particular embodiments, real-time can be associated with a certain amount of latency, i.e., the time between when the native video data is captured and the time when the synthetic images including portions of the native video data and virtual data are output. In particular, the latency can be less than 100 milliseconds. In other embodiments, the latency can be less than 50 milliseconds. In other embodiments, the latency can be less than 30 milliseconds. In yet other embodiments, the latency can be less than 20 milliseconds. In yet other embodiments, the latency can be less than 10 milliseconds.

The interface 1711 may include separate input and output interfaces, or may be a unified interface supporting both operations. Examples of input and output interfaces can include displays, audio devices, cameras, touch screens, buttons and microphones. When acting under the control of appropriate software or firmware, the processor 1701 is responsible for such tasks such as optimization. Various specially configured devices can also be used in place of a processor 1701 or in addition to processor 1701, such as graphical processor units (GPUs). The complete implementation can also be done in custom hardware. The interface 1711 is typically configured to send and receive data packets or data segments over a network via one or more communication interfaces, such as wireless or wired communication interfaces. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 1700 uses memory 1703 to store data and program instructions and maintained a local side cache. The program instructions may control the operation of an operating system and/or one or more applications, for example. The memory or memories may also be configured to store received metadata and batch requested metadata.

The system 1700 can be integrated into a single device with a common housing. For example, system 1700 can include a camera system, processing system, frame buffer, persistent memory, output interface, input interface and communication interface. In various embodiments, the single device can be a mobile device like a smart phone, an augmented reality and wearable device like Google Glass™ or a virtual reality head set that includes a multiple cameras, like a Microsoft Hololens™. In other embodiments, the system 1700 can be partially integrated. For example, the camera system can be a remote camera system. As another example, the display can be separate from the rest of the components like on a desktop PC.

In the case of a wearable system, like a head-mounted display, as described above, a virtual guide can be provided to help a user record a MVIDMR. In addition, a virtual guide can be provided to help teach a user how to view a MVIDMR in the wearable system. For example, the virtual guide can be provided in synthetic images output to head mounted display which indicate that the MVIDMR can be viewed from different angles in response to the user moving some manner in physical space, such as walking around the projected image. As another example, the virtual guide can be used to indicate a head motion of the user can allow for different viewing functions. In yet another example, a virtual guide might indicate a path that a hand could travel in front of the display to instantiate different viewing functions.

Model Training Techniques and Mechanisms

FIG. 34 illustrates a method 3400 for training a novel view model, performed in accordance with one or more embodiments. According to various embodiments, the method 3400 may be performed on any suitable computing device having access to training data.

In some implementations, training may be performed by generating novel views of 3D models. Conceptually, images of a 3D scene may be rendered from different viewpoints. Those rendered images may then be used to generate a novel view from a target viewpoint. That novel view may then be compared with a view of the 3D scene rendered directly from the target viewpoint. A loss function between the actual rendering and the novel view may be used to update the model.

At 3402, a request to train a view synthesis model is received. According to various embodiments, a view synthesis model may be trained differently for different contexts. For example, models may be trained differently for different camera resolutions.

At 3404, an image is selected for training. According to various embodiments, the view synthesis pipeline may be trained using renderings of natural scenes. Using novel training data allows the generation of a large dataset with input view and scene depth distributions equivalent or substantially similar to those that may be encountered at test time. Additionally, ground truth poses may be used when training to avoid gradient noise due to incorrect pose estimation from real images. One training dataset may include of images rendered from the SUNCG and/or UnrealCV datasets. SUNCG contains 45,000 simplistic house and room models with texture-mapped surfaces and low geometric complexity. UnrealCV contains only a few large-scale models, but they are modeled and rendered with extreme Lambertian reflectance effects. FIG. 25 shows example images from one training dataset. An example from the SUNCG rendering is shown on the left, while an example from the UnrealCV environment is shown on the right.

At 3406, a target baseline is sampled for input views. In some implementations, views for each training instance may be sampled by first randomly sampling a target baseline for the inputs (up to 128 pixels). Views need not be sampled on a regular grid for training. By training on irregular data, the process may be trained to work with irregular (e.g., handheld) test data.

At 3408, the camera pose is perturbed for the sampled input views. According to various embodiments, the camera pose may be randomly perturbed in 3D to approximately match the baseline determined at 3406. In this way, the random variation in a handheld camera may be simulated.

An MPI is predicted for the sampled input views at 3410. According to various embodiments, the MPI prediction network is first used to separately predict an MPI for each set of inputs (e.g., 5 inputs).

At 3412, the target novel view is rendered from each MPI. For each training step, two sets of views (e.g., 5 views per set) each may be rendered to use as inputs, and a single target view for supervision.

At 3414, the rendered target novel views are blended to create a novel view. In some implementations, the target novel view is rendered from each MPI, and these renderings blended using the accumulated alpha values, as described in Equation 9.

In some embodiments, the model may be trained on the final blended rendering because the fixed rendering and blending functions are differentiable. Learning through this fixed blending step trains the MPI prediction network to leave alpha "holes" in uncertain regions for each MPI, in the neighboring MPI, as illustrated by FIG. 23. FIG. 23 illustrates an example of using accumulated alpha to blend MPI renderings, in accordance with one or more embodiments. Two MPIs are rendered at the same new camera pose. The top row shows the RGB images $C_{t,i}$ from each MPI as well as the accumulated alphas, normalized so that they sum to one at each pixel. The bottom row shows how a simple average of the RGB images $C_{t,i}$ preserves the stretching artifacts from both MPI renderings, whereas the alpha weighted blending combines only the non-occluded pixels from each input to produce a clean output.

In some implementations, training through blending is slower than training a single MPI, so the system may first train on rendering a new view from one MPI for 500 k iterations, for example, and then fine tune through two views blended from different MPIs for 100 k iterations, for example. In one configuration, 320×240 resolution and up to 128 planes are used for SUNCG training data, and 640×480 resolution and up to 32 planes are used for UnrealCV training data. The pipeline may be implemented in Tensorflow and the MPI prediction network parameters optimized using Adam with a learning rate of 2×10-4 and a batch size of one. For example, the training pipeline may be split across two Nvidia RTX 2080 Ti GPUs, and single GPU used for each of the two MPIs whose renderings are then blended before computing the training loss.

At 3416, a loss value is determined for the novel view. In some implementations, the training loss may be modeled as the image reconstruction loss for the rendered novel view. The VGG network activation perceptual loss may be modeled using any of various suitable techniques for image reconstruction losses.

At 3418, the model is updated. According to various embodiments, the model may be updated by altering one or more weights to reflect the loss value determined at 3416.

At 3420, a determination is made as to whether to select an additional image. According to various embodiments, the model may continue to be trained until one or more stopping criteria are met. For example, training may continue until the marginal change in the model between successive iterations falls below a threshold. As another example, training may continue for a fixed number of minimum or maximum iterations. As yet another example, training may continue until all images in a training set have been processed. Images may be processed in sequence, at random, in parallel, or in any suitable order.

The trained model is stored at 3422. According to various embodiments, storing the trained model may involve storing information such as parameter weights on a local storage device and/or transmitting such information to a remote machine via a network.

FIG. 35 illustrates a particular example of a process flow 3500 for providing target view location feedback, performed in accordance with one or more embodiments. The method 3500 may be used to facilitate the capture of images approximately from one or more designated viewpoints.

At 3502, a request to capture an image. According to various embodiments, the request may be generated as discussed with respect to FIG. 2. At 3504, target view location information is determined. According to various embodiments, the target view location information may include any information suitable for determining a specific camera view that is desirable for capture in the MVIDMR being generated. This target view location information may include, but is not limited to: camera orientation information, camera location information, and image data associated with a target view.

According to various embodiments, the target view information may include positioning information such as camera height, orientation, and/or object distance. For example, the target information may indicate that an image is to be captured with the camera angled in a particular way based on gyroscopic data collected from the IMU. As another example, the target information may indicate that an image is to be captured with the camera positioned at a particular height and/or distance to a focal object.

In particular embodiments, multiple target views may be determined. For example, when capturing views for novel view generation, a series of target views may be determined in a grid pattern or other suitable arrangement.

At 3506, an image is captured. According to various embodiments, the image may be captured as part of a live video stream and/or the normal process for generating a MVIDMR. Capturing an image may involve operations such as receiving data from the camera, IMU, and other such sensors. Some or all of the received data may then be stored to a storage location.

At 3508, current view location information associated with the captured image is determined. According to various embodiments, the current view location information may include image data associated with the captured image.

Alternately, or additionally, the current view location information may include IMU data received near in time to the capture of the image at operation 3506. In particular embodiments, the current view location information may include camera location or orientation information determined by analyzing data received from the camera, the IMU, or other such sensors.

At 3510, a determination is made as to whether the current view location matches the target view location. In some embodiments, the current view location information may include an image difference between the captured image and an image associated with the target view location information. For example, an image comparison procedure may employ feature recognition in order to map one or more features in the captured image to one or more features in an image included in the target view location information. The feature mapping may then be used to determine a position of the captured image relative to the image included in the target view location information. For instance, the feature mapping procedure may determine that the camera was located lower and to the left of the target view location that would be necessary to replicate the image included in the target view location information.

In some embodiments, the current view location information may include an IMU difference, position difference, and/or orientation difference between data associated with the captured image and data associated with the target view location information. For example, analysis of IMU data received in association with the captured image may indicate that the captured image was captured at an angle that is greater than or less than the angle associated with the target view. As another example, analysis of IMU data may indicate that the captured image was captured from a location above and to the right of the location that would be necessary to reach the target view. As still another example, analysis of IMU data may indicate that the captured image was captured from a location further away from a focal object or closer to the focal object than the target view.

At 3512, target view location feedback information is presented. According to various embodiments, the target view location feedback information may be any audible or visible information suitable for guiding the user to reach the target view. For example, a target image may be included in the live video feed captured from the camera as a picture-in-picture. As another example, a target image may be overlain on top of the live video feed captured from the camera. As yet another example, arrows or other directional indicators may be overlain on top of the live video feed captured from the camera. As still another example, a series of audible beeps or other noises may be presented in sequence, with the cadence increasing to indicate that the user is getting closer to the target view. As yet another example, a shape may be overlain on the live video feed captured from the camera to show the user how to align the camera with the target view. Such shapes may include, but are not limited to: a cross-hairs on which to center the image, a rectangle on which to center the image, and one or more shapes to move to a particular area of the displayed video feed.

FIGS. 31 and 32 illustrate examples of recording guidance. In FIG. 31, a user is first guided to a camera location by aligning the empty circular pink target with the transparent shaded ball. In FIG. 32, the camera rotational position is adjusted by aligning the empty circular pink target with the filled circular pink target. Additional viewpoints to capture are illustrated as transparent balls, and successfully captured viewpoints are illustrated as opaque balls.

At 3514, when it is determined that the current view location matches the target view location, the captured image is stored. The method 3500 shown in FIG. 35 is described with respect to a single target view. However, in particular embodiments more than one target view may be used. For example, a series of target views may be generated to encourage the user to capture an object from a series of designated perspectives.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of specific rendering algorithms. However, the techniques of the present invention apply to a wide variety of rendering algorithms. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:
1. A method comprising:
 rendering a plurality of target viewpoint images based on plurality of multiplane images of a three-dimensional scene, each of the plurality of multiplane images cor- responding with a respective one of the plurality of target viewpoint images, each of the plurality of multiplane images associated with a respective one of a plurality of single plane images of the three-dimensional scene, each of the plurality of single plane images being captured from a respective viewpoint, each of the plurality of multiplane images including a respective plurality of depth planes, each of the respective plurality of depth planes including a respective plurality of pixels from the respective single plane image, each of the respective plurality of pixels in the respective plurality of depth planes being positioned at approximately a same distance from the respective viewpoint;

determining a weighted combination of the respective target viewpoint image for each of the plurality of multiplane images via a processor at a computing device, wherein a sampling density of the plurality of single plane images is sufficiently high that the weighted combination satisfies an inequality wherein a maximum pixel disparity of any scene point between adjacent ones of the plurality of target viewpoint images is less than or equal to a minimum of: (a) a number of depth layers associated with the plurality of multiplane images and (b) half of a target rendering resolution for a novel viewpoint image; and transmitting the weighted combination of the respective target viewpoint image for each of the plurality of multiplane images as the novel viewpoint image.

2. The method recited in claim 1, wherein each respective target viewpoint image for each of the plurality of multiplane images is associated with a respective set of color values, and wherein determining the weighted combination of the respective target viewpoint image for each of the plurality of multiplane images comprises applying one or more blending weights to the respective set of color values.

3. The method recited in claim 1, wherein each of the plurality of multiplane images is associated with a respective set of alpha values, and wherein each respective target viewpoint image for each of the plurality of multiplane images is determined based on alpha weights determined based on the respective set of alpha values.

4. The method recited in claim 1, wherein each of the plurality of multiplane images is associated with a respective set of alpha values, and wherein the weighted combination is determined at least in part based on the respective set of alpha values.

5. The method recited in claim 1, wherein the weighted combination of the respective target viewpoint image for each of the plurality of multiplane images is determined based on a plurality of weights, each of the plurality of weights being determined based on a respective distance between a target viewpoint and a corresponding viewpoint of one of the multiplane images.

6. The method recited in claim 1, wherein determining the weighted combination of the respective target viewpoint image for each of the plurality of multiplane images involves rasterizing each of the respective plurality of depth planes as a respective texture-mapped rectangle in three-dimensional space.

7. The method recited in claim 6, wherein the respective plurality of depth planes are combined via a fragment shader.

8. The method recited in claim 1, wherein the three-dimensional scene includes a non-Lambertian material, and wherein the three-dimensional scene includes a specularity represented at a respective one or more virtual depths in each of the plurality of multiplane images.

9. The method recited in claim 1, wherein the novel viewpoint image is transmitted to a storage device for storage.

10. The method recited in claim 1, wherein the novel viewpoint image is transmitted to a display screen for live presentation.

11. The method recited in claim 10, wherein the novel viewpoint image is displayed on the display screen in real time during a three-dimensional navigation of the three-dimensional scene via the display screen.

12. The method recited in claim 1, wherein each respective single plane image is a respective photo of the three-dimensional scene.

13. The method recited in claim 12, wherein each respective photo of the three-dimensional scene is captured via a camera at a mobile computing device.

14. The method recited in claim 1, wherein the computing device is a smartphone.

15. A computing device comprising a processor and a memory storing instructions for execution by the processor to perform a method, the method comprising:

rendering a plurality of target viewpoint images based on a plurality of multiplane images of a three-dimensional scene, each of the plurality of multiplane images corresponding with a respective one of the plurality of target viewpoint images, each of the plurality of multiplane images associated with a respective one of a plurality of single plane images of the three-dimensional scene, each of the plurality of single plane images being captured from a respective viewpoint, each of the plurality of multiplane images including a respective plurality of depth planes, each of the respective plurality of depth planes including a respective plurality of pixels from the respective single plane image, each of the respective plurality of pixels in the respective plurality of depth planes being positioned at approximately a same distance from the respective viewpoint;

determining a weighted combination of the respective target viewpoint image for each of the plurality of multiplane images via a processor at a computing device, wherei n a sampling density of the plurality of single plane images is sufficiently high that the weighted combination satisfies an inequality wherein a maximum pixel disparity of any scene point between adjacent ones of the plurality of target viewpoint images is less than or equal to a minimum of: (a) a number of depth layers associated with the plurality of multiplane images and (b) half of a target rendering resolution for a novel viewpoint image; and transmitting the weighted combination of the respective target viewpoint image for each of the plurality of multiplane images as the novel viewpoint image.

16. The computing device recited in claim 15, wherein each respective target viewpoint image for each of the plurality of multiplane images is associated with a respective set of color values, and wherein determining the weighted combination of the respective target viewpoint image for each of the plurality of multiplane images comprises applying one or more blending weights to the respective set of color values.

17. The computing device recited in claim 15, wherein each of the plurality of multiplane images is associated with a respective set of alpha values, and wherein each respective target viewpoint image for each of the plurality of multiplane images is determined based on alpha weights determined based on the respective set of alpha values.

18. The computing device recited in claim 15, wherein each of the plurality of multiplane images is associated with a respective set of alpha values, and wherein the weighted combination is determined at least in part based on the respective set of alpha values.

19. The computing device recited in claim 15, wherein the weighted combination of the respective target viewpoint image for each of the plurality of multiplane images is determined based on a plurality of weights, each of the plurality of weights being determined based on a respective distance between a target viewpoint and a corresponding viewpoint of one of the multiplane images.

20. One or more non-transitory computer readable media storing instructions for execution by a processor to perform a method, the method comprising:
- rendering a plurality of target viewpoint images based on a plurality of multiplane images of a three-dimensional scene, each of the plurality of multiplane images corresponding with a respective one of the plurality of target viewpoint images, each of the plurality of multiplane images associated with a respective one of a plurality of single plane images of the three-dimensional scene, each of the plurality of single plane images being captured from a respective viewpoint, each of the plurality of multiplane images including a respective plurality of depth planes, each of the respective plurality of depth planes including a respective plurality of pixels from the respective single plane image, each of the respective plurality of pixels in the respective plurality of depth planes being positioned at approximately a same distance from the respective viewpoint;
- determining a weighted combination of the respective target viewpoint image for each of the plurality of multiplane images via a processor at a computing device, wherein a sampling density of the plurality of single plane images is sufficiently high that the weighted combination satisfies an inequality wherein a maximum pixel disparity of any scene point between adjacent ones of the plurality of target viewpoint images is less than or equal to a minimum of: (a) a number of depth layers associated with the plurality of multiplane images and (b) half of a target rendering resolution for a novel viewpoint image; and
- transmitting the weighted combination of the respective target viewpoint image for each of the plurality of multiplane images as the novel viewpoint image.

* * * * *